(12) United States Patent
Bagrodia et al.

(10) Patent No.: US 7,774,440 B1
(45) Date of Patent: Aug. 10, 2010

(54) METHOD AND SYSTEM FOR ENHANCING PERFORMANCE OF A PHYSICAL NETWORK UNDER REAL-TIME CONTROL USING SIMULATION OF A REFERENCE MODEL

(75) Inventors: Rajive Bagrodia, Los Angeles, CA (US); Ken Tang, El Monte, CA (US); Julian Hsu, Los Angeles, CA (US)

(73) Assignee: Scalable Network Technologies, Inc., Culver City, CA (US)

( * ) Notice: Subject to any disclaimer, the term of this patent is extended or adjusted under 35 U.S.C. 154(b) by 540 days.

(21) Appl. No.: 10/165,610

(22) Filed: Jun. 7, 2002

Related U.S. Application Data

(60) Provisional application No. 60/308,405, filed on Jul. 25, 2001.

(51) Int. Cl.
*G06F 15/177* (2006.01)
(52) U.S. Cl. .............................. 709/221; 703/1; 703/21
(58) Field of Classification Search ......... 709/223–226, 709/221; 703/1, 6–21, 22; 370/351; 455/67.11; 379/15.01
See application file for complete search history.

(56) References Cited

U.S. PATENT DOCUMENTS

| | | | | |
|---|---|---|---|---|
| 5,488,715 A | | 1/1996 | Wainwright | ............ 395/182.02 |
| 5,617,342 A | * | 4/1997 | Elazouni | ......................... 703/6 |
| 5,706,436 A | | 1/1998 | Lewis et al. | .................. 395/200 |
| 5,794,005 A | | 8/1998 | Steinman | ..................... 395/500 |
| 5,794,128 A | * | 8/1998 | Brockel et al. | ............ 455/67.11 |
| 5,801,938 A | | 9/1998 | Kalantery | ................... 364/131 |
| 5,832,272 A | | 11/1998 | Kalantery | .................... 395/706 |
| 5,850,538 A | * | 12/1998 | Steinman | ...................... 703/21 |
| 5,922,051 A | | 7/1999 | Sidey | .......................... 709/223 |
| 5,970,064 A | * | 10/1999 | Clark et al. | .................. 370/351 |
| 6,069,872 A | | 5/2000 | Bonomi et al. | .............. 370/236 |
| 6,069,894 A | | 5/2000 | Holender et al. | ............ 370/397 |
| 6,134,514 A | * | 10/2000 | Liu et al. | ....................... 703/17 |
| 6,209,033 B1 | | 3/2001 | Datta et al. | .................. 709/224 |
| 6,278,963 B1 | | 8/2001 | Cohen | .......................... 703/17 |

(Continued)

OTHER PUBLICATIONS

Chang et al., A Network Approcah to Parallel Discrete Event Simulation, Proc Fourth Conf. AI, Simulation and Planning in high Autonomy Systems, pp. 280-286, Sep. 1993.*

(Continued)

*Primary Examiner*—Asad M Nawaz
*Assistant Examiner*—Oleg Survillo
(74) *Attorney, Agent, or Firm*—Irell & Manella LLP

(57) ABSTRACT

A system and method for network simulation and enhancement includes an experiment configuration engine that provides various proposed traffic and/or network models, and a simulator responsive to the proposed traffic and/or network models to execute a plurality of simulations for the network using parallel discrete event simulation, to determine an optimal network configuration based upon an objective function for enhancing an aspect of network performance. The traffic and/or network models may be based on monitored data from the network indicating a current network state and current network traffic. Reconfiguration instructions for the new network configuration may be conveyed from the simulator to the network, so as to effectuate ongoing, real-time enhancement of the network. The network model(s) may cover internal operational details of individual network devices (e.g., routers and/or switches) as well as operation of the network as a whole.

45 Claims, 10 Drawing Sheets

U.S. PATENT DOCUMENTS

| | | | |
|---|---|---|---|
| 6,324,495 B1 * | 11/2001 | Steinman | 703/17 |
| 6,393,480 B1 * | 5/2002 | Qin et al. | 709/224 |
| 6,650,731 B1 * | 11/2003 | Steltner et al. | 379/15.01 |
| 6,760,308 B1 * | 7/2004 | Ghanma et al. | 370/235 |
| 6,820,042 B1 | 11/2004 | Cohen et al. | 703/2 |
| 2006/0149524 A1 * | 7/2006 | Kalyanaraman et al. | 703/13 |

OTHER PUBLICATIONS

David Nicol, "Conservative Parallel Simulation of Priority Class Queuing Networks", IEEE, May 1992.*

Bagrodia, "Parsec: A parallel simulation environment for complex system" Computer, vol. 31:10, Oct. 1998, p. 77-85.*

Bagrodia, "Parsec: A parallel simulation environment for complex system", Computer Magazine, vol. 31.10, Oct. 1998, p. 77-85.*

Tak Kin Yung, et al., Integration of fluid-based analytical model with Packet-Level Simulation of Analysis of Computer Networks, Jul. 24, 2001, SPIE, vol. 4523, 16 pages total, retrieved from http://spie.org/.*

Z. Xiao, B. Unger, R. Simmonds, J. Cleary, Scheduling critical channels in conservative parallel discrete event simulation, Proceedings of the thirteenth workshop on Parallel and distributed simulation, p. 20-28, May 1-4, 1999, Atlanta, Georgia, United States.*

V. Sanchez et al, 1996, Deblocking Event Algorithm: A New Approach to Conservative Parallel Discrete Event Simulation, in 4th Euromicro Workshop on Parallel and Distributed Processing.*

Rob Simmonds, Russell Bradford, Brian Unger, Applying parallel discrete event simulation to network emulation, Proceedings of the fourteenth workshop on Parallel and distributed simulation, p. 15-22, May 28-31, 2000, Bologna, Italy.*

Takai, Mineo, et al., "Efficient Wireless Network Simulation with Detailed Propagation Model," Computer Science Department, University of California, Los Angeles, ACM Wireless Network Journal; Dec. 2000.

Lee, Sung-Ju et al., "A Performance Comparison Study of Ad Hoc Wireless Multicast Protocols," Wireless Adaptive Mobility Laboratory, Computer Science Department, Proceedings of IEEE INFOCOM 2000, Mar. 2000.

Bajaj, Lokesh, et al., "Simulation of Large-Scale Heterogeneous Communication Systems," Computer Science Department, University of California, Los Angeles, Proceedings of MILCOM'99, Nov. 1999.

Bagrodia, Rajive, et al., "Position Paper on Validation of Network Simulation Models," Computer Science Department, University of California, Los Angeles, DARPA/NIST Network Simulation Validation Workshop, May 1999.

Bagrodia, Rajive, et al., "Parsec: A Parallel Simulation Environment for Complex Systems," *Computer*, vol. 31:10, Oct. 1998, pp. 77-85.

Bagrodia, Rajive, et al., "A Modular and Scalable Simulation Tool for Large Wireless Networks," Invited Paper, Proceedings of Performance Tools '98, Sep. 15, 1998.

Bajaj, Lokesh, et al., "GloMoSim: A Scalable Network Simulation Environment," Computer Science Department, University of California, Los Angeles, UCLA Computer Science Department Technical Report 990027, May 1999.

Ahuja, R., et al., "Evaluation of Optimistic File Replication in Wireless Multihop Networks," Computer Science Department, University of California, Los Angeles, Proceedings of GLOBECOM'99, Dec. 1999.

Zeng, Xiang, et al., "GloMoSim: A Library for Parallel Simulation of Large-scale Wireless Networks," Department of Computer Science, University of California, Los Angeles, Proceedings of the 12$^{th}$ Workshop on Parallel and Distributed Simulations—PADS '98, May 26-29, 1998.

Hiramatsu, Atsushi, "Integration of ATM Call Admission Control and Link Capacity Control by Distributed Neural Networks," IEEE Journal on Selected Areas in Communications, vol. 9, No. 7, Sep. 1991, pp. 1131-1138.

"An Introduction to Inductive Modeling," Aprisma Management Technologies, Sep. 2000.

"Event Correlation in Spectrum and Other Commercial Products," Aprisma Management Technologies, Sep. 2000.

Zyren, Jim, et al., "IEEE 802.11 Tutorial," pp. 1-7.

Martin, Jay et al., "Runtime Performance Optimizations for Detailed Wireless Network Simulation," UCLA Computer Science Department.

Meyer, Richard, et al., "PARSEC User Manual for PARSEC Release 1.1," UCLA Parallel Computing Laboratory, Sep. 1999.

Bagrodia, Rajive L., et al., "The Maisie Environment for Parallel Simulation," Computer Science Department, University of California at Los Angeles, 1994, pp. 1-9.

Martin, Jay M., et al., "Compose: An Object-Oriented Environment for Parallel Discrete-Even Simulations," Computer Science Department, University of California at Los Angeles, 1994, 5 pages.

Bagrodia, Rajive, et al., "Parallel Gate-level Circuit Stimulation on Shared Memory Architectures," In Proceedings of the Ninth Workshop on Parallel and Distributed Simulations (PADS '95), pp. 170-174, Lake Placid, NY, Jun. 1995, 5 pages.

Low, Yoke-Hean, et al. "Survey of Languages and Runtime Libraries for Parallel Discrete-Event Simulation," *Simulation*, pp. 1-17, Mar. 1999.

Bagrodia, Rajive, "Perils and Pitfalls of Parallel Discrete-Event Simulation," 1996 Winter Simulation Conference, Dec. 10, 1996, presentation.

Nuevo, Jorge, "A Comprehensible GloMoSim Tutorial", INRS—Universite du Quebec, Mar. 4, 2004.

Bagrodia, Rajive L., "Perils and Pitfalls of Parallel Discrete-Event Simulation", Proceeding of the 1996 Winter Simulation Conference, pp. 1-8.

Xu, Kaixin et al., "Looking Ahead of Real Time in Hybrid Component Networks", Proceedings of PADS 2001, May 2001.

Overeinder, Benno et al., "Parallel Discrete Event Simulation", Amsterdam, The Netherlands, Apr. 24, 1991.

Kamerman, Ad et al., "WaveLAN-II: A High Performance Wireless LAN for the Unlicensed Band", Bell Labs Technical Journal, Summer 1997, pp. 118-133.

* cited by examiner

METHOD AND SYSTEM FOR ENHANCING PERFORMANCE OF A PHYSICAL NETWORK UNDER REAL-TIME CONTROL USING SIMULATION OF A REFERENCE MODEL

RELATED APPLICATION INFORMATION

This application claims priority to U.S. Provisional Application Ser. No. 60/308,405 filed Jul. 25, 2001, hereby incorporated by reference as if set forth fully herein.

RESERVATION OF COPYRIGHT RIGHTS PURSUANT TO 37 CFR 1.71

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

This application includes a computer program listing appendix submitted on a compact disc, the contents of which are hereby incorporated by reference as if set forth fully herein. The names, creation dates, and sizes (in bytes) of the files on the compact disc are as follows:

| filename | creation date | size (bytes) |
| --- | --- | --- |
| parsec\1.0\compiler\cat.c | 5/11/1997 | 6600 |
| parsec\1.0\compiler\cat.h | 10/24/1997 | 300 |
| parsec\1.0\compiler\decl.c | 1/25/1998 | 9700 |
| parsec\1.0\compiler\decl.h | 10/24/1997 | 600 |
| parsec\1.0\compiler\doc\help.txt | 1/12/1997 | 900 |
| parsec\1.0\compiler\doc\RCS\help.txt,v | 1/12/1997 | 1400 |
| parsec\1.0\compiler\entity.c | 10/11/1997 | 2900 |
| parsec\1.0\compiler\entity.h | 10/11/1997 | 400 |
| parsec\1.0\compiler\error.c | 10/24/1997 | 1600 |
| parsec\1.0\compiler\error.h | 10/24/1997 | 200 |
| parsec\1.0\compiler\include\MC_parsec.h | 2/2/1998 | 2200 |
| parsec\1.0\compiler\include\parsec.h | 2/2/1998 | 800 |
| parsec\1.0\compiler\include\preload.h | 2/2/1998 | 800 |
| parsec\1.0\compiler\include\RCS\MC_parsec.h,v | 2/2/1998 | 6400 |
| parsec\1.0\compiler\include\RCS\parsec.h,v | 2/2/1998 | 1000 |
| parsec\1.0\compiler\include\RCS\preload.h,v | 3/12/1997 | 2300 |
| parsec\1.0\compiler\Makefile | 10/11/1997 | 500 |
| parsec\1.0\compiler\makent.bat | 6/12/1997 | 100 |
| parsec\1.0\compiler\message.c | 10/24/1997 | 900 |
| parsec\1.0\compiler\message.h | 10/24/1997 | 100 |
| parsec\1.0\compiler\parser.h | 11/16/1997 | 100 |
| parsec\1.0\compiler\parser.l | 2/2/1998 | 6700 |
| parsec\1.0\compiler\parser.y | 2/18/1998 | 108400 |
| parsec\1.0\compiler\pcc.c | 2/2/1998 | 30700 |
| parsec\1.0\compiler\pcc.h | 6/11/1997 | 400 |
| parsec\1.0\compiler\RCS\cat.c,v | 5/11/1997 | 11200 |
| parsec\1.0\compiler\RCS\cat.h,v | 10/24/1997 | 900 |
| parsec\1.0\compiler\RCS\decl.c,v | 1/25/1998 | 14400 |
| parsec\1.0\compiler\RCS\decl.h,v | 10/24/1997 | 1300 |
| parsec\1.0\compiler\RCS\entity.c,v | 10/11/1997 | 5400 |
| parsec\1.0\compiler\RCS\entity.h,v | 10/11/1997 | 1300 |
| parsec\1.0\compiler\RCS\error.c,v | 10/24/1997 | 2900 |
| parsec\1.0\compiler\RCS\error.h,v | 10/24/1997 | 700 |
| parsec\1.0\compiler\RCS\Makefile,v | 10/11/1997 | 1700 |
| parsec\1.0\compiler\RCS\makent.bat,v | 6/12/1997 | 400 |
| parsec\1.0\compiler\RCS\message.c,v | 10/24/1997 | 1600 |
| parsec\1.0\compiler\RCS\message.h,v | 10/24/1997 | 600 |
| parsec\1.0\compiler\RCS\parser.h,v | 11/16/1997 | 1000 |
| parsec\1.0\compiler\RCS\parser.l,v | 2/2/1998 | 9900 |
| parsec\1.0\compiler\RCS\parser.y,v | 2/18/1998 | 212400 |
| parsec\1.0\compiler\RCS\pcc.c,v | 2/2/1998 | 52500 |
| parsec\1.0\compiler\RCS\pcc.h,v | 6/11/1997 | 1300 |
| parsec\1.0\compiler\RCS\type.c,v | 10/11/1997 | 16900 |
| parsec\1.0\compiler\RCS\type.h,v | 10/11/1997 | 5300 |
| parsec\1.0\compiler\type.c | 10/11/1997 | 10500 |
| parsec\1.0\compiler\type.h | 10/11/1997 | 2600 |
| parsec\1.0\Makefile | 11/21/1997 | 1500 |
| parsec\1.0\RCS\Makefile,v | 11/21/1997 | 3900 |
| parsec\1.0\runtime\com.h | 12/15/1997 | 500 |
| parsec\1.0\runtime\conservative.h | 1/22/1998 | 2000 |
| parsec\1.0\runtime\conservative_dist.c | 1/27/1998 | 59700 |
| parsec\1.0\runtime\dlink.c | 10/24/1997 | 3400 |
| parsec\1.0\runtime\dummy_com.c | 5/12/1997 | 4300 |
| parsec\1.0\runtime\functions.c | 3/12/1997 | 3100 |
| parsec\1.0\runtime\heap.c | 10/24/1997 | 5600 |
| parsec\1.0\runtime\jsetjmp.s | 9/29/1997 | 6700 |
| parsec\1.0\runtime\LICENSE | 10/12/1997 | 1500 |

-continued

| filename | creation date | size (bytes) |
|---|---|---|
| parsec\1.0\runtime\main.c | 8/12/1997 | 100 |
| parsec\1.0\runtime\Makefile | 1/13/1998 | 2500 |
| parsec\1.0\runtime\Makefile.AIX | 1/13/1998 | 2500 |
| parsec\1.0\runtime\makent.bat | 8/1/1998 | 500 |
| parsec\1.0\runtime\mpi_com.c | 1/22/1998 | 6300 |
| parsec\1.0\runtime\msg_q.c | 1/22/1998 | 6200 |
| parsec\1.0\runtime\ntsystime.c | 10/24/1997 | 300 |
| parsec\1.0\runtime\ntsystime.h | 9/3/1998 | 200 |
| parsec\1.0\runtime\ntthread_com.c | 8/1/1998 | 6600 |
| parsec\1.0\runtime\ntvalues.h | 10/24/1997 | 100 |
| parsec\1.0\runtime\parsec.h | 10/24/1997 | 800 |
| parsec\1.0\runtime\pthread_com.c | 5/12/1997 | 5900 |
| parsec\1.0\runtime\random.c | 2/2/1998 | 4000 |
| parsec\1.0\runtime\RCS\com.h,v | 12/15/1997 | 2500 |
| parsec\1.0\runtime\RCS\conservative.h,v | 1/22/1998 | 6300 |
| parsec\1.0\runtime\RCS\conservative_dist.c,v | 1/27/1998 | 177300 |
| parsec\1.0\runtime\RCS\dlink.c,v | 10/24/1997 | 8500 |
| parsec\1.0\runtime\RCS\dlink.h,v | 10/24/1997 | 2200 |
| parsec\1.0\runtime\RCS\dummy_com.c,v | 5/12/1997 | 14600 |
| parsec\1.0\runtime\RCS\functions.c,v | 3/12/1997 | 11800 |
| parsec\1.0\runtime\RCS\functions.h,v | 10/24/1997 | 900 |
| parsec\1.0\runtime\RCS\heap.c,v | 10/24/1997 | 12300 |
| parsec\1.0\runtime\RCS\heap.h,v | 10/24/1997 | 1900 |
| parsec\1.0\runtime\RCS\jsetjmp.s,v | 9/29/1997 | 6900 |
| parsec\1.0\runtime\RCS\main.c,v | 8/12/1997 | 2400 |
| parsec\1.0\runtime\RCS\maisie.h,v | 10/24/1997 | 1100 |
| parsec\1.0\runtime\RCS\Makefile,v | 1/13/1998 | 6500 |
| parsec\1.0\runtime\RCS\Makefile.AIX,v | 1/13/1998 | 3300 |
| parsec\1.0\runtime\RCS\Makefile.HP-UX,v | 10/11/1997 | 2600 |
| parsec\1.0\runtime\RCS\Makefile.Solaris,v | 10/11/1997 | 2600 |
| parsec\1.0\runtime\RCS\makent.bat,v | 8/1/1998 | 1500 |
| parsec\1.0\runtime\RCS\MC_maisie.h,v | 10/24/1997 | 5100 |
| parsec\1.0\runtime\RCS\mpc.c,v | 10/24/1997 | 24700 |
| parsec\1.0\runtime\RCS\mpi_com.c,v | 1/22/1998 | 19700 |
| parsec\1.0\runtime\RCS\msg_q.c,v | 1/22/1998 | 24100 |
| parsec\1.0\runtime\RCS\msg_q.h,v | 10/24/1997 | 3600 |
| parsec\1.0\runtime\RCS\ntsystime.c,v | 10/24/1997 | 500 |
| parsec\1.0\runtime\RCS\ntsystime.h,v | 9/3/1998 | 700 |
| parsec\1.0\runtime\RCS\ntthread_com.c,v | 8/1/1998 | 6900 |
| parsec\1.0\runtime\RCS\ntvalues.h,v | 10/24/1997 | 300 |
| parsec\1.0\runtime\RCS\parsec.h,v | 10/24/1997 | 1400 |
| parsec\1.0\runtime\RCS\pthread_com.c,v | 5/12/1997 | 17500 |
| parsec\1.0\runtime\RCS\random.c,v | 2/2/1998 | 4700 |
| parsec\1.0\runtime\RCS\runtime.c,v | 1/22/1998 | 38600 |
| parsec\1.0\runtime\RCS\runtime.h,v | 1/22/1998 | 27500 |
| parsec\1.0\runtime\RCS\sequential.c,v | 1/22/1998 | 34400 |
| parsec\1.0\runtime\RCS\splay.c,v | 8/12/1997 | 38200 |
| parsec\1.0\runtime\RCS\splay.h,v | 10/24/1997 | 2500 |
| parsec\1.0\runtime\RCS\thread_com.c,v | 10/24/1997 | 13100 |
| parsec\1.0\runtime\runtime.c | 1/22/1998 | 12400 |
| parsec\1.0\runtime\runtime.h | 1/22/1998 | 11700 |
| parsec\1.0\runtime\sequential.c | 1/22/1998 | 12100 |
| parsec\1.0\runtime\splay.c | 8/12/1997 | 15900 |
| parsec\1.1.1\compiler\cat.c | 11/3/1998 | 6600 |
| parsec\1.1.1\compiler\cat.h | 2/25/1998 | 300 |
| parsec\1.1.1\compiler\decl.c | 8/19/1998 | 10100 |
| parsec\1.1.1\compiler\decl.h | 2/25/1998 | 600 |
| parsec\1.1.1\compiler\entity.c | 11/11/1998 | 3000 |
| parsec\1.1.1\compiler\entity.h | 11/17/1998 | 400 |
| parsec\1.1.1\compiler\error.c | 2/25/1998 | 1900 |
| parsec\1.1.1\compiler\error.h | 2/25/1998 | 200 |
| parsec\1.1.1\compiler\lex.yy.c | 11/14/1998 | 58900 |
| parsec\1.1.1\compiler\Makefile | 1/10/1998 | 500 |
| parsec\1.1.1\compiler\Makefile-aix | 8/14/1998 | 500 |
| parsec\1.1.1\compiler\Makefile-generic | 8/13/1998 | 500 |
| parsec\1.1.1\compiler\Makefile-irix | 8/10/1998 | 500 |
| parsec\1.1.1\compiler\Makefile-sun | 8/13/1998 | 500 |
| parsec\1.1.1\compiler\makent.bat | 8/20/1998 | 100 |
| parsec\1.1.1\compiler\message.c | 2/25/1998 | 900 |
| parsec\1.1.1\compiler\message.h | 2/25/1998 | 100 |
| parsec\1.1.1\compiler\parser.h | 10/3/1998 | 300 |
| parsec\1.1.1\compiler\parser.l | 11/14/1998 | 6700 |
| parsec\1.1.1\compiler\parser.tab.c | 11/15/1998 | 205300 |
| parsec\1.1.1\compiler\parser.tab.h | 11/15/1998 | 2500 |
| parsec\1.1.1\compiler\parser.y | 11/15/1998 | 120900 |
| parsec\1.1.1\compiler\pcc.c | 11/13/1998 | 38900 |
| parsec\1.1.1\compiler\pcc.h | 12/11/1998 | 400 |

-continued

| filename | creation date | size (bytes) |
|---|---|---|
| parsec\1.1.1\compiler\RCS\cat.c,v | 11/3/1998 | 7400 |
| parsec\1.1.1\compiler\RCS\cat.h,v | 2/25/1998 | 500 |
| parsec\1.1.1\compiler\RCS\decl.c,v | 8/19/1998 | 10800 |
| parsec\1.1.1\compiler\RCS\decl.h,v | 2/25/1998 | 900 |
| parsec\1.1.1\compiler\RCS\entity.c,v | 3/6/1998 | 3800 |
| parsec\1.1.1\compiler\RCS\entity.h,v | 11/17/1998 | 800 |
| parsec\1.1.1\compiler\RCS\error.c,v | 2/25/1998 | 2100 |
| parsec\1.1.1\compiler\RCS\error.h,v | 2/25/1998 | 400 |
| parsec\1.1.1\compiler\RCS\Makefile,v | 8/13/1998 | 1800 |
| parsec\1.1.1\compiler\RCS\Makefile-aix,v | 8/14/1998 | 700 |
| parsec\1.1.1\compiler\RCS\Makefile-generic,v | 8/14/1998 | 700 |
| parsec\1.1.1\compiler\RCS\Makefile-sun,v | 8/14/1998 | 700 |
| parsec\1.1.1\compiler\RCS\makent.bat,v | 8/20/1998 | 1000 |
| parsec\1.1.1\compiler\RCS\message.c,v | 2/25/1998 | 1100 |
| parsec\1.1.1\compiler\RCS\message.h,v | 2/25/1998 | 400 |
| parsec\1.1.1\compiler\RCS\parser.h,v | 10/3/1998 | 800 |
| parsec\1.1.1\compiler\RCS\parser.l,v | 11/14/1998 | 12900 |
| parsec\1.1.1\compiler\RCS\parser.y,v | 11/15/1998 | 140600 |
| parsec\1.1.1\compiler\RCS\pcc.c,v | 11/13/1998 | 60300 |
| parsec\1.1.1\compiler\RCS\pcc.h,v | 11/13/1998 | 1300 |
| parsec\1.1.1\compiler\RCS\type.c,v | 2/25/1998 | 10800 |
| parsec\1.1.1\compiler\RCS\type.h,v | 11/17/1998 | 3300 |
| parsec\1.1.1\compiler\type.c | 2/25/1998 | 10500 |
| parsec\1.1.1\compiler\type.h | 11/17/1998 | 2600 |
| parsec\1.1.1\doc\help.txt | 12/8/1998 | 1100 |
| parsec\1.1.1\doc\RCS\help.txt,v | 12/8/1998 | 2100 |
| parsec\1.1.1\include\clocktype.h | 10/25/1998 | 2400 |
| parsec\1.1.1\include\pc_api.h | 9/18/1998 | 6700 |
| parsec\1.1.1\include\RCS\clocktype.h,v | 10/25/1998 | 7500 |
| parsec\1.1.1\include\RCS\pc_api.h | 8/23/1998 | 5900 |
| parsec\1.1.1\include\RCS\pc_api.h,v | 9/18/1998 | 10500 |
| parsec\1.1.1\include\RCS\pc_macros.h,v | 2/25/1998 | 1900 |
| parsec\1.1.1\include\RCS\pcc_api.h,v | 3/15/1998 | 1100 |
| parsec\1.1.1\include\RCS\pcc_defs.h,v | 7/15/1998 | 3000 |
| parsec\1.1.1\include\RCS\preload.c,v | 6/22/1998 | 1900 |
| parsec\1.1.1\install-aix | 8/19/1998 | 100 |
| parsec\1.1.1\install-irix | 1/11/1998 | 200 |
| parsec\1.1.1\install-linux | 10/30/1998 | 200 |
| parsec\1.1.1\install-solaris | 10/30/1998 | 700 |
| parsec\1.1.1\install-x86-solaris | 8/19/1998 | 400 |
| parsec\1.1.1\license.txt | 8/20/1998 | 1500 |
| parsec\1.1.1\Makefile | 6/10/1998 | 1800 |
| parsec\1.1.1\Makefile.gprof | 6/10/1998 | 1800 |
| parsec\1.1.1\optruntime\basictypes.h | 9/18/1998 | 1900 |
| parsec\1.1.1\optruntime\clustergvtcalc.h | 9/18/1998 | 9600 |
| parsec\1.1.1\optruntime\commsystemsp.h | 9/18/1998 | 2000 |
| parsec\1.1.1\optruntime\compose.h | 9/18/1998 | 100 |
| parsec\1.1.1\optruntime\composegcc.h | 9/18/1998 | 900 |
| parsec\1.1.1\optruntime\composent.h | 9/18/1998 | 700 |
| parsec\1.1.1\optruntime\datastructures.h | 9/18/1998 | 71700 |
| parsec\1.1.1\optruntime\distgvtcalculator.h | 9/18/1998 | 4400 |
| parsec\1.1.1\optruntime\entitymanager.h | 5/11/1998 | 8400 |
| parsec\1.1.1\optruntime\flushsparcregwindows.cpp | 9/18/1998 | 600 |
| parsec\1.1.1\optruntime\gvtcalculator.h | 9/18/1998 | 4400 |
| parsec\1.1.1\optruntime\gvtcommsys.h | 9/18/1998 | 100 |
| parsec\1.1.1\optruntime\gvtcommsysdummy.h | 9/18/1998 | 1300 |
| parsec\1.1.1\optruntime\gvtcommsyssp.h | 9/18/1998 | 4900 |
| parsec\1.1.1\optruntime\ii_files\runtime.ii | 8/10/1998 | 100 |
| parsec\1.1.1\optruntime\ii_files\startpthread.ii | 8/10/1998 | 200 |
| parsec\1.1.1\optruntime\ii_files\threadsystem.ii | 8/10/1998 | 200 |
| parsec\1.1.1\optruntime\main.cpp | 9/18/1998 | 400 |
| parsec\1.1.1\optruntime\makent.bat | 8/11/1998 | 300 |
| parsec\1.1.1\optruntime\makentall.bat | 8/11/1998 | 100 |
| parsec\1.1.1\optruntime\makentdeb.bat | 8/11/1998 | 300 |
| parsec\1.1.1\optruntime\makentdebug.bat | 9/18/1998 | 300 |
| parsec\1.1.1\optruntime\makentll.bat | 8/11/1998 | 300 |
| parsec\1.1.1\optruntime\makentlldeb.bat | 8/11/1998 | 300 |
| parsec\1.1.1\optruntime\makesgi | 9/18/1998 | 200 |
| parsec\1.1.1\optruntime\makesgidebug | 9/18/1998 | 200 |
| parsec\1.1.1\optruntime\makesun | 9/18/1998 | 300 |
| parsec\1.1.1\optruntime\makesundebug | 9/18/1998 | 300 |
| parsec\1.1.1\optruntime\memorymanager.h | 9/18/1998 | 15700 |
| parsec\1.1.1\optruntime\message.h | 8/11/1998 | 5000 |
| parsec\1.1.1\optruntime\messagemap.h | 9/18/1998 | 2000 |
| parsec\1.1.1\optruntime\messagequeue.h | 9/18/1998 | 9200 |
| parsec\1.1.1\optruntime\mtmemorybuffer.h | 9/18/1998 | 3700 |
| parsec\1.1.1\optruntime\mtmemorycache.h | 9/18/1998 | 7000 |

-continued

| filename | creation date | size (bytes) |
|---|---|---|
| parsec\1.1.1\optruntime\nullmessagesys.h | 9/18/1998 | 9400 |
| parsec\1.1.1\optruntime\oddsandends.h | 9/18/1998 | 2200 |
| parsec\1.1.1\optruntime\random.cpp | 9/18/1998 | 4000 |
| parsec\1.1.1\optruntime\rollbackable.h | 9/18/1998 | 1100 |
| parsec\1.1.1\optruntime\rollbackableprintf.h | 9/18/1998 | 4100 |
| parsec\1.1.1\optruntime\runtime.cpp | 8/11/1998 | 88300 |
| parsec\1.1.1\optruntime\runtimeentity.h | 8/11/1998 | 20900 |
| parsec\1.1.1\optruntime\sharedclockvar.h | 9/18/1998 | 900 |
| parsec\1.1.1\optruntime\smart.h | 9/18/1998 | 8300 |
| parsec\1.1.1\optruntime\splaytree.h | 9/18/1998 | 15000 |
| parsec\1.1.1\optruntime\startnt.cpp | 8/11/1998 | 2900 |
| parsec\1.1.1\optruntime\startpthread.cpp | 9/18/1998 | 3300 |
| parsec\1.1.1\optruntime\startstuff.h | 9/18/1998 | 1000 |
| parsec\1.1.1\optruntime\sysmessages.h | 5/11/1998 | 6800 |
| parsec\1.1.1\optruntime\sysstuff.h | 9/18/1998 | 100 |
| parsec\1.1.1\optruntime\sysstuffnt.h | 9/18/1998 | 3200 |
| parsec\1.1.1\optruntime\sysstuffpthread.h | 9/18/1998 | 2600 |
| parsec\1.1.1\optruntime\sysstuffsp.h | 9/18/1998 | 2800 |
| parsec\1.1.1\optruntime\Templates.DB\Module.DB\runtime.module | 12/10/1998 | 65100 |
| parsec\1.1.1\optruntime\threadsystem.cpp | 9/18/1998 | 8700 |
| parsec\1.1.1\optruntime\threadsystem.h | 10/10/1998 | 3300 |
| parsec\1.1.1\optruntime\typeinfo.h | 9/18/1998 | 1100 |
| parsec\1.1.1\RCS\license.txt,v | 8/20/1998 | 1700 |
| parsec\1.1.1\RCS\Makefile,v | 8/19/1998 | 5400 |
| parsec\1.1.1\RCS\readme.txt,v | 8/27/1998 | 8100 |
| parsec\1.1.1\readme.txt | 8/27/1998 | 6800 |
| parsec\1.1.1\runtime\comm.h | 9/22/1998 | 1200 |
| parsec\1.1.1\runtime\comm__dummy.c | 9/22/1998 | 6500 |
| parsec\1.1.1\runtime\comm__mpi.c | 9/22/1998 | 10000 |
| parsec\1.1.1\runtime\comm__ntthread.c | 11/14/1998 | 10100 |
| parsec\1.1.1\runtime\comm__pthread.c | 11/11/1998 | 16500 |
| parsec\1.1.1\runtime\dlink.c | 3/25/1998 | 2000 |
| parsec\1.1.1\runtime\dlink.h | 2/25/1998 | 600 |
| parsec\1.1.1\runtime\equeue.h | 2/25/1998 | 500 |
| parsec\1.1.1\runtime\equeue__dlink.c | 3/25/1998 | 2100 |
| parsec\1.1.1\runtime\equeue__splay.c | 3/25/1998 | 5300 |
| parsec\1.1.1\runtime\jsetjmp.s | 2/25/1998 | 6700 |
| parsec\1.1.1\runtime\LICENSE | 2/25/1998 | 1500 |
| parsec\1.1.1\runtime\main.c | 12/8/1998 | 600 |
| parsec\1.1.1\runtime\Makefile-longlong-aix | 3/11/1998 | 1900 |
| parsec\1.1.1\runtime\Makefile-longlong-generic | 11/18/1998 | 1900 |
| parsec\1.1.1\runtime\Makefile-longlong-irix | 3/11/1998 | 1900 |
| parsec\1.1.1\runtime\Makefile-longlong-sun | 3/11/1998 | 1900 |
| parsec\1.1.1\runtime\Makefile-unsigned-aix | 3/11/1998 | 2100 |
| parsec\1.1.1\runtime\Makefile-unsigned-generic | 11/18/1998 | 2100 |
| parsec\1.1.1\runtime\Makefile-unsigned-irix | 3/11/1998 | 2100 |
| parsec\1.1.1\runtime\Makefile-unsigned-sun | 3/11/1998 | 2100 |
| parsec\1.1.1\runtime\makent.bat | 11/14/1998 | 1400 |
| parsec\1.1.1\runtime\mqueue.c | 12/8/1998 | 20900 |
| parsec\1.1.1\runtime\mqueue.h | 2/25/1998 | 1500 |
| parsec\1.1.1\runtime\ntsystime.c | 2/25/1998 | 500 |
| parsec\1.1.1\runtime\ntsystime.h | 6/19/1998 | 500 |
| parsec\1.1.1\runtime\parsec.h | 9/22/1998 | 14700 |
| parsec\1.1.1\runtime\random.c | 2/25/1998 | 4000 |
| parsec\1.1.1\runtime\RCS\api.h,v | 2/27/1998 | 3500 |
| parsec\1.1.1\runtime\RCS\clocktype.h,v | 8/6/1998 | 2600 |
| parsec\1.1.1\runtime\RCS\comm.h,v | 9/22/1998 | 2500 |
| parsec\1.1.1\runtime\RCS\comm__dummy.c,v | 9/22/1998 | 10200 |
| parsec\1.1.1\runtime\RCS\comm__mpi.c,v | 9/22/1998 | 13800 |
| parsec\1.1.1\runtime\RCS\comm__ntthread.c,v | 11/14/1998 | 15400 |
| parsec\1.1.1\runtime\RCS\comm__pthread.c,v | 11/11/1998 | 25700 |
| parsec\1.1.1\runtime\RCS\dlink.c,v | 3/25/1998 | 2400 |
| parsec\1.1.1\runtime\RCS\dlink.h,v | 2/25/1998 | 800 |
| parsec\1.1.1\runtime\RCS\equeue.h,v | 2/25/1998 | 700 |
| parsec\1.1.1\runtime\RCS\equeue__dlink.c,v | 3/25/1998 | 2500 |
| parsec\1.1.1\runtime\RCS\equeue__splay.c,v | 3/25/1998 | 5700 |
| parsec\1.1.1\runtime\RCS\jsetjmp.s,v | 2/25/1998 | 6900 |
| parsec\1.1.1\runtime\RCS\LICENSE,v | 2/25/1998 | 1700 |
| parsec\1.1.1\runtime\RCS\main.c,v | 12/8/1998 | 1500 |
| parsec\1.1.1\runtime\RCS\Makefile-longlong-aix,v | 3/11/1998 | 2600 |
| parsec\1.1.1\runtime\RCS\Makefile-longlong-generic,v | 3/11/1998 | 2600 |
| parsec\1.1.1\runtime\RCS\Makefile-longlong-irix,v | 3/11/1998 | 2400 |
| parsec\1.1.1\runtime\RCS\Makefile-longlong-sun,v | 3/11/1998 | 2600 |
| parsec\1.1.1\runtime\RCS\Makefile-unsigned-aix,v | 3/11/1998 | 2900 |
| parsec\1.1.1\runtime\RCS\Makefile-unsigned-generic,v | 3/11/1998 | 2800 |
| parsec\1.1.1\runtime\RCS\Makefile-unsigned-irix,v | 3/11/1998 | 2700 |
| parsec\1.1.1\runtime\RCS\Makefile-unsigned-sun,v | 3/11/1998 | 2900 |

-continued

| filename | creation date | size (bytes) |
|---|---|---|
| parsec\1.1.1\runtime\RCS\makent.bat,v | 11/14/1998 | 4000 |
| parsec\1.1.1\runtime\RCS\mqueue.c,v | 12/8/1998 | 23200 |
| parsec\1.1.1\runtime\RCS\mqueue.h,v | 2/25/1998 | 1700 |
| parsec\1.1.1\runtime\RCS\ntsystime.c,v | 2/25/1998 | 700 |
| parsec\1.1.1\runtime\RCS\ntsystime.h,v | 6/19/1998 | 900 |
| parsec\1.1.1\runtime\RCS\ntvalues.h,v | 2/25/1998 | 500 |
| parsec\1.1.1\runtime\RCS\parsec.v | 9/22/1998 | 18700 |
| parsec\1.1.1\runtime\RCS\random.c,v | 2/25/1998 | 4200 |
| parsec\1.1.1\runtime\RCS\shared_lib.c,v | 3/11/1998 | 42200 |
| parsec\1.1.1\runtime\RCS\splay.c,v | 2/25/1998 | 8300 |
| parsec\1.1.1\runtime\RCS\splay.h,v | 2/25/1998 | 600 |
| parsec\1.1.1\runtime\RCS\sync.h,v | 3/11/1998 | 7500 |
| parsec\1.1.1\runtime\RCS\sync_cons.c,v | 3/11/1998 | 160700 |
| parsec\1.1.1\runtime\RCS\sync_gel.c,v | 3/11/1998 | 26100 |
| parsec\1.1.1\runtime\RCS\sync_isp.c,v | 3/11/1998 | 34700 |
| parsec\1.1.1\runtime\RCS\sync_mpc.c,v | 3/11/1998 | 32200 |
| parsec\1.1.1\runtime\shared_lib.c | 3/11/1998 | 25200 |
| parsec\1.1.1\runtime\splay.c | 2/25/1998 | 8200 |
| parsec\1.1.1\runtime\splay.h | 2/25/1998 | 400 |
| parsec\1.1.1\runtime\sync.h | 3/11/1998 | 4100 |
| parsec\1.1.1\runtime\sync_cons.c | 3/11/1998 | 79000 |
| parsec\1.1.1\runtime\sync_gel.c | 3/11/1998 | 19300 |
| parsec\1.1.1\runtime\sync_isp.c | 3/11/1998 | 34500 |
| parsec\1.1.1\runtime\sync_mpc.c | 3/11/1998 | 23900 |
| parsec\1.1\compiler\cat.c | 11/3/1998 | 6600 |
| parsec\1.1\compiler\cat.h | 2/25/1998 | 300 |
| parsec\1.1\compiler\decl.c | 8/19/1998 | 10100 |
| parsec\1.1\compiler\decl.h | 2/25/1998 | 600 |
| parsec\1.1\compiler\entity.c | 3/6/1998 | 3000 |
| parsec\1.1\compiler\entity.h | 2/25/1998 | 400 |
| parsec\1.1\compiler\error.c | 2/25/1998 | 1900 |
| parsec\1.1\compiler\error.h | 2/25/1998 | 200 |
| parsec\1.1\compiler\lex.yy.c | 12/8/1998 | 58900 |
| parsec\1.1\compiler\Makefile-aix | 8/14/1998 | 500 |
| parsec\1.1\compiler\Makefile-generic | 8/13/1998 | 500 |
| parsec\1.1\compiler\Makefile-sun | 8/13/1998 | 500 |
| parsec\1.1\compiler\makent.bat | 8/20/1998 | 100 |
| parsec\1.1\compiler\message.c | 2/25/1998 | 900 |
| parsec\1.1\compiler\message.h | 2/25/1998 | 100 |
| parsec\1.1\compiler\parser.h | 10/3/1998 | 300 |
| parsec\1.1\compiler\parser.l | 12/8/1998 | 6700 |
| parsec\1.1\compiler\parser.tab.c | 8/19/1998 | 203200 |
| parsec\1.1\compiler\parser.tab.h | 8/19/1998 | 2500 |
| parsec\1.1\compiler\parser.y | 8/19/1998 | 119300 |
| parsec\1.1\compiler\pcc.c | 8/19/1998 | 38700 |
| parsec\1.1\compiler\pcc.h | 12/8/1998 | 400 |
| parsec\1.1\compiler\RCS\cat.c,v | 11/3/1998 | 7400 |
| parsec\1.1\compiler\RCS\cat.h,v | 2/25/1998 | 500 |
| parsec\1.1\compiler\RCS\decl.c,v | 8/19/1998 | 10800 |
| parsec\1.1\compiler\RCS\decl.h,v | 2/25/1998 | 900 |
| parsec\1.1\compiler\RCS\entity.c,v | 3/6/1998 | 3800 |
| parsec\1.1\compiler\RCS\entity.h,v | 2/25/1998 | 600 |
| parsec\1.1\compiler\RCS\error.c,v | 2/25/1998 | 2100 |
| parsec\1.1\compiler\RCS\error.h,v | 2/25/1998 | 400 |
| parsec\1.1\compiler\RCS\Makefile,v | 8/13/1998 | 1800 |
| parsec\1.1\compiler\RCS\Makefile-aix,v | 8/14/1998 | 700 |
| parsec\1.1\compiler\RCS\Makefile-generic,v | 8/14/1998 | 700 |
| parsec\1.1\compiler\RCS\Makefile-sun,v | 8/14/1998 | 700 |
| parsec\1.1\compiler\RCS\makent.bat,v | 8/20/1998 | 1000 |
| parsec\1.1\compiler\RCS\message.c,v | 2/25/1998 | 1100 |
| parsec\1.1\compiler\RCS\message.h,v | 2/25/1998 | 400 |
| parsec\1.1\compiler\RCS\parser.h,v | 10/3/1998 | 800 |
| parsec\1.1\compiler\RCS\parser.l,v | 12/8/1998 | 12700 |
| parsec\1.1\compiler\RCS\parser.y,v | 8/19/1998 | 136700 |
| parsec\1.1\compiler\RCS\pcc.c,v | 8/19/1998 | 58500 |
| parsec\1.1\compiler\RCS\pcc.h,v | 12/8/1998 | 1100 |
| parsec\1.1\compiler\RCS\type.c,v | 2/25/1998 | 10800 |
| parsec\1.1\compiler\RCS\type.h,v | 2/25/1998 | 2800 |
| parsec\1.1\compiler\type.c | 2/25/1998 | 10500 |
| parsec\1.1\compiler\type.h | 2/25/1998 | 2600 |
| parsec\1.1\doc\help.txt | 12/8/1998 | 1100 |
| parsec\1.1\doc\RCS\help.txt,v | 12/8/1998 | 2100 |
| parsec\1.1\include\clocktype.h | 8/13/1998 | 2000 |
| parsec\1.1\include\pc_api.h | 12/8/1998 | 5900 |
| parsec\1.1\include\pcc_api.h | 8/20/1998 | 700 |
| parsec\1.1\include\RCS\clocktype.h,v | 8/13/1998 | 5400 |
| parsec\1.1\include\RCS\pc_api.h,v | 12/8/1998 | 8900 |

-continued

| filename | creation date | size (bytes) |
|---|---|---|
| parsec\1.1\include\RCS\pc__macros.h,v | 2/25/1998 | 1900 |
| parsec\1.1\include\RCS\pcc__api.h,v | 3/15/1998 | 1100 |
| parsec\1.1\include\RCS\pcc__defs.h,v | 7/15/1998 | 3000 |
| parsec\1.1\include\RCS\preload.c,v | 6/22/1998 | 1900 |
| parsec\1.1\install-aix | 8/19/1998 | 100 |
| parsec\1.1\install-irix | 8/19/1998 | 200 |
| parsec\1.1\install-linux | 8/19/1998 | 200 |
| parsec\1.1\install-solaris | 8/19/1998 | 700 |
| parsec\1.1\install-x86-solaris | 8/19/1998 | 400 |
| parsec\1.1\license.txt | 8/20/1998 | 1500 |
| parsec\1.1\Makefile | 8/19/1998 | 1800 |
| parsec\1.1\RCS\license.txt,v | 8/20/1998 | 1700 |
| parsec\1.1\RCS\Makefile,v | 8/19/1998 | 5400 |
| parsec\1.1\RCS\readme.txt,v | 8/20/1998 | 6600 |
| parsec\1.1\readme.txt | 8/20/1998 | 6300 |
| parsec\1.1\runtime\comm.h | 6/23/1998 | 1200 |
| parsec\1.1\runtime\comm__dummy.c | 12/8/1998 | 6600 |
| parsec\1.1\runtime\comm__mpi.c | 12/8/1998 | 9300 |
| parsec\1.1\runtime\comm__ntthread.c | 12/8/1998 | 8900 |
| parsec\1.1\runtime\comm__pthread.c | 12/8/1998 | 15700 |
| parsec\1.1\runtime\dlink.c | 3/25/1998 | 2000 |
| parsec\1.1\runtime\dlink.h | 2/25/1998 | 600 |
| parsec\1.1\runtime\equeue.h | 2/25/1998 | 500 |
| parsec\1.1\runtime\equeue__dlink.c | 3/25/1998 | 2100 |
| parsec\1.1\runtime\equeue__splay.c | 3/25/1998 | 5300 |
| parsec\1.1\runtime\jsetjmp.s | 2/25/1998 | 6700 |
| parsec\1.1\runtime\LICENSE | 2/25/1998 | 1500 |
| parsec\1.1\runtime\main.c | 12/8/1998 | 600 |
| parsec\1.1\runtime\Makefile-longlong-aix | 8/14/1998 | 1700 |
| parsec\1.1\runtime\Makefile-longlong-generic | 8/13/1998 | 1700 |
| parsec\1.1\runtime\Makefile-longlong-sun | 8/13/1998 | 1700 |
| parsec\1.1\runtime\Makefile-unsigned-aix | 8/14/1998 | 1900 |
| parsec\1.1\runtime\Makefile-unsigned-generic | 8/13/1998 | 1900 |
| parsec\1.1\runtime\Makefile-unsigned-sun | 8/13/1998 | 1900 |
| parsec\1.1\runtime\makent.bat | 8/20/1998 | 900 |
| parsec\1.1\runtime\mqueue.c | 12/8/1998 | 20900 |
| parsec\1.1\runtime\mqueue.h | 2/25/1998 | 1500 |
| parsec\1.1\runtime\ntsystime.c | 2/25/1998 | 500 |
| parsec\1.1\runtime\ntsystime.h | 6/19/1998 | 500 |
| parsec\1.1\runtime\parsec.h | 12/8/1998 | 14500 |
| parsec\1.1\runtime\random.c | 2/25/1998 | 4000 |
| parsec\1.1\runtime\RCS\api.h,v | 2/27/1998 | 3500 |
| parsec\1.1\runtime\RCS\clocktype.h,v | 8/6/1998 | 2600 |
| parsec\1.1\runtime\RCS\comm.h,v | 6/23/1998 | 2000 |
| parsec\1.1\runtime\RCS\comm__dummy.c,v | 12/8/1998 | 9800 |
| parsec\1.1\runtime\RCS\comm__mpi.c,v | 12/8/1998 | 11000 |
| parsec\1.1\runtime\RCS\comm__ntthread.c,v | 12/8/1998 | 10400 |
| parsec\1.1\runtime\RCS\comm__pthread.c,v | 12/8/1998 | 22300 |
| parsec\1.1\runtime\RCS\dlink.c,v | 3/25/1998 | 2400 |
| parsec\1.1\runtime\RCS\dlink.h,v | 2/25/1998 | 800 |
| parsec\1.1\runtime\RCS\equeue.h,v | 2/25/1998 | 700 |
| parsec\1.1\runtime\RCS\equeue__dlink.c,v | 3/25/1998 | 2500 |
| parsec\1.1\runtime\RCS\equeue__splay.c,v | 3/25/1998 | 5700 |
| parsec\1.1\runtime\RCS\jsetjmp.s,v | 2/25/1998 | 6900 |
| parsec\1.1\runtime\RCS\LICENSE,v | 2/25/1998 | 1700 |
| parsec\1.1\runtime\RCS\main.c,v | 12/8/1998 | 1500 |
| parsec\1.1\runtime\RCS\Makefile,v | 5/8/1998 | 3500 |
| parsec\1.1\runtime\RCS\Makefile-longlong-aix,v | 8/14/1998 | 2000 |
| parsec\1.1\runtime\RCS\Makefile-longlong-generic,v | 8/13/1998 | 2000 |
| parsec\1.1\runtime\RCS\Makefile-longlong-sun,v | 8/13/1998 | 2000 |
| parsec\1.1\runtime\RCS\Makefile-unsigned-aix,v | 8/14/1998 | 2200 |
| parsec\1.1\runtime\RCS\Makefile-unsigned-generic,v | 8/13/1998 | 2100 |
| parsec\1.1\runtime\RCS\Makefile-unsigned-sun,v | 8/13/1998 | 2100 |
| parsec\1.1\runtime\RCS\makent.bat,v | 8/20/1998 | 3400 |
| parsec\1.1\runtime\RCS\mqueue.c,v | 12/8/1998 | 23200 |
| parsec\1.1\runtime\RCS\mqueue.h,v | 2/25/1998 | 1700 |
| parsec\1.1\runtime\RCS\ntsystime.c,v | 2/25/1998 | 700 |
| parsec\1.1\runtime\RCS\ntsystime.h,v | 6/19/1998 | 900 |
| parsec\1.1\runtime\RCS\ntvalues.h,v | 2/25/1998 | 500 |
| parsec\1.1\runtime\RCS\parsec.h,v | 12/8/1998 | 17800 |
| parsec\1.1\runtime\RCS\random.c,v | 2/25/1998 | 4200 |
| parsec\1.1\runtime\RCS\shared__lib.c,v | 8/13/1998 | 40900 |
| parsec\1.1\runtime\RCS\splay.c,v | 2/25/1998 | 8300 |
| parsec\1.1\runtime\RCS\splay.h,v | 2/25/1998 | 600 |
| parsec\1.1\runtime\RCS\sync.h,v | 6/30/1998 | 3900 |
| parsec\1.1\runtime\RCS\sync__cons.c,v | 8/14/1998 | 101500 |
| parsec\1.1\runtime\RCS\sync__gel.c,v | 4/8/1998 | 23300 |

-continued

| filename | creation date | size (bytes) |
|---|---|---|
| parsec\1.1\runtime\RCS\sync_mpc.c,v | 12/8/1998 | 30900 |
| parsec\1.1\runtime\shared_lib.c | 8/13/1998 | 25200 |
| parsec\1.1\runtime\splay.c | 2/25/1998 | 8200 |
| parsec\1.1\runtime\splay.h | 2/25/1998 | 400 |
| parsec\1.1\runtime\sync.h | 6/7/1998 | 3200 |
| parsec\1.1\runtime\sync_cons.c | 8/14/1998 | 76800 |
| parsec\1.1\runtime\syncgel.c | 4/8/1998 | 17500 |
| parsec\1.1\runtime\sync_mpc.c | 12/8/1998 | 23400 |
| parsec\1.1-complete\compiler\cat.c | 11/3/1998 | 6600 |
| parsec\1.1-complete\compiler\cat.h | 2/25/1998 | 300 |
| parsec\1.1-complete\compiler\decl.c | 7/20/2000 | 10100 |
| parsec\1.1-complete\compiler\decl.h | 11/10/1999 | 600 |
| parsec\1.1-complete\compiler\entity.c | 11/11/1998 | 3000 |
| parsec\1.1-complete\compiler\entity.h | 11/17/1998 | 400 |
| parsec\1.1-complete\compiler\error.c | 2/25/1998 | 1900 |
| parsec\1.1-complete\compiler\error.h | 2/25/1998 | 200 |
| parsec\1.1-complete\compiler\lex.yy.c | 11/14/1998 | 58900 |
| parsec\1.1-complete\compiler\Makefile | 1/10/1998 | 500 |
| parsec\1.1-complete\compiler\Makefile-aix | 8/14/1998 | 500 |
| parsec\1.1-complete\compiler\Makefile-generic | 8/13/1998 | 500 |
| parsec\1.1-complete\compiler\Makefile-irix | 8/10/1998 | 500 |
| parsec\1.1-complete\compiler\Makefile-sun | 8/13/1998 | 500 |
| parsec\1.1-complete\compiler\makent.bat | 7/20/2000 | 100 |
| parsec\1.1-complete\compiler\message.c | 2/25/1998 | 900 |
| parsec\1.1-complete\compiler\message.h | 2/25/1998 | 100 |
| parsec\1.1-complete\compiler\parser.h | 10/3/1998 | 300 |
| parsec\1.1-complete\compiler\parser.l | 11/14/1998 | 6700 |
| parsec\1.1-complete\compiler\parser.tab.c | 7/20/2000 | 209100 |
| parsec\1.1-complete\compiler\parser.tab.h | 7/20/2000 | 2500 |
| parsec\1.1-complete\compiler\parser.y | 7/20/2000 | 121800 |
| parsec\1.1-complete\compiler\pcc.c | 7/20/2000 | 39600 |
| parsec\1.1-complete\compiler\pcc.h | 7/20/2000 | 500 |
| parsec\1.1-complete\compiler\RCS\cat.c,v | 11/3/1998 | 7400 |
| parsec\1.1-complete\compiler\RCS\cat.h,v | 2/25/1998 | 500 |
| parsec\1.1-complete\compiler\RCS\decl.c,v | 7/20/2000 | 11000 |
| parsec\1.1-complete\compiler\RCS\decl.h,v | 2/21/2000 | 1300 |
| parsec\1.1-complete\compiler\RCS\entity.c,v | 3/6/1998 | 3800 |
| parsec\1.1-complete\compiler\RCS\entity.h,v | 11/17/1998 | 800 |
| parsec\1.1-complete\compiler\RCS\error.c,v | 2/25/1998 | 2100 |
| parsec\1.1-complete\compiler\RCS\error.h,v | 2/25/1998 | 400 |
| parsec\1.1-complete\compiler\RCS\Makefile,v | 8/13/1998 | 1800 |
| parsec\1.1-complete\compiler\RCS\Makefile-aix,v | 8/14/1998 | 700 |
| parsec\1.1-complete\compiler\RCS\Makefile-generic,v | 8/14/1998 | 700 |
| parsec\1.1-complete\compiler\RCS\Makefile-sun,v | 8/14/1998 | 700 |
| parsec\1.1-complete\compiler\RCS\makent.bat,v | 7/20/2000 | 1300 |
| parsec\1.1-complete\compiler\RCS\message.c,v | 2/25/1998 | 1100 |
| parsec\1.1-complete\compiler\RCS\message.h,v | 2/25/1998 | 400 |
| parsec\1.1-complete\compiler\RCS\parser.h,v | 10/3/1998 | 800 |
| parsec\1.1-complete\compiler\RCS\parser.l,v | 11/14/1998 | 12900 |
| parsec\1.1-complete\compiler\RCS\parser.y,v | 7/20/2000 | 142600 |
| parsec\1.1-complete\compiler\RCS\pcc.c,v | 7/20/2000 | 63800 |
| parsec\1.1-complete\compiler\RCS\pcc.h,v | 7/20/2000 | 1500 |
| parsec\1.1-complete\compiler\RCS\type.c,v | 2/25/1998 | 10800 |
| parsec\1.1-complete\compiler\RCS\type.h,v | 1/25/1999 | 3500 |
| parsec\1.1-complete\compiler\type.c | 2/25/1998 | 10500 |
| parsec\1.1-complete\compiler\type.h | 1/25/1999 | 2600 |
| parsec\1.1-complete\doc\help.txt | 12/8/1998 | 1100 |
| parsec\1.1-complete\doc\RCS\help.txt,v | 12/8/1998 | 2100 |
| parsec\1.1-complete\include\clocktype.h | 6/22/1999 | 2400 |
| parsec\1.1-complete\include\pc_api.h | 7/21/2000 | 6900 |
| parsec\1.1-complete\include\RCS\clocktype.h,v | 6/22/1999 | 9200 |
| parsec\1.1-complete\include\RCS\pc_api.h | 8/23/1998 | 5900 |
| parsec\1.1-complete\include\RCS\pc_api.h,v | 7/21/2000 | 11900 |
| parsec\1.1-complete\include\RCS\pc_macros.h,v | 2/25/1998 | 1900 |
| parsec\1.1-complete\include\RCS\pcc_api.h,v | 3/15/1998 | 1100 |
| parsec\1.1-complete\include\RCS\pcc_defs.h,v | 7/15/1998 | 3000 |
| parsec\1.1-complete\include\RCS\preload.c,v | 6/22/1998 | 1900 |
| parsec\1.1-complete\install-aix | 8/19/1998 | 100 |
| parsec\1.1-complete\install-irix | 9/30/1999 | 400 |
| parsec\1.1-complete\install-linux | 8/24/2000 | 200 |
| parsec\1.1-complete\install-solaris | 10/30/1998 | 700 |
| parsec\1.1-complete\install-x86-solaris | 8/19/1998 | 400 |
| parsec\1.1-complete\license.txt | 8/20/1998 | 1500 |
| parsec\1.1-complete\Makefile | 8/31/2000 | 2100 |
| parsec\1.1-complete\Makefile.gprof | 6/10/1998 | 1800 |
| parsec\1.1-complete\optruntime\basictypes.h | 7/21/2000 | 1900 |
| parsec\1.1-complete\optruntime\clustergvtcalc.h | 11/12/1998 | 9600 |

-continued

| filename | creation date | size (bytes) |
|---|---|---|
| parsec\1.1-complete\optruntime\commsystemsp.h | 11/12/1998 | 2000 |
| parsec\1.1-complete\optruntime\compose.h | 11/12/1998 | 100 |
| parsec\1.1-complete\optruntime\composegcc.h | 11/12/1998 | 900 |
| parsec\1.1-complete\optruntime\component.h | 11/12/1998 | 700 |
| parsec\1.1-complete\optruntime\datastructures.h | 7/21/2000 | 59500 |
| parsec\1.1-complete\optruntime\distgvtcalculator.h | 11/12/1998 | 4400 |
| parsec\1.1-complete\optruntime\entitymanager.h | 11/12/1998 | 8400 |
| parsec\1.1-complete\optruntime\flushsparcregwindows.cpp | 11/12/1998 | 600 |
| parsec\1.1-complete\optruntime\gvtcalculator.h | 11/12/1998 | 4400 |
| parsec\1.1-complete\optruntime\gvtcommsys.h | 11/12/1998 | 100 |
| parsec\1.1-complete\optruntime\gvtcommsysdummy.h | 11/12/1998 | 1300 |
| parsec\1.1-complete\optruntime\gvtcommsysp.h | 11/12/1998 | 4900 |
| parsec\1.1-complete\optruntime\main.cpp | 11/12/1998 | 400 |
| parsec\1.1-complete\optruntime\makeall.bat | 11/12/1998 | 100 |
| parsec\1.1-complete\optruntime\makent.bat | 11/12/1998 | 300 |
| parsec\1.1-complete\optruntime\makentall.bat | 11/12/1998 | 100 |
| parsec\1.1-complete\optruntime\makentdeb.bat | 11/12/1998 | 300 |
| parsec\1.1-complete\optruntime\makentdebug.bat | 11/12/1998 | 300 |
| parsec\1.1-complete\optruntime\makentll.bat | 11/12/1998 | 300 |
| parsec\1.1-complete\optruntime\makentlldeb.bat | 11/12/1998 | 300 |
| parsec\1.1-complete\optruntime\makentlldebug.bat | 11/12/1998 | 300 |
| parsec\1.1-complete\optruntime\makesgi | 7/21/2000 | 200 |
| parsec\1.1-complete\optruntime\makesgiall | 7/18/1999 | 100 |
| parsec\1.1-complete\optruntime\makesgidebug | 7/21/2000 | 200 |
| parsec\1.1-complete\optruntime\makesgill | 7/21/2000 | 200 |
| parsec\1.1-complete\optruntime\makesgilldebug | 7/21/2000 | 200 |
| parsec\1.1-complete\optruntime\makesun | 3/9/1999 | 300 |
| parsec\1.1-complete\optruntime\makesundebug | 11/12/1998 | 300 |
| parsec\1.1-complete\optruntime\makesunegcs | 11/12/1998 | 300 |
| parsec\1.1-complete\optruntime\makesunegcsdebug | 11/12/1998 | 300 |
| parsec\1.1-complete\optruntime\makesunll | 11/12/1998 | 300 |
| parsec\1.1-complete\optruntime\makesunlldebug | 11/12/1998 | 300 |
| parsec\1.1-complete\optruntime\memorymanager.h | 7/21/2000 | 15800 |
| parsec\1.1-complete\optruntime\message.h | 11/12/1998 | 5000 |
| parsec\1.1-complete\optruntime\messagemap.h | 11/12/1998 | 2000 |
| parsec\1.1-complete\optruntime\messagequeue.h | 11/12/1998 | 9200 |
| parsec\1.1-complete\optruntime\mtmemorybuffer.h | 11/12/1998 | 3700 |
| parsec\1.1-complete\optruntime\mtmemorycache.h | 11/12/1998 | 7000 |
| parsec\1.1-complete\optruntime\nullmessagesys.h | 11/12/1998 | 9400 |
| parsec\1.1-complete\optruntime\oddsandends.h | 11/12/1998 | 2200 |
| parsec\1.1-complete\optruntime\oldopt\basictypes.h | 3/15/1999 | 1800 |
| parsec\1.1-complete\optruntime\oldopt\clustergvtcalc.h | 11/12/1998 | 9300 |
| parsec\1.1-complete\optruntime\oldopt\commsystemsp.h | 11/12/1998 | 1900 |
| parsec\1.1-complete\optruntime\oldopt\compose.h | 11/12/1998 | 100 |
| parsec\1.1-complete\optruntime\oldopt\composegcc.h | 11/12/1998 | 800 |
| parsec\1.1-complete\optruntime\oldopt\component.h | 11/12/1998 | 700 |
| parsec\1.1-complete\optruntime\oldopt\datastructures.h | 11/12/1998 | 68900 |
| parsec\1.1-complete\optruntime\oldopt\distgvtcalculator.h | 11/12/1998 | 4300 |
| parsec\1.1-complete\optruntime\oldopt\entitymanager.h | 11/12/1998 | 8200 |
| parsec\1.1-complete\optruntime\oldopt\flushsparcregwindows.cpp | 11/12/1998 | 600 |
| parsec\1.1-complete\optruntime\oldopt\gvtcalculator.h | 11/12/1998 | 4200 |
| parsec\1.1-complete\optruntime\oldopt\gvtcommsys.h | 11/12/1998 | 100 |
| parsec\1.1-complete\optruntime\oldopt\gvtcommsysdummy.h | 11/12/1998 | 1200 |
| parsec\1.1-complete\optruntime\oldopt\gvtcommsysp.h | 11/12/1998 | 4800 |
| parsec\1.1-complete\optruntime\oldopt\main.cpp | 11/12/1998 | 400 |
| parsec\1.1-complete\optruntime\oldopt\makeall.bat | 11/12/1998 | 100 |
| parsec\1.1-complete\optruntime\oldopt\makent.bat | 11/12/1998 | 300 |
| parsec\1.1-complete\optruntime\oldopt\makentall.bat | 11/12/1998 | 100 |
| parsec\1.1-complete\optruntime\oldopt\makentdeb.bat | 11/12/1998 | 300 |
| parsec\1.1-complete\optruntime\oldopt\makentdebug.bat | 11/12/1998 | 300 |
| parsec\1.1-complete\optruntime\oldopt\makentll.bat | 11/12/1998 | 300 |
| parsec\1.1-complete\optruntime\oldopt\makentlldeb.bat | 11/12/1998 | 300 |
| parsec\1.1-complete\optruntime\oldopt\makentlldebug.bat | 11/12/1998 | 300 |
| parsec\1.1-complete\optruntime\oldopt\makesgi | 7/19/1999 | 200 |
| parsec\1.1-complete\optruntime\oldopt\makesgiall | 7/19/1999 | 0 |
| parsec\1.1-complete\optruntime\oldopt\makesgidebug | 7/19/1999 | 200 |
| parsec\1.1-complete\optruntime\oldopt\makesgill | 7/19/1999 | 200 |
| parsec\1.1-complete\optruntime\oldopt\makesgilldebug | 7/19/1999 | 200 |
| parsec\1.1-complete\optruntime\oldopt\makesun | 3/9/1999 | 300 |
| parsec\1.1-complete\optruntime\oldopt\makesundebug | 11/12/1998 | 300 |
| parsec\1.1-complete\optruntime\oldopt\makesunegcs | 11/12/1998 | 200 |
| parsec\1.1-complete\optruntime\oldopt\makesunegcsdebug | 11/12/1998 | 300 |
| parsec\1.1-complete\optruntime\oldopt\makesunll | 11/12/1998 | 300 |
| parsec\1.1-complete\optruntime\oldopt\makesunlldebug | 11/12/1998 | 300 |
| parsec\1.1-complete\optruntime\oldopt\memorymanager.h | 9/22/1999 | 15500 |
| parsec\1.1-complete\optruntime\oldopt\message.h | 11/12/1998 | 4800 |
| parsec\1.1-complete\optruntime\oldopt\messagemap.h | 11/12/1998 | 1900 |

-continued

| filename | creation date | size (bytes) |
|---|---|---|
| parsec\1.1-complete\optruntime\oldopt\messagequeue.h | 11/12/1998 | 8900 |
| parsec\1.1-complete\optruntime\oldopt\mtmemorybuffer.h | 11/12/1998 | 3600 |
| parsec\1.1-complete\optruntime\oldopt\mtmemorycache.h | 11/12/1998 | 6800 |
| parsec\1.1-complete\optruntime\oldopt\nullmessagesys.h | 11/12/1998 | 9100 |
| parsec\1.1-complete\optruntime\oldopt\oddsandends.h | 11/12/1998 | 2100 |
| parsec\1.1-complete\optruntime\oldopt\random.cpp | 11/12/1998 | 3900 |
| parsec\1.1-complete\optruntime\oldopt\rollbackable.h | 11/12/1998 | 1000 |
| parsec\1.1-complete\optruntime\oldopt\rollbackableprintf.h | 11/12/1998 | 4000 |
| parsec\1.1-complete\optruntime\oldopt\runtime.cpp | 9/27/1999 | 87400 |
| parsec\1.1-complete\optruntime\oldopt\runtimeentity.h | 3/15/1999 | 21600 |
| parsec\1.1-complete\optruntime\oldopt\sharedclockvar.h | 11/12/1998 | 900 |
| parsec\1.1-complete\optruntime\oldopt\smart.h | 11/12/1998 | 8000 |
| parsec\1.1-complete\optruntime\oldopt\splaytree.h | 11/12/1998 | 14600 |
| parsec\1.1-complete\optruntime\oldopt\startnt.cpp | 11/12/1998 | 2800 |
| parsec\1.1-complete\optruntime\oldopt\startpthread.cpp | 11/12/1998 | 3100 |
| parsec\1.1-complete\optruntime\oldopt\startstuff.h | 11/12/1998 | 900 |
| parsec\1.1-complete\optruntime\oldopt\sysmessages.h | 11/12/1998 | 6500 |
| parsec\1.1-complete\optruntime\oldopt\sysstuff.h | 11/12/1998 | 100 |
| parsec\1.1-complete\optruntime\oldopt\sysstuffnt.h | 11/12/1998 | 3100 |
| parsec\1.1-complete\optruntime\oldopt\sysstuffpthread.h | 11/12/1998 | 2500 |
| parsec\1.1-complete\optruntime\oldopt\sysstuffsp.h | 11/12/1998 | 2700 |
| parsec\1.1-complete\optruntime\oldopt\threadsystem.cpp | 3/15/1999 | 8500 |
| parsec\1.1-complete\optruntime\oldopt\threadsystem.h | 11/12/1998 | 3200 |
| parsec\1.1-complete\optruntime\oldopt\typeinfo.h | 11/12/1998 | 1100 |
| parsec\1.1-complete\optruntime\oldopt\x\basictypes.h | 7/21/2000 | 1900 |
| parsec\1.1-complete\optruntime\oldopt\x\datastructures.h | 7/21/2000 | 59500 |
| parsec\1.1-complete\optruntime\oldopt\x\memorymanager.h | 7/21/2000 | 15800 |
| parsec\1.1-complete\optruntime\oldopt\x\rollbackableprintf.h | 7/21/2000 | 4100 |
| parsec\1.1-complete\optruntime\oldopt\x\runtime.cpp | 7/21/2000 | 89900 |
| parsec\1.1-complete\optruntime\oldopt\x\runtimeentity.h | 7/21/2000 | 22500 |
| parsec\1.1-complete\optruntime\oldopt\x\threadsystem.cpp | 7/21/2000 | 8700 |
| parsec\1.1-complete\optruntime\random.cpp | 11/12/1998 | 4000 |
| parsec\1.1-complete\optruntime\rollbackable.h | 11/12/1998 | 1100 |
| parsec\1.1-complete\optruntime\rollbackableprintf.h | 7/21/2000 | 4100 |
| parsec\1.1-complete\optruntime\runtime.cpp | 7/21/2000 | 89900 |
| parsec\1.1-complete\optruntime\runtimeentity.h | 7/21/2000 | 22500 |
| parsec\1.1-complete\optruntime\sharedclockvar.h | 11/12/1998 | 900 |
| parsec\1.1-complete\optruntime\smart.h | 11/12/1998 | 8400 |
| parsec\1.1-complete\optruntime\splaytree.h | 11/12/1998 | 15000 |
| parsec\1.1-complete\optruntime\startnt.cpp | 11/12/1998 | 2900 |
| parsec\1.1-complete\optruntime\startpthread.cpp | 11/12/1998 | 3300 |
| parsec\1.1-complete\optruntime\startstuff.h | 11/12/1998 | 1000 |
| parsec\1.1-complete\optruntime\sysmessages.h | 11/12/1998 | 6800 |
| parsec\1.1-complete\optruntime\sysstuff.h | 11/12/1998 | 100 |
| parsec\1.1-complete\optruntime\sysstuffnt.h | 11/12/1998 | 3200 |
| parsec\1.1-complete\optruntime\sysstuffpthread.h | 11/12/1998 | 2600 |
| parsec\1.1-complete\optruntime\sysstuffsp.h | 11/12/1998 | 2800 |
| parsec\1.1-complete\optruntime\threadsystem.cpp | 7/21/2000 | 8700 |
| parsec\1.1-complete\optruntime\threadsystem.h | 11/12/1998 | 3300 |
| parsec\1.1-complete\optruntime\typeinfo.h | 11/12/1998 | 1100 |
| parsec\1.1-complete\RCS\license.txt,v | 8/20/1998 | 1700 |
| parsec\1.1-complete\RCS\Makefile,v | 9/30/1999 | 5800 |
| parsec\1.1-complete\RCS\readme.txt,v | 8/27/1998 | 8100 |
| parsec\1.1-complete\readme.txt | 8/27/1998 | 6800 |
| parsec\1.1-complete\runtime\comm.h | 8/25/2000 | 1200 |
| parsec\1.1-complete\runtime\comm__dummy.c | 9/24/2000 | 7100 |
| parsec\1.1-complete\runtime\comm__mpi.c | 9/24/2000 | 12100 |
| parsec\1.1-complete\runtime\comm__ntthread.c | 9/24/2000 | 10400 |
| parsec\1.1-complete\runtime\comm__pthread.c | 9/24/2000 | 21800 |
| parsec\1.1-complete\runtime\dlink.c | 2/21/1999 | 2000 |
| parsec\1.1-complete\runtime\dlink.h | 2/25/1998 | 600 |
| parsec\1.1-complete\runtime\equeue.h | 2/25/1998 | 500 |
| parsec\1.1-complete\runtime\equeue__dlink.c | 2/21/1999 | 2200 |
| parsec\1.1-complete\runtime\equeue__splay.c | 2/21/1999 | 5300 |
| parsec\1.1-complete\runtime\jsetjmp.s | 2/25/1998 | 6700 |
| parsec\1.1-complete\runtime\LICENSE | 2/25/1998 | 1500 |
| parsec\1.1-complete\runtime\main.c | 12/8/1998 | 600 |
| parsec\1.1-complete\runtime\Makefile-longlong-aix | 2/14/1999 | 1900 |
| parsec\1.1-complete\runtime\Makefile-longlong-generic | 4/4/1999 | 1900 |
| parsec\1.1-complete\runtime\Makefile-longlong-irix | 7/18/1999 | 1900 |
| parsec\1.1-complete\runtime\Makefile-longlong-sun | 2/14/1999 | 1900 |
| parsec\1.1-complete\runtime\Makefile-unsigned-aix | 2/14/1999 | 2100 |
| parsec\1.1-complete\runtime\Makefile-unsigned-generic | 8/31/2000 | 2100 |
| parsec\1.1-complete\runtime\Makefile-unsigned-irix | 7/18/1999 | 2100 |
| parsec\1.1-complete\runtime\Makefile-unsigned-sun | 2/14/1999 | 2100 |
| parsec\1.1-complete\runtime\makent.bat | 7/21/2000 | 1500 |
| parsec\1.1-complete\runtime\mqueue.c | 8/25/2000 | 20900 |

-continued

| filename | creation date | size (bytes) |
|---|---|---|
| parsec\1.1-complete\runtime\mqueue.h | 8/25/2000 | 1500 |
| parsec\1.1-complete\runtime\mqueuenew.c | 8/25/2000 | 24600 |
| parsec\1.1-complete\runtime\mqueuenew.h | 8/25/2000 | 1700 |
| parsec\1.1-complete\runtime\ntsystime.c | 2/25/1998 | 500 |
| parsec\1.1-complete\runtime\ntsystime.h | 6/19/1998 | 500 |
| parsec\1.1-complete\runtime\parsec.h | 8/25/2000 | 14800 |
| parsec\1.1-complete\runtime\random.c | 2/25/1998 | 4000 |
| parsec\1.1-complete\runtime\RCS\api.h,v | 2/27/1998 | 3500 |
| parsec\1.1-complete\runtime\RCS\clocktype.h,v | 8/6/1998 | 2600 |
| parsec\1.1-complete\runtime\RCS\comm.h,v | 8/24/2000 | 2800 |
| parsec\1.1-complete\runtime\RCS\comm_dummy.c,v | 9/24/2000 | 12500 |
| parsec\1.1-complete\runtime\RCS\comm_mpi.c,v | 9/24/2000 | 17000 |
| parsec\1.1-complete\runtime\RCS\comm_ntthread.c,v | 9/24/2000 | 16500 |
| parsec\1.1-complete\runtime\RCS\comm_pthread.c,v | 9/24/2000 | 35700 |
| parsec\1.1-complete\runtime\RCS\dlink.c,v | 2/21/1999 | 2600 |
| parsec\1.1-complete\runtime\RCS\dlink.h,v | 2/25/1998 | 800 |
| parsec\1.1-complete\runtime\RCS\equeue.h,v | 2/25/1998 | 700 |
| parsec\1.1-complete\runtime\RCS\equeue_dlink.c,v | 2/21/1999 | 2700 |
| parsec\1.1-complete\runtime\RCS\equeue_splay.c,v | 2/21/1999 | 5900 |
| parsec\1.1-complete\runtime\RCS\jsetjmp.s,v | 2/25/1998 | 6900 |
| parsec\1.1-complete\runtime\RCS\LICENSE,v | 2/25/1998 | 1700 |
| parsec\1.1-complete\runtime\RCS\main.c,v | 12/8/1998 | 1500 |
| parsec\1.1-complete\runtime\RCS\Makefile-longlong-aix,v | 3/11/1998 | 2600 |
| parsec\1.1-complete\runtime\RCS\Makefile-longlong-generic,v | 2/23/1999 | 2800 |
| parsec\1.1-complete\runtime\RCS\Makefile-longlong-irix,v | 7/18/1999 | 2600 |
| parsec\1.1-complete\runtime\RCS\Makefile-longlong-sun,v | 3/11/1998 | 2600 |
| parsec\1.1-complete\runtime\RCS\Makefile-unsigned-aix,v | 3/11/1998 | 2900 |
| parsec\1.1-complete\runtime\RCS\Makefile-unsigned-generic,v | 2/23/1999 | 3000 |
| parsec\1.1-complete\runtime\RCS\Makefile-unsigned-irix,v | 7/18/1999 | 2800 |
| parsec\1.1-complete\runtime\RCS\Makefile-unsigned-sun,v | 3/11/1998 | 2900 |
| parsec\1.1-complete\runtime\RCS\makent.bat,v | 7/21/2000 | 4400 |
| parsec\1.1-complete\runtime\RCS\mqueue.c,v | 8/25/2000 | 23200 |
| parsec\1.1-complete\runtime\RCS\mqueue.h,v | 8/25/2000 | 1700 |
| parsec\1.1-complete\runtime\RCS\ntsystime.c,v | 2/25/1998 | 700 |
| parsec\1.1-complete\runtime\RCS\ntsystime.h,v | 6/19/1998 | 900 |
| parsec\1.1-complete\runtime\RCS\ntvalues.h,v | 2/25/1998 | 500 |
| parsec\1.1-complete\runtime\RCS\parsec.h,v | 8/24/2000 | 19300 |
| parsec\1.1-complete\runtime\RCS\random.c,v | 2/25/1998 | 4200 |
| parsec\1.1-complete\runtime\RCS\shared_lib.c,v | 7/21/2000 | 43700 |
| parsec\1.1-complete\runtime\RCS\splay.c,v | 2/25/1998 | 8300 |
| parsec\1.1-complete\runtime\RCS\splay.h,v | 2/25/1998 | 600 |
| parsec\1.1-complete\runtime\RCS\sync.h,v | 11/16/1999 | 7800 |
| parsec\1.1-complete\runtime\RCS\sync_cons.c,v | 11/16/1999 | 163600 |
| parsec\1.1-complete\runtime\RCS\sync_gel.c,v | 12/22/1998 | 26600 |
| parsec\1.1-complete\runtime\RCS\sync_isp.c,v | 8/25/2000 | 36500 |
| parsec\1.1-complete\runtime\RCS\sync_mpc.c,v | 9/26/1999 | 33300 |
| parsec\1.1-complete\runtime\shared_lib.c | 7/21/2000 | 26100 |
| parsec\1.1-complete\runtime\splay.c | 2/25/1998 | 8200 |
| parsec\1.1-complete\runtime\splay.h | 2/25/1998 | 400 |
| parsec\1.1-complete\runtime\sync.h | 11/16/1999 | 4200 |
| parsec\1.1-complete\runtime\sync_cons.c | 11/16/1999 | 81200 |
| parsec\1.1-complete\runtime\sync_gel.c | 12/22/1998 | 19400 |
| parsec\1.1-complete\runtime\sync_isp.c | 8/25/2000 | 35200 |
| parsec\1.1-complete\runtime\sync_ispnew.c | 8/25/2000 | 36400 |
| parsec\1.1-complete\runtime\sync_mpc.c | 9/26/1999 | 24300 |
| parsec\1.1-complete-mit\compiler\cat.c | 11/3/1998 | 6600 |
| parsec\1.1-complete-mit\compiler\cat.h | 2/25/1998 | 300 |
| parsec\1.1-complete-mit\compiler\decl.c | 8/19/1998 | 10100 |
| parsec\1.1-complete-mit\compiler\decl.h | 2/25/1998 | 600 |
| parsec\1.1-complete-mit\compiler\entity.c | 11/11/1998 | 3000 |
| parsec\1.1-complete-mit\compiler\entity.h | 11/17/1998 | 400 |
| parsec\1.1-complete-mit\compiler\error.c | 2/25/1998 | 1900 |
| parsec\1.1-complete-mit\compiler\error.h | 2/25/1998 | 200 |
| parsec\1.1-complete-mit\compiler\lex.yy.c | 11/14/1998 | 58900 |
| parsec\1.1-complete-mit\compiler\Makefile | 1/10/1998 | 500 |
| parsec\1.1-complete-mit\compiler\Makefile-aix | 8/14/1998 | 500 |
| parsec\1.1-complete-mit\compiler\Makefile-generic | 8/13/1998 | 500 |
| parsec\1.1-complete-mit\compiler\Makefile-irix | 8/10/1998 | 500 |
| parsec\1.1-complete-mit\compiler\Makefile-sun | 8/13/1998 | 500 |
| parsec\1.1-complete-mit\compiler\makent.bat | 8/20/1998 | 100 |
| parsec\1.1-complete-mit\compiler\message.c | 2/25/1998 | 900 |
| parsec\1.1-complete-mit\compiler\message.h | 2/25/1998 | 100 |
| parsec\1.1-complete-mit\compiler\parser.h | 10/3/1998 | 300 |
| parsec\1.1-complete-mit\compiler\parser.l | 11/14/1998 | 6700 |
| parsec\1.1-complete-mit\compiler\parser.tab.c | 11/15/1998 | 205300 |
| parsec\1.1-complete-mit\compiler\parser.tab.h | 11/15/1998 | 2500 |
| parsec\1.1-complete-mit\compiler\parser.y | 11/15/1998 | 120900 |

-continued

| filename | creation date | size (bytes) |
|---|---|---|
| parsec\1.1-complete-mit\compiler\pcc.c | 3/14/1999 | 39000 |
| parsec\1.1-complete-mit\compiler\pcc.h | 12/11/1998 | 400 |
| parsec\1.1-complete-mit\compiler\type.c | 2/25/1998 | 10500 |
| parsec\1.1-complete-mit\compiler\type.h | 1/25/1999 | 2600 |
| parsec\1.1-complete-mit\doc\help.txt | 12/8/1998 | 1100 |
| parsec\1.1-complete-mit\include\clocktype.h | 10/25/1998 | 2400 |
| parsec\1.1-complete-mit\include\pc__api.h | 3/14/1999 | 6900 |
| parsec\1.1-complete-mit\license.txt | 8/20/1998 | 1500 |
| parsec\1.1-complete-mit\Makefile | 6/10/1998 | 1800 |
| parsec\1.1-complete-mit\readme.txt | 8/27/1998 | 6800 |
| parsec\1.1-complete-mit\runtime\comm.h | 9/22/1998 | 1200 |
| parsec\1.1-complete-mit\runtime\comm__dummy.c | 1/21/1999 | 6700 |
| parsec\1.1-complete-mit\runtime\comm__ntthread.c | 11/14/1998 | 10100 |
| parsec\1.1-complete-mit\runtime\dlink.c | 2/21/1999 | 2000 |
| parsec\1.1-complete-mit\runtime\dlink.h | 2/25/1998 | 600 |
| parsec\1.1-complete-mit\runtime\equeue.h | 2/25/1998 | 500 |
| parsec\1.1-complete-mit\runtime\equeue__dlink.c | 2/21/1999 | 2200 |
| parsec\1.1-complete-mit\runtime\equeue__splay.c | 2/21/1999 | 5300 |
| parsec\1.1-complete-mit\runtime\jsetjmp.s | 2/25/1998 | 6700 |
| parsec\1.1-complete-mit\runtime\LICENSE | 2/25/1998 | 1500 |
| parsec\1.1-complete-mit\runtime\main.c | 12/8/1998 | 600 |
| parsec\1.1-complete-mit\runtime\Makefile-longlong-aix | 2/14/1999 | 1900 |
| parsec\1.1-complete-mit\runtime\Makefile-longlong-generic | 4/4/1999 | 1900 |
| parsec\1.1-complete-mit\runtime\Makefile-longlong-irix | 2/14/1999 | 1900 |
| parsec\1.1-complete-mit\runtime\Makefile-longlong-sun | 2/14/1999 | 1900 |
| parsec\1.1-complete-mit\runtime\Makefile-unsigned-aix | 2/14/1999 | 2100 |
| parsec\1.1-complete-mit\runtime\Makefile-unsigned-generic | 4/4/1999 | 2100 |
| parsec\1.1-complete-mit\runtime\Makefile-unsigned-irix | 2/14/1999 | 2100 |
| parsec\1.1-complete-mit\runtime\Makefile-unsigned-sun | 2/14/1999 | 2100 |
| parsec\1.1-complete-mit\runtime\makent.bat | 11/14/1998 | 1400 |
| parsec\1.1-complete-mit\runtime\mqueue.c | 12/8/1998 | 20900 |
| parsec\1.1-complete-mit\runtime\mqueue.h | 2/25/1998 | 1500 |
| parsec\1.1-complete-mit\runtime\ntsystime.c | 2/25/1998 | 500 |
| parsec\1.1-complete-mit\runtime\ntsystime.h | 6/19/1998 | 500 |
| parsec\1.1-complete-mit\runtime\parsec.h | 9/22/1998 | 14700 |
| parsec\1.1-complete-mit\runtime\random.c | 2/25/1998 | 4000 |
| parsec\1.1-complete-mit\runtime\shared__lib.c | 3/11/1998 | 25200 |
| parsec\1.1-complete-mit\runtime\splay.c | 2/25/1998 | 8200 |
| parsec\1.1-complete-mit\runtime\splay.h | 2/25/1998 | 400 |
| parsec\1.1-complete-mit\runtime\sync.h | 3/11/1998 | 4100 |
| parsec\1.1-complete-mit\runtime\sync__gel.c | 12/22/1998 | 19400 |
| parsec\1.1-complete-mit\runtime\sync__mpc.c | 2/15/1999 | 23800 |
| qualnet\2.6.0\application\app__util.h | 1/5/2001 | 8400 |
| qualnet\2.6.0\application\app__util.pc | 1/5/2001 | 15200 |
| qualnet\2.6.0\application\application.pc | 1/5/2001 | 36200 |
| qualnet\2.6.0\application\APPLICATION__README | 1/5/2001 | 7800 |
| qualnet\2.6.0\application\bellmanford.h | 1/5/2001 | 6100 |
| qualnet\2.6.0\application\bellmanford.pc | 1/5/2001 | 30600 |
| qualnet\2.6.0\application\bgp.h | 1/5/2001 | 11900 |
| qualnet\2.6.0\application\bgp.pc | 1/5/2001 | 199100 |
| qualnet\2.6.0\application\cbr__client.h | 1/5/2001 | 4500 |
| qualnet\2.6.0\application\cbr__client.pc | 1/5/2001 | 16400 |
| qualnet\2.6.0\application\cbr__server.h | 1/5/2001 | 3200 |
| qualnet\2.6.0\application\cbr__server.pc | 1/5/2001 | 10200 |
| qualnet\2.6.0\application\dlb.h | 1/5/2001 | 2000 |
| qualnet\2.6.0\application\dlb.pc | 1/5/2001 | 3300 |
| qualnet\2.6.0\application\fisheye.h | 1/5/2001 | 5400 |
| qualnet\2.6.0\application\fisheye.pc | 1/5/2001 | 27000 |
| qualnet\2.6.0\application\ftp__client.h | 1/5/2001 | 5400 |
| qualnet\2.6.0\application\ftp__client.pc | 1/5/2001 | 16700 |
| qualnet\2.6.0\application\ftp__server.h | 1/5/2001 | 3700 |
| qualnet\2.6.0\application\ftp__server.pc | 1/5/2001 | 12400 |
| qualnet\2.6.0\application\gen__ftp__client.h | 1/5/2001 | 5100 |
| qualnet\2.6.0\application\gen__ftp__client.pc | 1/5/2001 | 17500 |
| qualnet\2.6.0\application\gen__ftp__server.h | 1/5/2001 | 3200 |
| qualnet\2.6.0\application\gen__ftp__server.pc | 1/5/2001 | 12200 |
| qualnet\2.6.0\application\http__client.h | 1/5/2001 | 10400 |
| qualnet\2.6.0\application\http__client.pc | 1/5/2001 | 37500 |
| qualnet\2.6.0\application\http__distribution.c | 1/5/2001 | 166100 |
| qualnet\2.6.0\application\http__distribution.h | 1/5/2001 | 1000 |
| qualnet\2.6.0\application\http__server.h | 1/5/2001 | 5400 |
| qualnet\2.6.0\application\http__server.pc | 1/5/2001 | 18900 |
| qualnet\2.6.0\application\mpls__ldp.h | 1/5/2001 | 9000 |
| qualnet\2.6.0\application\mpls__ldp.pc | 1/5/2001 | 8200 |
| qualnet\2.6.0\application\mpls__shim.h | 1/5/2001 | 4200 |
| qualnet\2.6.0\application\qos__client.h | 1/5/2001 | 5100 |
| qualnet\2.6.0\application\qos__client.pc | 1/5/2001 | 25000 |

-continued

| filename | creation date | size (bytes) |
| --- | --- | --- |
| qualnet\2.6.0\application\qos_server.h | 1/5/2001 | 2800 |
| qualnet\2.6.0\application\qos_server.pc | 1/5/2001 | 10400 |
| qualnet\2.6.0\application\ripv2.h | 1/5/2001 | 12100 |
| qualnet\2.6.0\application\ripv2.pc | 1/5/2001 | 53900 |
| qualnet\2.6.0\application\rnddist.h | 1/5/2001 | 3000 |
| qualnet\2.6.0\application\rnddist.pc | 1/5/2001 | 2200 |
| qualnet\2.6.0\application\sliding_win.h | 1/5/2001 | 3300 |
| qualnet\2.6.0\application\sliding_win.pc | 1/5/2001 | 4500 |
| qualnet\2.6.0\application\static_routing.h | 1/5/2001 | 1700 |
| qualnet\2.6.0\application\static_routing.pc | 1/5/2001 | 4900 |
| qualnet\2.6.0\application\telnet_client.h | 1/5/2001 | 5300 |
| qualnet\2.6.0\application\telnet_client.pc | 1/5/2001 | 15800 |
| qualnet\2.6.0\application\telnet_server.h | 1/5/2001 | 3900 |
| qualnet\2.6.0\application\telnet_server.pc | 1/5/2001 | 11600 |
| qualnet\2.6.0\application\user_application.pc | 1/5/2001 | 2300 |
| qualnet\2.6.0\bin\antenna_azimuth.in | 1/5/2001 | 100 |
| qualnet\2.6.0\bin\app.conf | 1/5/2001 | 8400 |
| qualnet\2.6.0\bin\ber_bpsk.in | 1/5/2001 | 15500 |
| qualnet\2.6.0\bin\cbr.conf | 1/5/2001 | 200 |
| qualnet\2.6.0\bin\config.in | 3/5/2001 | 15200 |
| qualnet\2.6.0\bin\mobility.in | 1/5/2001 | 300 |
| qualnet\2.6.0\bin\nodes.in | 1/5/2001 | 800 |
| qualnet\2.6.0\bin\qos-app.conf | 1/5/2001 | 300 |
| qualnet\2.6.0\bin\qos-config.in | 1/5/2001 | 12800 |
| qualnet\2.6.0\bin\qos-link.conf | 1/5/2001 | 400 |
| qualnet\2.6.0\bin\qos-rtable.conf | 1/5/2001 | 300 |
| qualnet\2.6.0\bin\qualnet.stat.sample | 1/5/2001 | 4500 |
| qualnet\2.6.0\bin\routes.in | 1/5/2001 | 600 |
| qualnet\2.6.0\bin\soccer.trc | 1/5/2001 | 225100 |
| qualnet\2.6.0\doc\coding_guidelines.txt | 1/5/2001 | 9500 |
| qualnet\2.6.0\doc\LICENSE | 1/5/2001 | 400 |
| qualnet\2.6.0\doc\README | 1/5/2001 | 600 |
| qualnet\2.6.0\gui\bin\RunQualnet | 1/5/2001 | 100 |
| qualnet\2.6.0\gui\bin\RunQualnet.bat | 1/5/2001 | 100 |
| qualnet\2.6.0\gui\bin\startServer | 1/5/2001 | 100 |
| qualnet\2.6.0\gui\bin\startServer.bat | 1/5/2001 | 100 |
| qualnet\2.6.0\gui\models\README | 1/5/2001 | 100 |
| qualnet\2.6.0\gui\scenarios\README | 1/5/2001 | 200 |
| qualnet\2.6.0\gui\scenarios\tests.txt | 1/5/2001 | 2500 |
| qualnet\2.6.0\gui\settings\applications.txt | 1/5/2001 | 1600 |
| qualnet\2.6.0\gui\settings\choices.txt | 4/5/2001 | 15100 |
| qualnet\2.6.0\gui\settings\customNodeTemplate.txt | 1/5/2001 | 4800 |
| qualnet\2.6.0\gui\settings\customNodeTemplateDefault.txt | 1/5/2001 | 4800 |
| qualnet\2.6.0\gui\settings\nodespecific.txt | 1/5/2001 | 0 |
| qualnet\2.6.0\gui\src\Animator.java | 1/5/2001 | 47600 |
| qualnet\2.6.0\gui\src\AnimatorFrame.java | 1/5/2001 | 225400 |
| qualnet\2.6.0\gui\src\Application.java | 1/5/2001 | 4600 |
| qualnet\2.6.0\gui\src\ApplicationFrame.java | 1/5/2001 | 16300 |
| qualnet\2.6.0\gui\src\ApplicationPaletteDialog.java | 1/5/2001 | 7500 |
| qualnet\2.6.0\gui\src\Base64InputStream.java | 1/5/2001 | 3000 |
| qualnet\2.6.0\gui\src\Base64OutputStream.java | 1/5/2001 | 2400 |
| qualnet\2.6.0\gui\src\Category.java | 1/5/2001 | 6100 |
| qualnet\2.6.0\gui\src\CheckboxField.java | 1/5/2001 | 6800 |
| qualnet\2.6.0\gui\src\Connection.java | 1/5/2001 | 12500 |
| qualnet\2.6.0\gui\src\ConnectionModel.java | 1/5/2001 | 5800 |
| qualnet\2.6.0\gui\src\ControlThread.java | 1/5/2001 | 10700 |
| qualnet\2.6.0\gui\src\CoordinatesField.java | 1/5/2001 | 10800 |
| qualnet\2.6.0\gui\src\DefaultPropertiesPane.java | 1/5/2001 | 5100 |
| qualnet\2.6.0\gui\src\DeviceCategory.java | 1/5/2001 | 5300 |
| qualnet\2.6.0\gui\src\DeviceCreationPane.java | 1/5/2001 | 70500 |
| qualnet\2.6.0\gui\src\DevicePropertiesModel.java | 1/5/2001 | 4700 |
| qualnet\2.6.0\gui\src\DeviceVariable.java | 1/5/2001 | 12800 |
| qualnet\2.6.0\gui\src\DrawPanel.java | 1/5/2001 | 81700 |
| qualnet\2.6.0\gui\src\FileFilters.java | 1/5/2001 | 1900 |
| qualnet\2.6.0\gui\src\FileInputField.java | 1/5/2001 | 7800 |
| qualnet\2.6.0\gui\src\FilePreviewer.java | 1/5/2001 | 2500 |
| qualnet\2.6.0\gui\src\FixedPointField.java | 1/5/2001 | 7300 |
| qualnet\2.6.0\gui\src\ImpleRemoteQualnet.java | 1/5/2001 | 8800 |
| qualnet\2.6.0\gui\src\InputField.java | 1/5/2001 | 3700 |
| qualnet\2.6.0\gui\src\IntegerField.java | 1/5/2001 | 8000 |
| qualnet\2.6.0\gui\src\Key.java | 1/5/2001 | 1800 |
| qualnet\2.6.0\gui\src\LatLon.java | 1/5/2001 | 4300 |
| qualnet\2.6.0\gui\src\Link.java | 1/5/2001 | 2300 |
| qualnet\2.6.0\gui\src\LocalRuntimeController.java | 1/5/2001 | 10900 |
| qualnet\2.6.0\gui\src\Main.java | 1/5/2001 | 36700 |
| qualnet\2.6.0\gui\src\MimeClipboard.java | 1/5/2001 | 4300 |
| qualnet\2.6.0\gui\src\MobileNode.java | 1/5/2001 | 5100 |

-continued

| filename | creation date | size (bytes) |
|---|---|---|
| qualnet\2.6.0\gui\src\NodeDefinitionStorage.java | 1/5/2001 | 1900 |
| qualnet\2.6.0\gui\src\NodePaletteDialog.java | 1/5/2001 | 14500 |
| qualnet\2.6.0\gui\src\NumericPlainDocument.java | 1/5/2001 | 12600 |
| qualnet\2.6.0\gui\src\NumericTextField.java | 1/5/2001 | 5800 |
| qualnet\2.6.0\gui\src\Option.java | 1/5/2001 | 8400 |
| qualnet\2.6.0\gui\src\ParameterFrame.java | 1/5/2001 | 13900 |
| qualnet\2.6.0\gui\src\QualnetSplash.java | 1/5/2001 | 1700 |
| qualnet\2.6.0\gui\src\RemoteQualnet.java | 1/5/2001 | 1800 |
| qualnet\2.6.0\gui\src\RemoteQualnetServer.java | 1/5/2001 | 1700 |
| qualnet\2.6.0\gui\src\RouteSetupDialog.java | 1/5/2001 | 14500 |
| qualnet\2.6.0\gui\src\Ruler.java | 1/5/2001 | 9700 |
| qualnet\2.6.0\gui\src\RunThread.java | 1/5/2001 | 9900 |
| qualnet\2.6.0\gui\src\RuntimeController.java | 1/5/2001 | 3400 |
| qualnet\2.6.0\gui\src\SeedSpecificationDialog.java | 1/5/2001 | 14500 |
| qualnet\2.6.0\gui\src\SelectionField.java | 1/5/2001 | 12000 |
| qualnet\2.6.0\gui\src\SerializableSelection.java | 1/5/2001 | 1900 |
| qualnet\2.6.0\gui\src\ShortestPath.java | 1/5/2001 | 9900 |
| qualnet\2.6.0\gui\src\SubCategory.java | 1/5/2001 | 7300 |
| qualnet\2.6.0\gui\src\SystemDevice.java | 1/5/2001 | 6000 |
| qualnet\2.6.0\gui\src\SystemPropertiesDialog.java | 1/5/2001 | 17800 |
| qualnet\2.6.0\gui\src\TabModel.java | 1/5/2001 | 3300 |
| qualnet\2.6.0\gui\src\TextFieldTypeInputField.java | 1/5/2001 | 200 |
| qualnet\2.6.0\gui\src\TextInputField.java | 1/5/2001 | 7200 |
| qualnet\2.6.0\gui\src\TimeField.java | 1/5/2001 | 12400 |
| qualnet\2.6.0\gui\src\Token.java | 1/5/2001 | 3900 |
| qualnet\2.6.0\gui\src\TokenConverter.java | 1/5/2001 | 4700 |
| qualnet\2.6.0\gui\src\TokenObject.java | 1/5/2001 | 4500 |
| qualnet\2.6.0\gui\src\TokenReader.java | 1/5/2001 | 11800 |
| qualnet\2.6.0\gui\src\Variable.java | 1/5/2001 | 15700 |
| qualnet\2.6.0\include\api.h | 5/5/2001 | 4200 |
| qualnet\2.6.0\include\application.h | 5/5/2001 | 5100 |
| qualnet\2.6.0\include\brkdn__dist.h | 5/5/2001 | 1600 |
| qualnet\2.6.0\include\coordinates.h | 5/5/2001 | 7600 |
| qualnet\2.6.0\include\error.h | 5/5/2001 | 1900 |
| qualnet\2.6.0\include\fileio.h | 5/5/2001 | 7300 |
| qualnet\2.6.0\include\gui.h | 5/5/2001 | 10000 |
| qualnet\2.6.0\include\ip.h | 5/5/2001 | 9100 |
| qualnet\2.6.0\include\mac.h | 5/5/2001 | 3100 |
| qualnet\2.6.0\include\main.h | 5/5/2001 | 5500 |
| qualnet\2.6.0\include\message.h | 5/5/2001 | 11100 |
| qualnet\2.6.0\include\mobility.h | 5/5/2001 | 3200 |
| qualnet\2.6.0\include\network.h | 5/5/2001 | 4300 |
| qualnet\2.6.0\include\nwcommon.h | 5/5/2001 | 6500 |
| qualnet\2.6.0\include\packet__manipulation.h | 5/5/2001 | 4000 |
| qualnet\2.6.0\include\phy.h | 5/5/2001 | 3900 |
| qualnet\2.6.0\include\propagation.h | 5/5/2001 | 4500 |
| qualnet\2.6.0\include\queue.h | 5/5/2001 | 2100 |
| qualnet\2.6.0\include\splaytree.h | 5/5/2001 | 1300 |
| qualnet\2.6.0\include\structmsg.h | 5/5/2001 | 10100 |
| qualnet\2.6.0\include\tcpapps.h | 5/5/2001 | 1900 |
| qualnet\2.6.0\include\topology.h | 5/5/2001 | 1200 |
| qualnet\2.6.0\include\transport.h | 5/5/2001 | 1100 |
| qualnet\2.6.0\mac\mac.pc | 3/5/2001 | 18000 |
| qualnet\2.6.0\mac\mac__802__11.h | 1/5/2001 | 10200 |
| qualnet\2.6.0\mac\mac__802__11.pc | 3/5/2001 | 47700 |
| qualnet\2.6.0\mac\mac__802__3.h | 1/5/2001 | 10400 |
| qualnet\2.6.0\mac\mac__802__3.pc | 1/5/2001 | 71700 |
| qualnet\2.6.0\mac\mac__csma.h | 1/5/2001 | 3400 |
| qualnet\2.6.0\mac\mac__csma.pc | 1/5/2001 | 12400 |
| qualnet\2.6.0\mac\mac__dawn.h | 1/5/2001 | 2700 |
| qualnet\2.6.0\mac\mac__dawn.pc | 1/5/2001 | 13600 |
| qualnet\2.6.0\mac\mac__maca.h | 1/5/2001 | 4000 |
| qualnet\2.6.0\mac\mac__maca.pc | 1/5/2001 | 24600 |
| qualnet\2.6.0\mac\mpls.h | 1/5/2001 | 4800 |
| qualnet\2.6.0\mac\mpls.pc | 1/5/2001 | 40200 |
| qualnet\2.6.0\mac\scfq__utils.pc | 1/5/2001 | 500 |
| qualnet\2.6.0\mac\user__mac.pc | 1/5/2001 | 3200 |
| qualnet\2.6.0\mac\wiredlink.h | 1/5/2001 | 2300 |
| qualnet\2.6.0\mac\wiredlink.pc | 1/5/2001 | 12500 |
| qualnet\2.6.0\main\driver.pc | 1/5/2001 | 12800 |
| qualnet\2.6.0\main\error.pc | 1/5/2001 | 2800 |
| qualnet\2.6.0\main\fileio.pc | 1/5/2001 | 32200 |
| qualnet\2.6.0\main\glomo.h | 1/5/2001 | 5600 |
| qualnet\2.6.0\main\glomo.pc | 1/5/2001 | 29900 |
| qualnet\2.6.0\main\gui.c | 1/5/2001 | 17500 |
| qualnet\2.6.0\main\heap.h | 1/5/2001 | 900 |
| qualnet\2.6.0\main\heap.pc | 1/5/2001 | 5500 |

-continued

| filename | creation date | size (bytes) |
|---|---|---|
| qualnet\2.6.0\main\lookahead.h | 1/5/2001 | 400 |
| qualnet\2.6.0\main\lookahead.pc | 1/5/2001 | 400 |
| qualnet\2.6.0\main\Makefile-common | 3/5/2001 | 4700 |
| qualnet\2.6.0\main\Makefile-linux | 1/5/2001 | 600 |
| qualnet\2.6.0\main\Makefile-linux-redhat7 | 5/5/2001 | 600 |
| qualnet\2.6.0\main\Makefile-openbsd | 1/5/2001 | 600 |
| qualnet\2.6.0\main\Makefile-solaris | 1/5/2001 | 600 |
| qualnet\2.6.0\main\Makefile-solaris-cc | 1/5/2001 | 800 |
| qualnet\2.6.0\main\Makefile-unixcommon | 1/5/2001 | 1600 |
| qualnet\2.6.0\main\Makefile-windows9x | 1/5/2001 | 800 |
| qualnet\2.6.0\main\Makefile-windowscommon | 1/5/2001 | 2300 |
| qualnet\2.6.0\main\Makefile-windowsnt | 1/5/2001 | 900 |
| qualnet\2.6.0\main\message.pc | 1/5/2001 | 13200 |
| qualnet\2.6.0\main\queue.pc | 1/5/2001 | 4000 |
| qualnet\2.6.0\main\splaytree.pc | 1/5/2001 | 10200 |
| qualnet\2.6.0\main\topology.pc | 1/5/2001 | 12600 |
| qualnet\2.6.0\mobility\mobility.pc | 5/5/2001 | 25000 |
| qualnet\2.6.0\mobility\mobility_plmatrix.h | 5/5/2001 | 900 |
| qualnet\2.6.0\mobility\mobility_plmatrix.pc | 5/5/2001 | 3300 |
| qualnet\2.6.0\mobility\mobility_trace.h | 5/5/2001 | 800 |
| qualnet\2.6.0\mobility\mobility_trace.pc | 5/5/2001 | 3500 |
| qualnet\2.6.0\mobility\mobility_waypoint.h | 5/5/2001 | 900 |
| qualnet\2.6.0\mobility\mobility_waypoint.pc | 5/5/2001 | 3500 |
| qualnet\2.6.0\network\aodv.h | 1/5/2001 | 3000 |
| qualnet\2.6.0\network\aodv.pc | 1/5/2001 | 71100 |
| qualnet\2.6.0\network\dsr.h | 1/5/2001 | 4800 |
| qualnet\2.6.0\network\dsr.pc | 1/5/2001 | 84600 |
| qualnet\2.6.0\network\dvmrp.h | 1/5/2001 | 4000 |
| qualnet\2.6.0\network\dvmrp.pc | 1/5/2001 | 5100 |
| qualnet\2.6.0\network\fifoqueue.h | 1/5/2001 | 1800 |
| qualnet\2.6.0\network\fifoqueue.pc | 1/5/2001 | 6800 |
| qualnet\2.6.0\network\ipqueue.h | 1/5/2001 | 3200 |
| qualnet\2.6.0\network\lar1.h | 1/5/2001 | 3700 |
| qualnet\2.6.0\network\lar1.pc | 1/5/2001 | 66700 |
| qualnet\2.6.0\network\network.pc | 1/5/2001 | 4300 |
| qualnet\2.6.0\network\nwcommon.pc | 1/5/2001 | 11500 |
| qualnet\2.6.0\network\nwip.h | 1/5/2001 | 17400 |
| qualnet\2.6.0\network\nwip.pc | 1/5/2001 | 112300 |
| qualnet\2.6.0\network\odmrp.h | 1/5/2001 | 7600 |
| qualnet\2.6.0\network\odmrp.pc | 1/5/2001 | 113500 |
| qualnet\2.6.0\network\ospfv2.h | 1/5/2001 | 18600 |
| qualnet\2.6.0\network\ospfv2.pc | 1/5/2001 | 161500 |
| qualnet\2.6.0\network\prio_sched.h | 1/5/2001 | 1500 |
| qualnet\2.6.0\network\prio_sched.pc | 1/5/2001 | 4700 |
| qualnet\2.6.0\network\redqueue.h | 1/5/2001 | 1400 |
| qualnet\2.6.0\network\redqueue.pc | 1/5/2001 | 21800 |
| qualnet\2.6.0\network\user_nwip.pc | 1/5/2001 | 3900 |
| qualnet\2.6.0\network\wfq_sched.h | 1/5/2001 | 2100 |
| qualnet\2.6.0\network\wfq_sched.pc | 1/5/2001 | 21000 |
| qualnet\2.6.0\network\zrp.h | 1/5/2001 | 9700 |
| qualnet\2.6.0\network\zrp.pc | 1/5/2001 | 129700 |
| qualnet\2.6.0\phy\antenna.h | 2/5/2001 | 2300 |
| qualnet\2.6.0\phy\antenna.pc | 2/5/2001 | 16900 |
| qualnet\2.6.0\phy\phy.pc | 4/5/2001 | 16600 |
| qualnet\2.6.0\phy\phy_802_11b.h | 1/5/2001 | 3800 |
| qualnet\2.6.0\phy\phy_802_11b.pc | 4/5/2001 | 15500 |
| qualnet\2.6.0\phy\phy_lookahead.h | 2/5/2001 | 10500 |
| qualnet\2.6.0\phy\prop_plmatrix.h | 1/5/2001 | 1500 |
| qualnet\2.6.0\phy\prop_plmatrix.pc | 1/5/2001 | 7500 |
| qualnet\2.6.0\phy\prop_range.pc | 3/5/2001 | 6900 |
| qualnet\2.6.0\phy\prop_statistical.h | 1/5/2001 | 1600 |
| qualnet\2.6.0\phy\prop_statistical.pc | 2/5/2001 | 13500 |
| qualnet\2.6.0\phy\propagation.pc | 1/5/2001 | 16400 |
| qualnet\2.6.0\qsap\qsapsol.m | 1/5/2001 | 5600 |
| qualnet\2.6.0\qsap\qsapwin.m | 1/5/2001 | 5400 |
| qualnet\2.6.0\qsap\runqsap.bat | 1/5/2001 | 0 |
| qualnet\2.6.0\qsap\runqsap.sh | 1/5/2001 | 0 |
| qualnet\2.6.0\qsap\src\qsap_common.c | 1/5/2001 | 1100 |
| qualnet\2.6.0\qsap\src\qsap_common.h | 1/5/2001 | 600 |
| qualnet\2.6.0\qsap\src\qsc.c | 1/5/2001 | 8800 |
| qualnet\2.6.0\qsap\src\qsc.h | 1/5/2001 | 1400 |
| qualnet\2.6.0\qsap\src\qsp.c | 1/5/2001 | 5800 |
| qualnet\2.6.0\qsap\src\qsp.h | 1/5/2001 | 1000 |
| qualnet\2.6.0\tcplib\app_brkdn.h | 1/5/2001 | 1800 |
| qualnet\2.6.0\tcplib\brkdn_dist.c | 1/5/2001 | 2600 |
| qualnet\2.6.0\tcplib\distributions.c | 1/5/2001 | 2500 |
| qualnet\2.6.0\tcplib\distributions.h | 1/5/2001 | 1500 |

-continued

| filename | creation date | size (bytes) |
|---|---|---|
| qualnet\2.6.0\tcplib\ftp.c | 1/5/2001 | 1800 |
| qualnet\2.6.0\tcplib\ftp.h | 1/5/2001 | 14700 |
| qualnet\2.6.0\tcplib\nntp.c | 1/5/2001 | 1600 |
| qualnet\2.6.0\tcplib\nntp.h | 1/5/2001 | 28800 |
| qualnet\2.6.0\tcplib\phone.c | 1/5/2001 | 1700 |
| qualnet\2.6.0\tcplib\phone.h | 1/5/2001 | 5800 |
| qualnet\2.6.0\tcplib\smtp.c | 1/5/2001 | 1500 |
| qualnet\2.6.0\tcplib\smtp.h | 1/5/2001 | 12000 |
| qualnet\2.6.0\tcplib\tcplib.c | 1/5/2001 | 2900 |
| qualnet\2.6.0\tcplib\tcplib.h | 1/5/2001 | 1600 |
| qualnet\2.6.0\tcplib\telnet.c | 1/5/2001 | 1800 |
| qualnet\2.6.0\tcplib\telnet.h | 1/5/2001 | 19700 |
| qualnet\2.6.0\transport\inpcb.h | 1/5/2001 | 4800 |
| qualnet\2.6.0\transport\inpcb.pc | 1/5/2001 | 8200 |
| qualnet\2.6.0\transport\rsvp.h | 1/5/2001 | 1600 |
| qualnet\2.6.0\transport\rsvp.pc | 1/5/2001 | 3000 |
| qualnet\2.6.0\transport\tcp\tcp.h | 1/5/2001 | 2600 |
| qualnet\2.6.0\transport\tcp\tcp.pc | 1/5/2001 | 12100 |
| qualnet\2.6.0\transport\tcp\tcp__config.h | 1/5/2001 | 2100 |
| qualnet\2.6.0\transport\tcp\tcp__fsm.h | 1/5/2001 | 4000 |
| qualnet\2.6.0\transport\tcp\tcp__hdr.h | 1/5/2001 | 4700 |
| qualnet\2.6.0\transport\tcp\tcp__input.pc | 1/5/2001 | 57600 |
| qualnet\2.6.0\transport\tcp\tcp__output.pc | 1/5/2001 | 21500 |
| qualnet\2.6.0\transport\tcp\tcp__proto.h | 1/5/2001 | 2800 |
| qualnet\2.6.0\transport\tcp\tcp__seq.h | 1/5/2001 | 4100 |
| qualnet\2.6.0\transport\tcp\tcp__subr.pc | 1/5/2001 | 13600 |
| qualnet\2.6.0\transport\tcp\tcp__timer.h | 1/5/2001 | 6700 |
| qualnet\2.6.0\transport\tcp\tcp__timer.pc | 1/5/2001 | 12000 |
| qualnet\2.6.0\transport\tcp\tcp__usrreq.pc | 1/5/2001 | 12500 |
| qualnet\2.6.0\transport\tcp\tcp__var.h | 1/5/2001 | 13700 |
| qualnet\2.6.0\transport\tcp\tcpip.h | 1/5/2001 | 3600 |
| qualnet\2.6.0\transport\transport.pc | 1/5/2001 | 3400 |
| qualnet\2.6.0\transport\udp.h | 1/5/2001 | 2200 |
| qualnet\2.6.0\transport\udp.pc | 1/5/2001 | 5400 |
| qualnet\2.6.0\verification\802.3\collision\app.conf | 1/5/2001 | 100 |
| qualnet\2.6.0\verification\802.3\collision\config.in | 1/5/2001 | 13700 |
| qualnet\2.6.0\verification\802.3\collision\README | 1/5/2001 | 1000 |
| qualnet\2.6.0\verification\802.3\collision\static.conf | 1/5/2001 | 0 |
| qualnet\2.6.0\verification\802.3\mixed1\app.conf | 1/5/2001 | 0 |
| qualnet\2.6.0\verification\802.3\mixed1\config.in | 1/5/2001 | 13800 |
| qualnet\2.6.0\verification\802.3\mixed1\README | 1/5/2001 | 1200 |
| qualnet\2.6.0\verification\802.3\mixed1\static.conf | 1/5/2001 | 0 |
| qualnet\2.6.0\verification\802.3\mixed2\app.conf | 1/5/2001 | 0 |
| qualnet\2.6.0\verification\802.3\mixed2\config.in | 1/5/2001 | 13900 |
| qualnet\2.6.0\verification\802.3\mixed2\README | 1/5/2001 | 1500 |
| qualnet\2.6.0\verification\802.3\mixed2\static.conf | 1/5/2001 | 0 |
| qualnet\2.6.0\verification\802.3\no__collision\app.conf | 1/5/2001 | 0 |
| qualnet\2.6.0\verification\802.3\no__collision\config.in | 1/5/2001 | 13700 |
| qualnet\2.6.0\verification\802.3\no__collision\README | 1/5/2001 | 1000 |
| qualnet\2.6.0\verification\802.3\no__collision\static.conf | 1/5/2001 | 0 |
| qualnet\2.6.0\verification\ospfv2\disjoint\app.conf | 1/5/2001 | 0 |
| qualnet\2.6.0\verification\ospfv2\disjoint\config.in | 1/5/2001 | 13700 |
| qualnet\2.6.0\verification\ospfv2\disjoint\ospfv2.out | 1/5/2001 | 326600 |
| qualnet\2.6.0\verification\ospfv2\disjoint\qualnet.stat | 1/5/2001 | 2700 |
| qualnet\2.6.0\verification\ospfv2\disjoint\README | 1/5/2001 | 900 |
| qualnet\2.6.0\verification\ospfv2\ethernet\app.conf | 1/5/2001 | 0 |
| qualnet\2.6.0\verification\ospfv2\ethernet\config.in | 1/5/2001 | 13900 |
| qualnet\2.6.0\verification\ospfv2\ethernet\ospfv2.out | 1/5/2001 | 618900 |
| qualnet\2.6.0\verification\ospfv2\ethernet\qualnet.stat | 1/5/2001 | 5600 |
| qualnet\2.6.0\verification\ospfv2\ethernet\README | 1/5/2001 | 1300 |
| qualnet\2.6.0\verification\ospfv2\normal__2node\app.conf | 1/5/2001 | 0 |
| qualnet\2.6.0\verification\ospfv2\normal__2node\config.in | 1/5/2001 | 13700 |
| qualnet\2.6.0\verification\ospfv2\normal__2node\ospfv2.out | 1/5/2001 | 167100 |
| qualnet\2.6.0\verification\ospfv2\normal__2node\qualnet.stat | 1/5/2001 | 2200 |
| qualnet\2.6.0\verification\ospfv2\normal__2node\README | 1/5/2001 | 800 |
| qualnet\2.6.0\verification\ospfv2\normal__4node\app.conf | 1/5/2001 | 0 |
| qualnet\2.6.0\verification\ospfv2\normal__4node\config.in | 1/5/2001 | 13700 |
| qualnet\2.6.0\verification\ospfv2\normal__4node\ospfv2.out | 1/5/2001 | 568600 |
| qualnet\2.6.0\verification\ospfv2\normal__4node\qualnet.stat | 1/5/2001 | 5600 |
| qualnet\2.6.0\verification\ospfv2\normal__4node\README | 1/5/2001 | 1000 |
| qualnet\2.6.0\verification\README | 1/5/2001 | 600 |
| qualnet\2.6.0\verification\tcp\one__session\app.conf | 1/5/2001 | 0 |
| qualnet\2.6.0\verification\tcp\one__session\config.in | 1/5/2001 | 13700 |
| qualnet\2.6.0\verification\tcp\one__session\qualnet.stat | 1/5/2001 | 2900 |
| qualnet\2.6.0\verification\tcp\one__session\README | 1/5/2001 | 900 |
| qualnet\2.6.0\verification\tcp\one__session\route.conf | 1/5/2001 | 0 |
| qualnet\2.6.0\verification\tcp\one__session\tcp.out | 1/5/2001 | 11800 |

-continued

| filename | creation date | size (bytes) |
|---|---|---|
| qualnet\2.6.0\verification\tcp\overflow\app.conf | 1/5/2001 | 0 |
| qualnet\2.6.0\verification\tcp\overflow\config.in | 1/5/2001 | 13700 |
| qualnet\2.6.0\verification\tcp\overflow\qualnet.stat | 1/5/2001 | 4300 |
| qualnet\2.6.0\verification\tcp\overflow\README | 1/5/2001 | 1000 |
| qualnet\2.6.0\verification\tcp\overflow\route.conf | 1/5/2001 | 100 |
| qualnet\2.6.0\verification\tcp\overflow\tcp.out | 1/5/2001 | 16600 |
| qualnet\2.6.0\verification\tcp\two_session\app.conf | 1/5/2001 | 100 |
| qualnet\2.6.0\verification\tcp\two_session\config.in | 1/5/2001 | 13700 |
| qualnet\2.6.0\verification\tcp\two_session\qualnet.stat | 1/5/2001 | 3300 |
| qualnet\2.6.0\verification\tcp\two_session\README | 1/5/2001 | 1100 |
| qualnet\2.6.0\verification\tcp\two_session\route.conf | 1/5/2001 | 0 |
| qualnet\2.6.0\verification\tcp\two_session\tcp.out | 1/5/2001 | 16600 |

BACKGROUND OF THE INVENTION

1. Field of the Invention

The field of the present invention generally relates to network management and, more particularly, to systems and methods for monitoring, simulating, and enhancing network performance.

2. Background

Networks and networked applications are difficult to operate at peak efficiency for a variety of reasons. First, the heterogeneous nature of most modern networks often requires that dissimilar or diverse network components interact with one another, leading to potential inefficiencies in overall operation of the network, even if the operation of a subnetwork portion or individual network elements have been optimized. Heterogeneity can exist in one or more network or application characteristics including bandwidth, latency, media, and traffic types.

A second reason for inefficiencies in network operations is that the total traffic volume and/or the mix of different traffic types (e.g., data, image, streaming video) may vary in an unpredictable manner. Identifying a static network configuration that will offer efficient performance in the face of dynamically changing traffic and network conditions can be particularly challenging.

A third factor contributing to operational inefficiencies is the tendency of networks to grow over time. As networks or networked applications grow in scale, a network configuration that may have been optimal or sufficient when the network or application was smaller may no longer be so when the network or application becomes larger in size.

A fourth reason for performance inefficiencies in networks is the need for shared access to network resources. For example, a user communicating with a wireless transmission device may need to share the spectrum with other wireless users. Similarly, a user transmitting large files over a company's intranet may need to share the available bandwidth with users engaged in other activities—for example, a second user engaged in a video teleconference, and a third user sending e-mail. Where a network or application is required to share resources with other users or systems, the available network resources may vary both dynamically and unpredictably. Consequently, a network configuration that is optimal or sufficient when shared resources are not being used by others, or are only lightly used by others, may not be optimal or sufficient when outside users or systems place greater demand upon the shared resources.

To improve the performance and efficiency of networks and/or networked applications, simulation tools have been developed, whereby traffic flow can be modeled and various network configurations explored. Most, if not all, conventional simulation tools, however, rely upon off-line analysis of the network and its traffic load, and/or are quite limited in accuracy, speed or capability.

A conceptual illustration of typical off-line simulation and analysis as conventionally practiced in a simulation process 100 is shown in FIG. 1. Generally in off-line analysis, a network model 113 is constructed to simulate operation of the network. Information about traffic carried over the network is gathered to determine, for example, appropriate link sizes and optimal routes that will provide a predetermined level of service for a forecasted traffic load. The traffic load may be forecasted using traffic models 114 that perform statistical analysis of the collected traffic data. The forecasted traffic load is input to a simulation software program 120 that models the network and forecasted traffic. The network model 113 and traffic model 114 are used in conjunction to evaluate alternative system configurations. Typically, the outputs from simulations with various proposed network configurations and/or forecasted traffic patterns are reviewed manually, and then adjustments to the proposed network configuration and/or forecasted traffic patterns can be made in an attempt to arrive at a suitable network configuration for the expected traffic load. When a suitable network configuration is found, based upon manual review of the simulation results, the new configuration then may, if desired, be deployed (indicated in FIG. 1 by block 125).

While off-line simulation and analysis provides some measure of prediction for network performance, it has a number of drawbacks. First, off-line simulation and analysis can be a resource intensive, time-consuming process. Conventional approaches for off-line simulation and analysis can easily take hours or even days to complete, particularly for large-scale or complex networks. Consequently, the results of the off-line simulation and analysis may be "stale" by the time the process is completed, and may not reflect the actual status of the network or its traffic load at the time that the computations are completed.

In order to increase the speed of off-line network simulations, the network model may be simplified by the incorporation of abstractions or other simplifications, thus reducing the scope of the simulation and, consequently, the computational burden. However, the use of abstractions and simulations in the network model can adversely affect the reliability and accuracy of the simulation results. For maximum reliability and accuracy, networks should preferably be simulated without abstracting system properties that may affect overall system performance. These concerns are particularly prevalent when the simulation objectives include the investigation of scalability and/or stability of the target network. An overly simplified network model can lead to inaccurate predictions or estimations of network attributes that the analyst is trying to estimate. The problem of obtaining accurate and reliable network simulation results is expected to increase with conventional simulation and analysis techniques as existing networks are integrated into larger communication systems, resulting in large-scale, integrated networks having numerous co-existing heterogeneous nodes with potentially diverse sets of protocols and services operated within the integrated network. Performance of a network may be impacted in a variety of ways by its integration into a larger system, which may lead to catastrophic problems that cannot be predicted by analyzing the individual (sub) networks by themselves.

One example of a method that attempts to enhance the performance of network operation is described in U.S. Pat. No. 6,069,894, in the name of Holendar et al. According to the technique described in that patent, a number of logical networks are established on top of a physical network, the logical links of the logical networks sharing the same physical transmission and switching resources. Using an analytical model of the network, an "objective function" is optimized with respect to at least one set of decision variables (generally either the logical link capacities and/or the load sharing variables), given the physical network parameters and the requirements of each logical network.

Techniques which rely upon an analytical model for simulation may not capture the full operation of the system, and may therefore lead to sub-optimal results. Analytical models may also lack the ability to simulate detailed behavior of certain individual components, such as routers and switches, that are commonly used in many actual networks. Moreover, it is largely understood that the use of analytical models impose upon the simulation a number of limitations or assumptions necessary for analytical tractability (for example, a reduced load, link independence, etc.).

Another example of a method addressed to enhancing network performance is described in U.S. Pat. No. 6,209,033, in the name of Datta et al. In that patent, a system is described for evaluating and planning network capacity based upon measured traffic across the links of the network. Once a link's traffic volume has been measured, it is compared with the link's traffic capability, and the resulting parameters compared with the traffic and capability of other links of the network to create metrics of the network capacity and balance. Then, simulated changes to the network configuration may be made by substituting simulated traffic volume amount and capabilities for selected link traffic measurements and capabilities, and the resulting measures of network capacity and balance are then compared to determine whether the simulated changes represent a preferred network configuration. While addressing certain limited aspects of network performance, the technique described in the patent focuses mainly on achieving overall balance in the network (where all link utilizations are approximately equal), and does not generally address itself to other network attributes that might, for example, rely upon detailed models of routers and/or other network devices. Moreover, the system described in the patent uses sequential discrete event simulation, which may limit its capabilities or its potential applications to other network scenarios.

Wireless communication systems, in particular, may present difficult challenges for simulation, analysis and optimization. A primary source of these difficulties is the accurate computation of the impact of interference among simultaneously transmitted wireless signals. Much of the previous work has relied on the use of abstract models of dubious practical value because they are generally based on unrealistic assumptions of interference between simultaneously transmitted signals. However, the ability to model, simulate, or otherwise understand the effect of signal interference, and interference reduction techniques (such as power management in a Code Division Multiple Access (CDMA) communication network), can be quite important, particularly as networks grow and must deal with larger numbers of users.

There is thus a need for a system and/or method for improving network efficiency and, in particular, such a system and/or method that may be applied to wired, wireless, and/or mixed networks with large numbers of network nodes. There is likewise a need for a system and/or method for improving network efficiency which is well suited for the expected large volume of growth in communication services, and which is well suited for providing differentiated services that can allow the network to, for example, provide continuous unaffected service for premium customers, even as the overall offered traffic load increases substantially.

SUMMARY OF THE INVENTION

The invention is directed in one aspect to systems and methods for simulating and enhancing network operation.

According to one embodiment as disclosed herein, a system and method for network simulation and enhancement includes an experiment configuration engine that provides various proposed traffic and/or network models. The traffic and/or network models may be based, if desired, on monitored data from the network indicating a current network state and current network traffic. A simulator uses the proposed traffic and/or network models to execute a plurality of simulations for the network, taking account of the current network state and current network traffic, if provided. The simulator preferably uses parallel discrete event simulation to determine an optimal network configuration based upon an objective function for optimizing an aspect of network performance. Reconfiguration instructions for the optimal network configuration may, if desired, be conveyed from the simulator to the network.

Advantageously, the reception of current network state and current network traffic data, execution of a plurality of simulations, and determination of an optimal network configuration may be repeated so as to effectuate ongoing, real-time optimization of the network.

In a preferred embodiment, the simulator utilizes an automated process by which the optimal network configuration is determined using the objective function as a convergence goal. The simulator may also advantageously utilize parallel discrete-event simulation to obtain rapid and accurate simulation results. The network model(s) may cover internal operational details of individual network devices (e.g., routers and/or switches) as well as operation of the network as a whole.

Further embodiments, variations and advantages are also disclosed herein.

DETAILED DESCRIPTION OF THE PREFERRED EMBODIMENTS

In the following description of various preferred embodiments, reference is made to the accompanying drawings which form a part hereof, and in which is shown by way of illustration specific implementations of aspects of the invention and contexts which the invention may be practiced. It is to be understood that other and modified embodiments may be utilized, and/or that structural changes may be made, without departing from the scope and spirit of the present invention.

Figure 1:
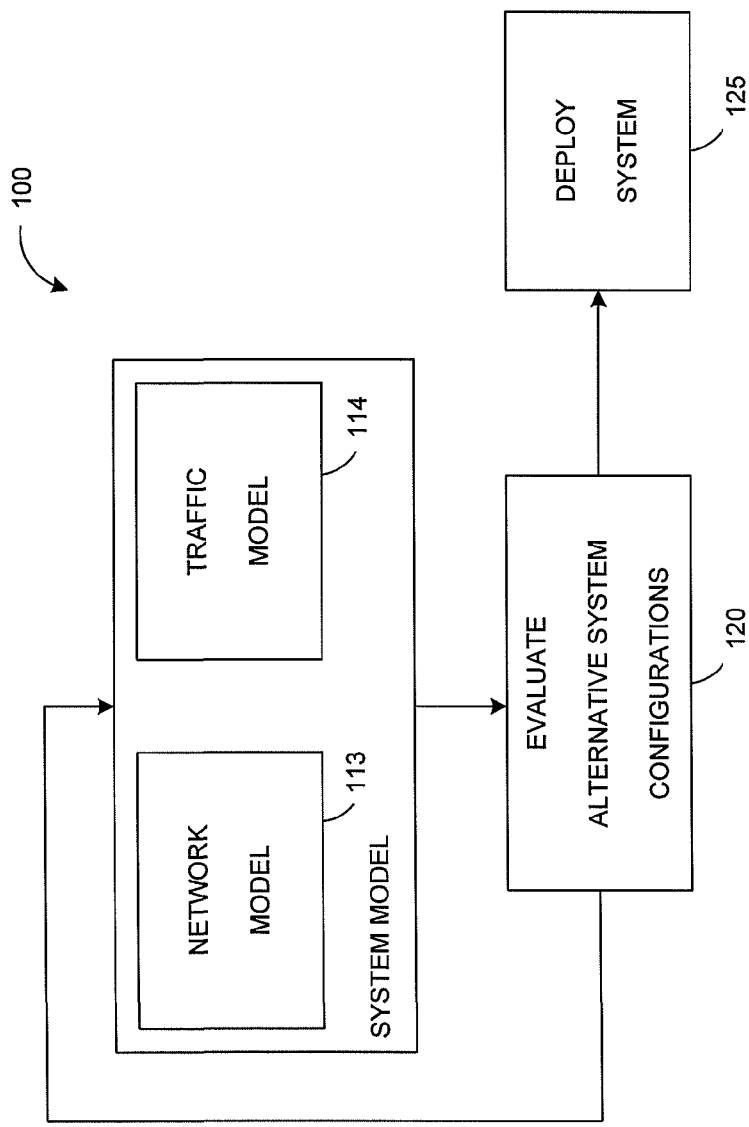
FIG. 1 is a conceptual diagram illustrating an example of network simulation as conventionally practiced.
Figure 2:
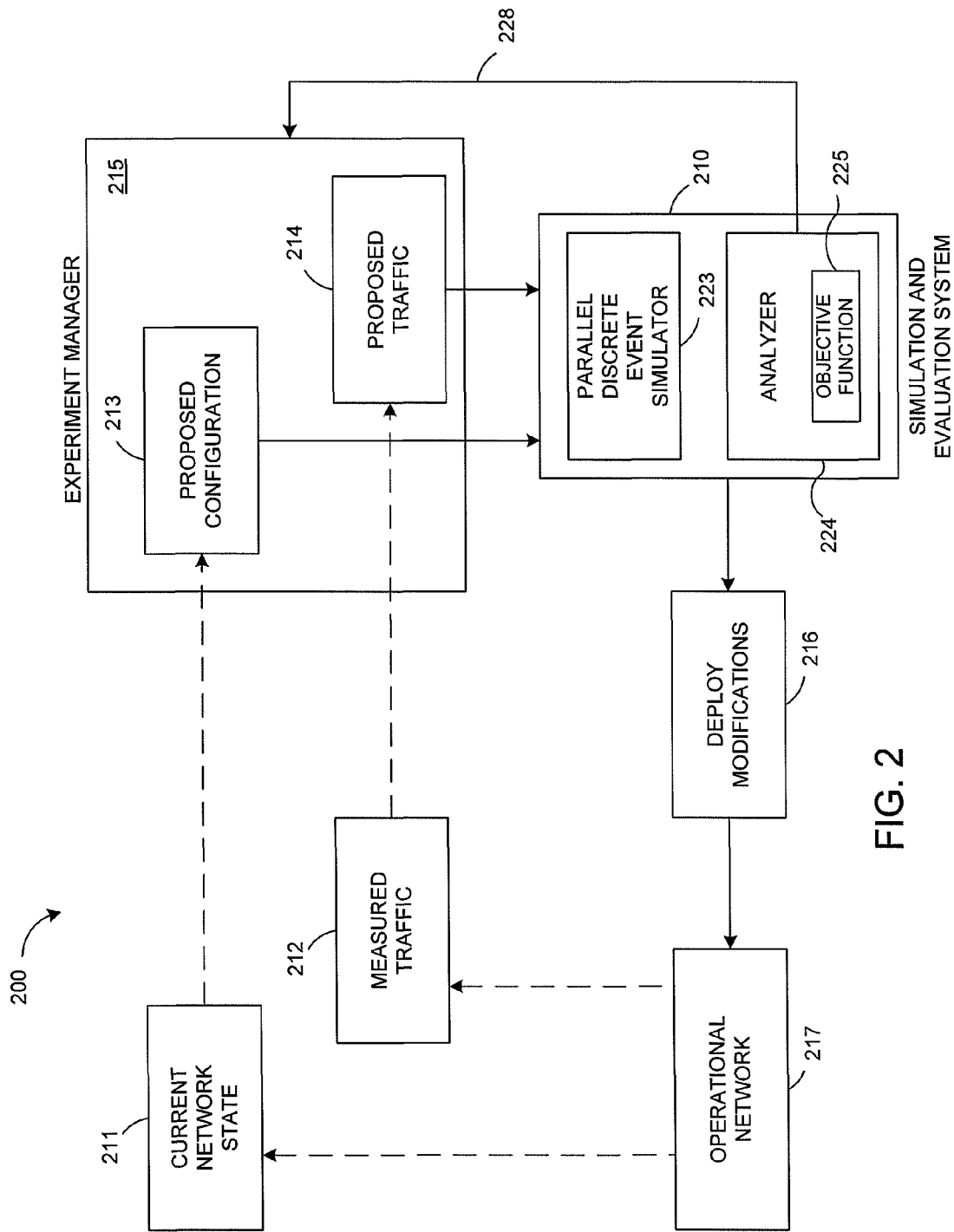
FIG. 2 is a top-level illustration of a system and associated methodology for on-line network performance prediction and enhancement according to one embodiment as disclosed herein.

FIG. 2 is a top-level illustration of a system 200 for network simulation and enhancement according to one embodiment as disclosed herein. As shown in FIG. 2, a proposed network configuration 213 and/or proposed network traffic distribution 214 for an operational network 217 are generated by an experiment manager 215 and provided to a simulator 210. The proposed network configuration 213 for the operational network 217 may be based on manual input, a searching function, historical information, experiential data, or any other pertinent factors. Similarly, the proposed network traffic distribution 214 may be based on manual input, a searching function, historical information, experiential data, or any other pertinent factors. If desired, the operational network 217 may be monitored to obtain a current network state 211 and measured traffic load 212. The current network state 211 may be used as an initial estimate, or may be used in conjunction with various other factors, examples of which were just mentioned above, to arrive at the proposed network configuration 213. Similarly, the measured traffic load 212 may be used as an initial estimate, or may be used in conjunction with various other factors, examples of which were just mentioned above, of the proposed network traffic distribution 214.

As further illustrated in FIG. 2, after the proposed network configuration 213 and/or the proposed network traffic distribution 214 have been generated by the experiment manager 215, the simulator 210 uses the proposed network configuration and proposed network traffic distribution 214 to simulate network operation under various possible alternative network configurations with various network traffic distributions, possibly in real time, in order to arrive at an enhanced or optimal network configuration. The simulator 210 preferably comprises a parallel discrete event simulator 223 and an analyzer 224 to facilitate this process. The parallel discrete event simulator 223 performs a parallel discrete event simulation to simulate the effect of the proposed network traffic distribution 214 on the proposed network configuration 213. The parallel discrete event simulator 223 may run the simulation on one or more high-performance multiprocessor machines. The analyzer 224 evaluates the simulation results output from the parallel discrete event simulator 223, according to a user-defined objective function 225 which associates the simulation results to one or more selected network attributes, and may make the evaluation results 228 available to the experiment manager 215. If the objective function 225 is not satisfied, then the experiment manager 215 may select a new proposed network configuration 213 and/or proposed network traffic distribution 214, and provide these to the simulator 210 for simulation and evaluation. The steps of selecting proposed network configuration 213 and network traffic distribution 214, parallel discrete event simulation, and analysis are preferably repeated until the objective function 225 is satisfied or, optionally, until some other terminating condition (e.g., time-out, exhaustion of all reasonable combinations of network configurations and traffic distribution, etc.).

When the objective function 225 has been satisfied, or another predefined terminating condition has occurred, the operational network 217 is modified or reconfigured through the deployment of modification instructions 216 to the network configuration determined by the simulator 210.

In certain embodiments, the simulator 210 may advantageously be used in connection with the experiment manager 215 to effectuate dynamic, real-time enhancement of the operational network 217. Once the modification instructions 216 have been deployed, and the operational network 217 reconfigured thereby, the operational network 217 may continue to be monitored, in real time, while the evaluation by the simulator 210 is proceeding and thereafter. The current network state 211 and current measured traffic load 212 may be monitored on an ongoing basis, continuously or periodically. The current network state 211 and measured traffic load 212 may contribute to the proposed network configuration and proposed network traffic distribution 214 developed by the experiment manager 215, resulting in a dynamic generation of a new proposed network configuration 213 and new proposed network traffic distribution 214. As before, the proposed network configuration 213 and proposed network traffic load 214 are fed into the simulator 210, which, as before, explores the various alternative proposed network configurations and alternative network traffic distributions, preferably in real-time, to arrive at a new desired network configuration, by achieving compliance with the user-defined objective function 225 or reaching some other termination condition. After finding a new desired network configuration, the operational network 217 is again modified or reconfigured, if necessary, through the deployment of modification instructions 216 to the operational network 217 from the simulator 210. The monitoring, input generation, simulation, analysis and deployment can be performed continuously in a loop or feedback fashion, in real time, to effectuate continuous enhancement or optimization of the operational network 217.

Figure 3:
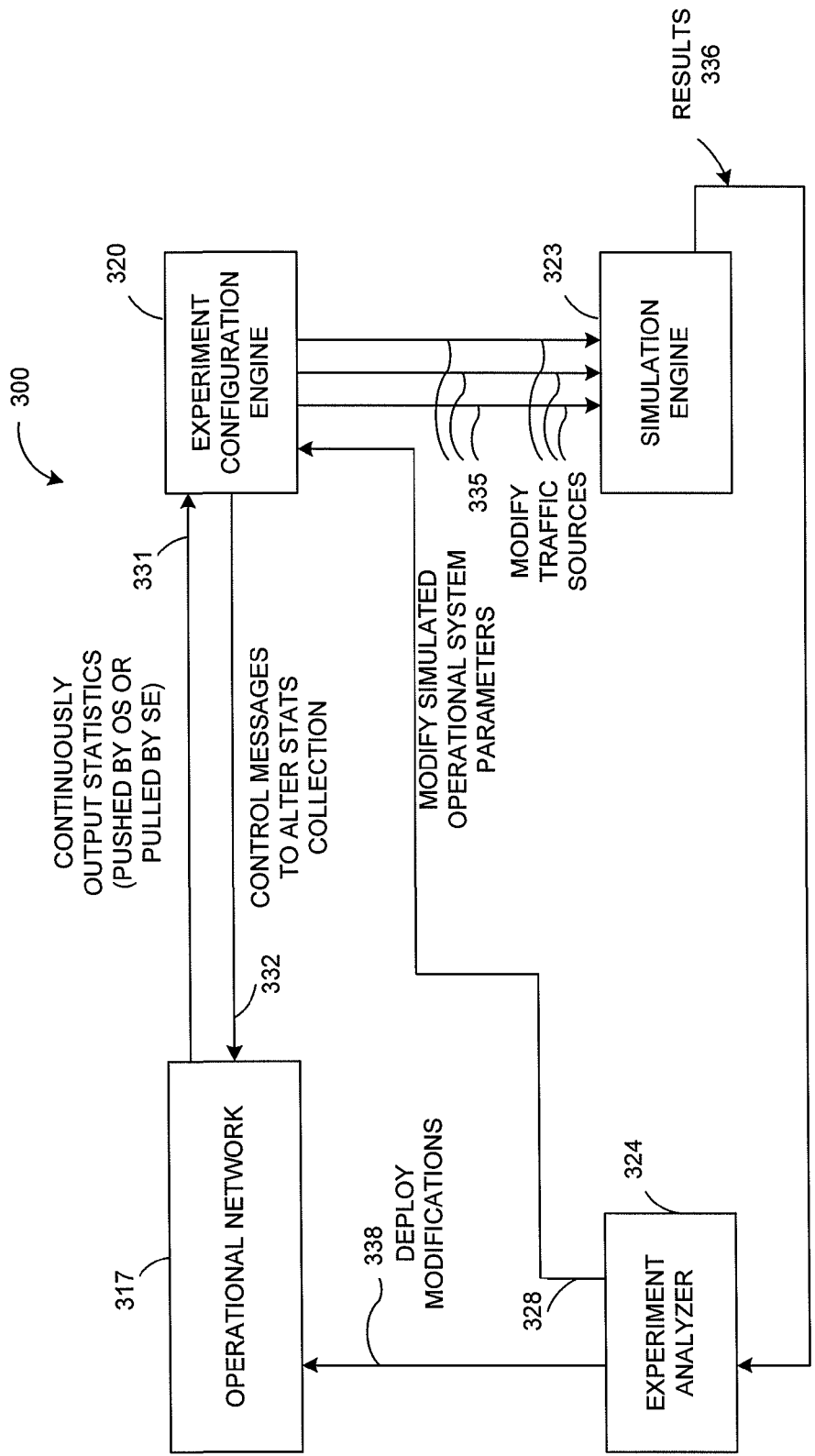
FIG. 3 is a more detailed diagram system and associated methodology for on-line network performance simulation and enhancement, based upon at least some of the principles illustrated in or described with respect to FIG. 2.

FIG. 3 is an illustration of one embodiment of a more detailed system 300 and associated methodology for on-line network performance simulation and enhancement, based upon at least some of the principles illustrated in or described with respect to FIG. 2. As shown in FIG. 3, an operational network 317 continuously outputs operational data (e.g., statistics or other metrics) 331 about the network state and/or traffic conditions to an experiment configuration engine 320. The experiment configuration engine 320 may, from time to time, send control messages 332 to the operational network 317 to alter collection of the operational data 331 by, e.g., selecting or changing certain inputs, changing the frequency with which certain inputs are collected, or the format of certain metrics. The amount and type of operational data 331, and the format and protocol used, depend upon the specific nature of the operational network 317 and the computer system on which the experiment configuration engine 320 is run. The experiment configuration engine 320 uses the operational data 331 to develop proposed network configurations and traffic distributions, and provides these to a simulation engine 323. The simulation engine 323 preferably performs a parallel discrete event simulation, and outputs the simulation results 336 to an experiment analyzer 324. The experiment analyzer 324 tests the simulation results 336 against an objective function and, if the results 336 do not comply therewith, provides an indication 328 of the results 336 and, if desired, the level of non-compliance to the experiment configuration engine 320. The experiment configuration engine 320 then may alter the proposed network configuration and traffic distribution, and provide new operational system parameters 335 to the simulation engine 323. Once the analyzer 324 determines that the simulation results 336 meet the objective function, the desired network configuration 338 is then deployed to the operational network 317.

Figure 4:
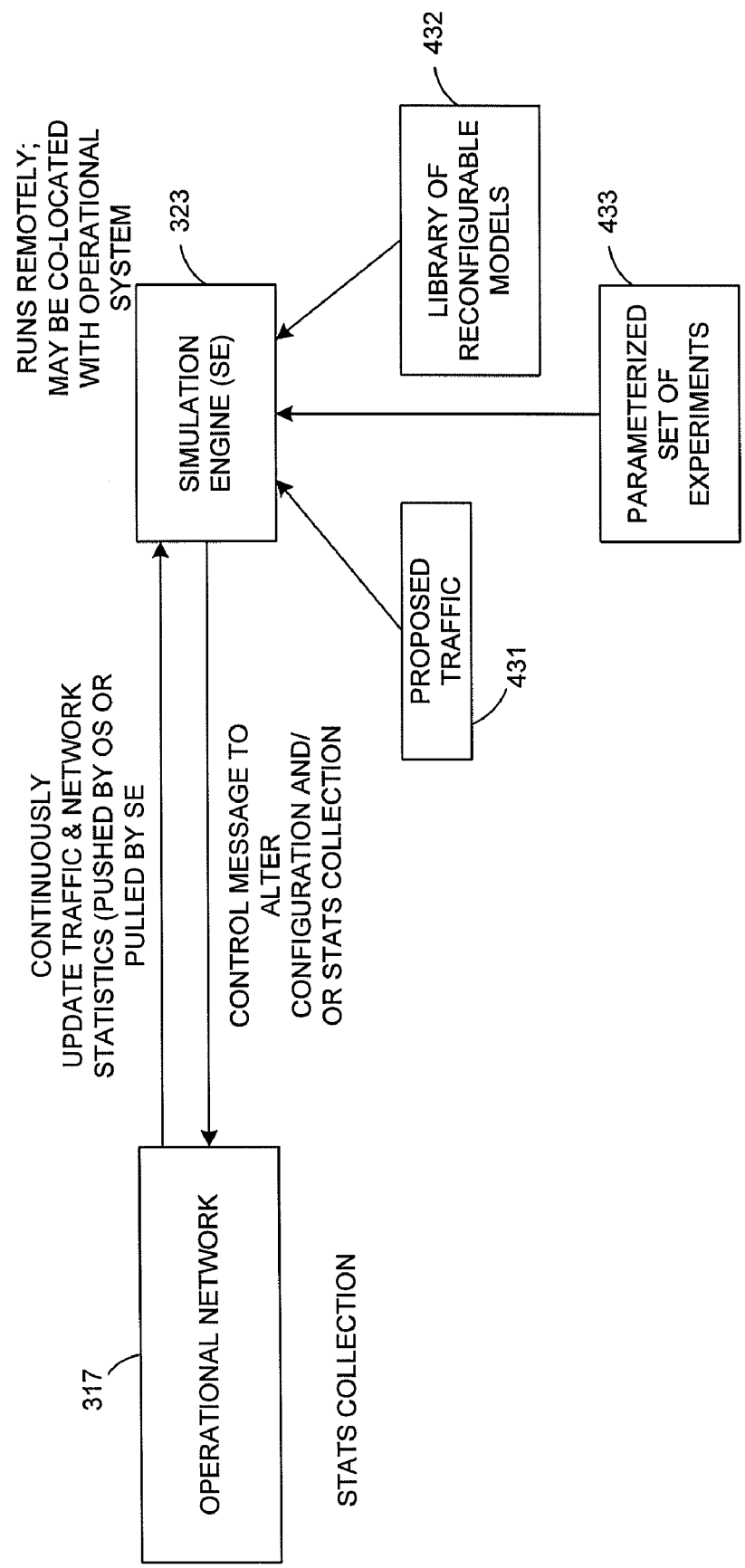
FIG. 4 is a block diagram illustrating various functional relationships among system components according to one embodiment as disclosed herein.

The functional interaction of the operational network 317 and the simulation engine 323 are, in accordance with one embodiment, illustrated in further detail in FIG. 4. As shown therein, the simulation engine 323 utilizes operational data 331 (as may be collected from the operational network 317 and processed by an experiment configuration engine 320 (not shown in FIG. 4), along with a library 432 of reconfigurable network models of appropriate granularity, a proposed network traffic distribution 431 input, and parameterized set of experiments 433, in order to run a simulation. Preferably, as previously mentioned, the simulation engine 323 runs a parallel discrete event simulation. The simulation engine 323 may, if desired, be run remotely, or may be collocated with the operational network 317. The simulation engine 323 may execute the reconfigurable network modules in library 432 on sequential processing or parallel processing computers, may use a mixture of models at multiple levels of fidelity, and/or may use different modeling paradigms (e.g. analytical, fluid-flow).

Returning now to the system of FIG. 2, according to at least one embodiment, an initial step in simulating and enhancing the operational network 217 is to identify the objective function 255 against which the operational network 217 will be optimized or enhanced. Examples of possible objective functions for an operational network 217 of certain characteristics include, e.g., throughput of a class of service, and/or end-to-end latency. Once the objective function 255 has been determined, the simulator 210 identifies a set of simulation experiments—for example, if the operational network 217 offers differentiated services, the simulator 210 may analyze the impact of changing buffer size, drop probability, and/or allocated bandwidth. Periodically, if desired, the simulator 210 may receive operational data, such as traffic load and queue utilization statistics, from the operational system 217 (via the experiment manager 215). The type of operational data may depend on level of fidelity at which the simulation is to be executed. The simulator 210 then may project future network traffic conditions, by performing a fast and accurate multi-paradigm simulation/analysis, evaluating objective function for current/projected traffic and current/new network configuration. The simulation results are preferably used to select new operational system/network configuration and, optionally, to dynamically change the operational system/network configuration.

Figure 5:
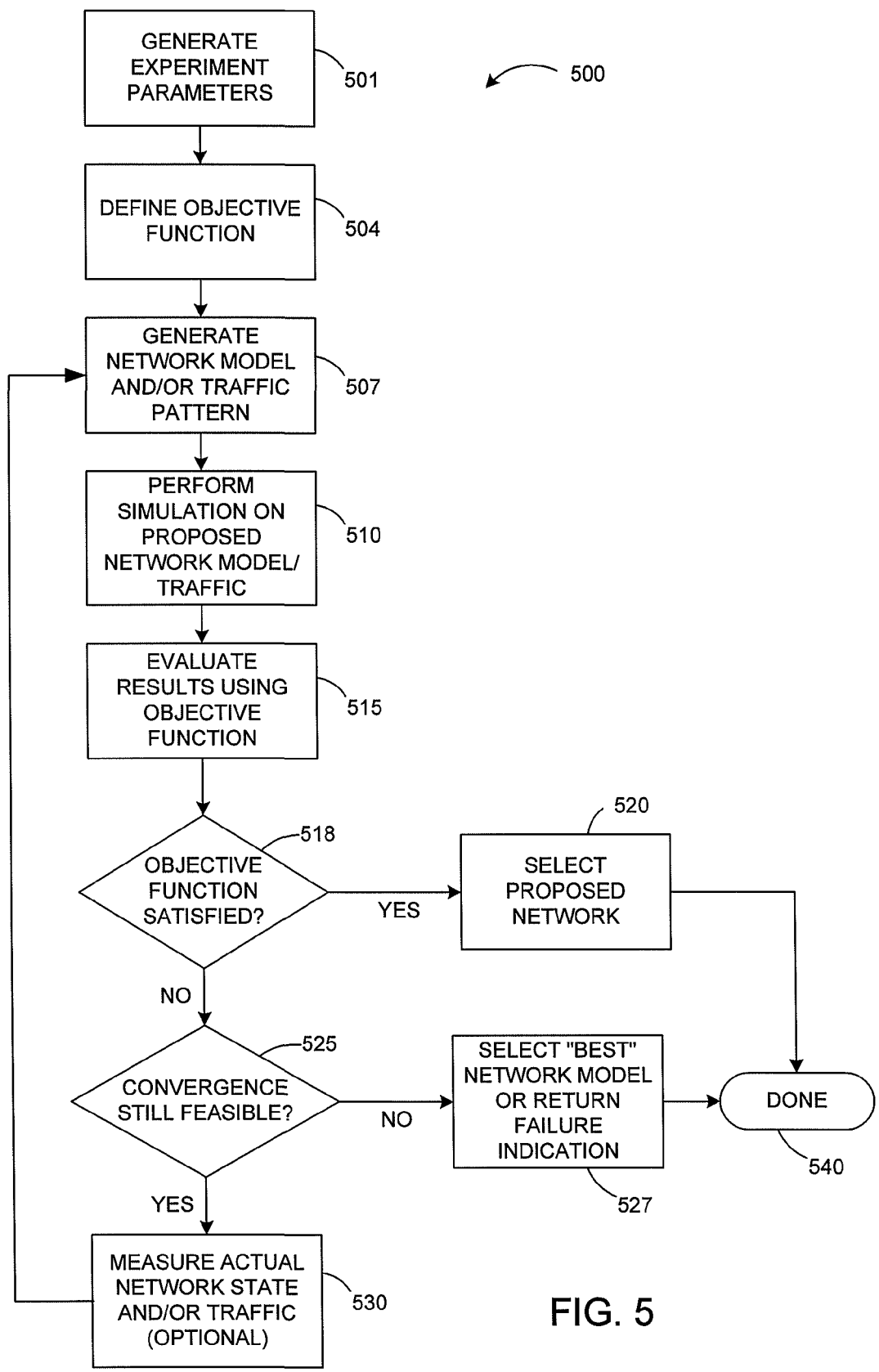
FIG. 5 is a process flow diagram for predicting network operation and enhancing network performance, in accordance with one embodiment as disclosed herein.

FIG. 5 is a process flow diagram for predicting network operation and enhancing network performance, in accordance with one embodiment as disclosed herein. While the example of FIG. 5 is described in relation to the system 200 shown in FIG. 2, it should be understood that the principles therein may be applicable to other systems and embodiments as well.

As illustrated now in FIG. 5, in a first step 501, parameters for the simulation (or series of simulations) are generated. Such parameters may include, for example, algorithms by which various proposed network configurations and/or network traffic distributions are derived. Various simulation settings (e.g., number and relative locations of nodes in the network, movement pattern(s) of the nodes, battery power and usage of the nodes, buffer space availability of the nodes, channel bandwidth, signal propagation characteristics (if applicable), frequency utilization, etc.) may also be defined at this point. Next, in step 504, an objective function is defined. The objective function may be entered or defined by a system programmer or operator via a user interface (e.g., entered in a computer workstation). The nature of the objective function will generally depend upon the nature of the network being simulated. The objective function may be defined, for example, to maximize throughput between certain points, or to maximize throughput of certain types of traffic, to attain a certain level of throughput within given constraints (e.g., interference or errors), or achieve other such quantifiable goals.

Once the objective function has been defined, the simulation is initiated, starting with the generation of a first proposed network model and network traffic distribution, as indicated by step 507. The proposed network model and network traffic distribution are preferably generated according to the simulation parameters discussed immediately above. Then, in step 510, a simulation is performed on the proposed network model using the proposed network traffic distribution. Preferably, as previously mentioned, a parallel discrete event simulation technique is employed. In a next step 515, the results of the simulation are evaluated against the objective function defined in step 504. If the objective function is satisfied, as indicated in step 518, then the proposed network configuration may be selected, as indicated by step 520. If, on the other hand, the objective function is not satisfied, then the evaluator or analyzer may determine, if appropriate, whether convergence is still feasible (as evaluated at step 525), given the remaining network configurations, proposed traffic distributions, or available time for analysis. Also, certain simulation scenarios may intelligently be culled during the evaluation process. If, for example, a trend has emerged that would logically get only worse as traffic is increased over certain links, then those simulation scenarios may be dropped, and only other simulation scenarios continue to be tested.

If convergence is not feasible, then various options are possible. The "best" proposed network model (in terms of satisfying the objective function) may be returned (step 527), or else a failure indication may be returned, or both. On the other hand, if convergence is still feasible, then the actual network state and/or network traffic load may optionally be measured, as indicated in step 530, and the process then return to step 507, wherein the next proposed network configuration and/or network traffic distribution may be selected and simulation performed. The simulation loop may continue on various different proposed network configurations and/or network traffic patterns until the objective function is met or the possibilities have been exhausted, at which point the process completes (step 540).

Rather than accepting the first network configuration that satisfies the objective function, the process 500 in FIG. 5 may be modified so that it runs through some or all of the remaining proposed network configurations and/or network traffic distributions, and the "best" network configuration may then be selected based upon the greatest compliance with the objective function, if the level of compliance is amenable to quantification or other objective evaluation.

Returning now to FIG. 2, in accordance with one embodiment, the simulator 210 is built on top of a simulation environment such as PARSEC (Parallel Simulation Environment for Complex Systems), a process-oriented simulation environment which allows simulation programs to run on multi-processor computers, such as an Origin™-type computer system commercially available from Silicon Graphics, Inc., or an Enterprise®-type computer system available from Sun Microsystems, Inc. Software source code for PARSEC is included herewith on the two compact discs in the computer program listing appendix. PARSEC object code is also available from the PARSEC User Manual For PARSEC Release 1.1, September 1999, published by UCLA Parallel Computing Laboratory.

Preferably, the simulator 210 utilizes a "layered" approach based on a reference model having a multi-layer architecture, such as the multi-layer architecture defined by the Open System Interface (OSI) reference model developed by the International Standards Organization (ISO). The OSI reference model, for example, includes seven layers, which are (from lowest to highest): (i) a physical layer, which is responsible for the physical transport of individual bits between two entities over a transmission medium; (ii) a data link layer, which is responsible for moving packets of data frame-by-frame from one node to another, and for performing error detection and correction; (iii) a network layer, which is responsible for routing information (typically in the form of data packets) within a network; (iv) a transport layer, which is responsible for segmenting long messages into packets and for reconstructing messages from received packets; (v) a session layer, which is responsible for controlling sessions between different entities (for example, by managing dialog control, tokens and synchronization); (vi) a presentation layer, which is responsible for managing data syntax, semantics and application-specific services to the user (examples are TCP and HTTP). Specific protocols may be defined for peer-to-peer communication at the transport layer, session layer, presentation layer and application layer, and these protocols are sometimes referred to as the transport protocol, session protocol, presentation protocol and application protocol, respectively.

Where the simulator 210 utilizes a layered approach based upon a multi-layer architecture (such as the OSI reference model multi-layer architecture), application programming interfaces (APIs), i.e., standardized software specifications which provide interfaces between an OSI-based application and a non-OSI network, between layers of the model are preferably defined as close to the operational protocol stack as possible, thus facilitating rapid prototyping of new protocols and integration of operational protocols.

In the PARSEC simulation environment, each process in the physical network 217 can be modeled as a logical process, and interaction among logical processes are generally modeled by time-stamped message exchanges. In one exemplary embodiment as described herein, where the simulator 210 is based upon the OSI reference model multi-layer architecture, the entire protocol stack is modeled as a logical process, and a series of function calls are used for consecutive events with no delay. Alternatively, each layer of the protocol stack may be modeled as a logical process in PARSEC, and the APIs between layers may be defined by the PARSEC Messages, but this approach can substantially increase the number of events to be processed (because a single event involving multiple layers would generally need to be broken down into multiple events) and therefore slow down the simulation. By modeling the whole protocol stack as a logical process, and using a series of function calls for consecutive events with no delay, the simulator 210 can significantly reduce the number of scheduled events and simplify the communication topology.

It may be advantageous in certain simulation models to restrict the network nodes to communicating with other nodes only through the lowest layer, and to prevent models at layers other than the lowest from directly accessing the data for other network nodes. These restrictions can make the underlying parallel simulation kernel almost transparent at the user level. As described hereinafter with respect to a particular example, each logical process may be required to give its topological information and a lookahead property to the PARSEC parallel conservative runtime code. If a model at an upper layer could communicate directly with other nodes, the topological and lookahead specification for the parallel execution may need to be specified by the modeler (which may substantially increase the programming overhead for protocol modelers). By limiting the communication among network nodes to the lowest layer, the topological and lookahead specifications only need to be placed at the lowest layer, which does not need to be modified or even observed by most modelers.

The simulator 210 can generally be configured to utilize any of a variety of propagation (i.e., path loss) models, radio models, and other protocol models. For example, the simulator 210 may be configured to utilize any of the simulation models indicated in Table 1 below:

TABLE 1

| | |
|---|---|
| APPLICATION | FTP, Telnet, CBR, http, Tcplib, synthetic traffic, self-similar traffic |
| TRANSPORT | TCP (FreeBSD, SACK), UDP |
| MULTICASTING | ODMRP, DVMRP |
| ROUTING | Distributed Bellman-Ford, OSPFv2, RIPv2, Fisheye, DSR, LAR, AODV, BGP |
| MAC | CSMA, MACA, IEEE 802.11, IEEE 802.3, MPLS |
| PHYSICAL | Point-point link, wired bus, IEEE 802.11 DSSS radio |
| CHANNEL | Free space, TIREM, 2-ray ground reflection model, path loss trace files, fading, shadowing, SINR |
| ANTENNA | Isotropic, directional, switched beam |
| MOBILITY | Random waypoint, trace files, MODSAF |

The models in Table 1, which relate to well known characteristics and protocols for wired and wireless communication, are merely examples, and are not intended to limit the invention in any manner. The simulator 210 may be configured to utilize other or additional models.

For purposes of illustration, the following explanation will be provided with respect to an example of an over-all simulation model which uses some of the most common radio communication models—more specifically, the two-ray path loss model, the IEEE 802.11 direct sequence spread spectrum (DSSS) physical (PHY) radio model, and the IEEE 802.11 distributed coordination function (DCF) medium access control (MAC) protocol model. However, the principles of the invention are not limited to any specific set of simulation models.

The IEEE 802.11 standard is well known in the field of wireless communications, and a general description of the standard may presently be found, for example, in "IEEE 802.11 Tutorial" by Jim Zyren and Al Petrick, which publication is hereby incorporated by reference as if set forth fully herein. Besides the parameters defined in the IEEE 802.11 standard, the radio PHY model may further be based upon WaveLAN-II, an actual implementation of the IEEE 802.11 DSSS protocol, as described, for example, in A. Kamerman and L. Monteban, "WaveLAN-II: A High-Performance Wireless LAN for the Unlicensed Band," Bell Labs Technical Journal, Vol. 2, No. 3, pp. 118-133 (1997), hereby incorporated by reference as if set forth fully herein. Path loss models for signal propagation may be generated in any of a variety of manners. For example, a two-ray path loss model may be formulated assuming, e.g., free space propagation for near sight, and a path loss exponent of, e.g., four for far sight, to account for the effect of ground reflection other than the line of sight between the transmitter and receiver. The cross-over point of near and far sights for such a model may depend upon various factors such as the radio frequency and the antenna heights of transmitter and receiver. Of course, other path loss models may be used.

Modeling of interference of the wireless transmission medium can be accomplished in the simulator 210 using any of a variety of techniques. Typically for wireless communication systems, one of the more important phenomena to model is interference between simultaneous transmissions on the same channel. Due to its broadcast nature a transmitted signal can increase the noise level at all radios receiving on the same frequency in the vicinity, which can increase the signal-to-noise ratio (SNR). Thus, for each signal transmitted by a radio, we must compute the path loss, i.e. the power at which the signal is received, at each of the other nodes in the network. Even weak signals that cannot be effectively received by a radio can nevertheless be accumulated into a high noise level. Simulations that ignore the effects of these simultaneous transmissions will, in general, be unreliable; however, the consideration of such effects can easily increase the number of events at the physical layer by several orders of magnitude.

To illustrate the impact of interference computation on the simulation complexity, it is useful to consider the situation of a radio signal transmitted by one network node to another network node in a wireless network composed of N nodes. Such a transmission creates two events (i.e., a beginning-of-transmission signal and an end-of-transmission signal) at the intended destination receiver, if interference is not considered, while the number of events grows to 2(N-1) if interference is taken into account, since every node other than the transmitter would then also require two events to calculate its noise level during the signal transmission. Since a large proportion (e.g., 95%) of the total events might be scheduled at the lowest layer in a high-fidelity network model, including interference effects in wireless network simulation will typically be computationally expensive. As the size (in terms of nodes) of the network under consideration grows, the proportion of scheduled events at the lowest layer will grow at an even faster rate. As a result, the radio and propagation models can play a significant role in determining the performance and the efficiency of an entire wireless network J 0 simulation. One way to reduce the number of events resulting from interference consideration while maintaining reasonable accuracy of noise level computation, is to restrict the number of other nodes at which the path loss computation must be performed. Although each signal can theoretically increase the noise level of every node in the model, an assumption may be made within the simulator 210 that a signal's effect will be minor or insignificant for nodes located far from the transmission source of the signal.

In accordance with one or more embodiments, the simulator 210 reduces the number of path loss calculations by using multiple partitions, each of which represents, e.g., a non-overlapping geographical area of the terrain. A single logical process may represent each partition and may be responsible for simulating all the layers of all the network nodes located in the corresponding geographical area. Each partition preferably calculates the path loss for all the network nodes within the partition area in the same way as without multiple partitions. However, a partition preferably does not directly calculate path loss for nodes located in other partitions; rather, it computes a path loss value for the reference point of every other partition. The reference points of a partition for other partitions are preferably chosen so that they give the minimum path loss value between two partitions. A network model may be decomposed into partitions geographically, as in the example provided below, or may be partitioned according to some other strategy.

Figure 10:
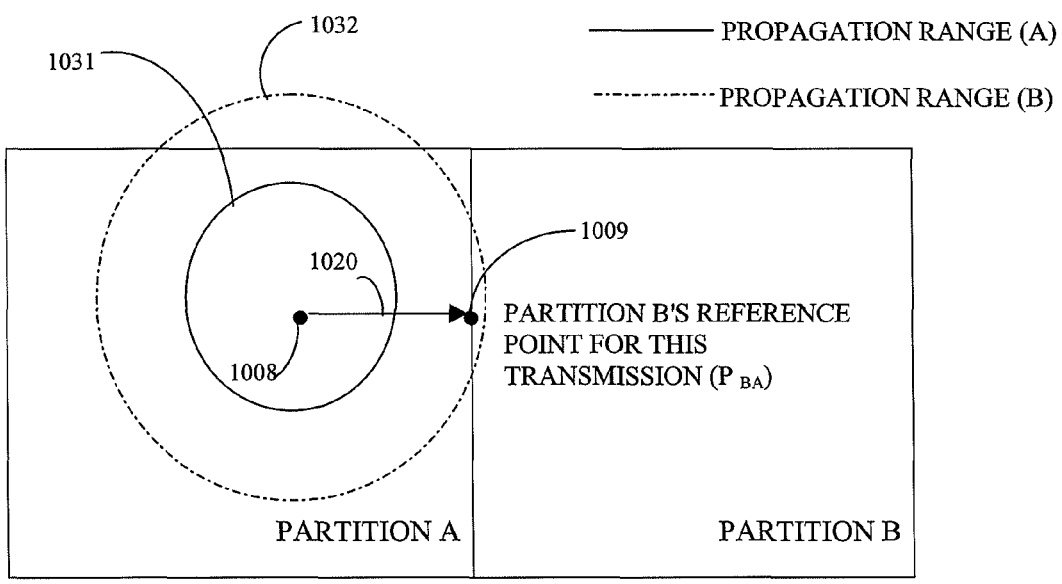
FIG. 10 is an illustration of the effect of multiple partitions on path loss calculations.

To illustrate this concept with an example, two partitions A and B may be defined, as shown in FIG. 10. A reference point 1009 is selected for Partition B, as also shown in FIG. 10. When a network node 1008 in Partition A transmits a signal, if the radio power at the chosen reference point 1009 in Partition B is inside the propagation range (e.g., propagation range 1032), Partition B may contain network nodes that may be affected by the signal 1020; thus, in this case, Partition A delivers a message to Partition B. Partition B then calculates path loss for all the nodes in its area and schedules events appropriately. In this situation, the overall number of path loss calculations for the signal 1020 has the same computational cost as compared to the case without partitioning. However, if the chosen reference point 1009 is outside the propagation range (e.g., propagation range 1031), Partition B is deemed not have any network node that can be affected by the signal 1020; thus, Partition A would not need to send a message to Partition B based upon the transmission of signal 1020. In such a case, the overall number of path loss calculations for the signal 1020 becomes half that as compared to the case without partitioning, assuming that each of Partition A and B has an equal number of network nodes. Thus, partitioning generally need not be any more expensive in terms of computational cost for path loss calculations, and will frequently reduce the number of path loss calculations depending upon how many partitions exist and how far the transmitted signal effectively propagates.

Although only two Partitions (A and B) are illustrated in FIG. 10, the above example can be extrapolated for simulations in which there are more partitions.

Preferably, when executed using parallel discrete-event simulation, the simulation model utilized by the simulator 210 is comprised of a number of partitions equal to or greater than the number of processors in the parallel computer on which the model is to be executed. The simulator 210 further preferably utilizes a synchronization protocol to ensure that no causality errors are introduced in the simulation result. The synchronization protocol may be either conservative (synchronous or asynchronous) or optimistic in nature. The PARSEC simulation environment provides both synchronous and asynchronous runtime libraries, and the simulator 210 may employ either a synchronous or asynchronous protocol, and either a conservative or optimistic synchronization protocol.

One example of a simulator 210 as may be used in connection with various embodiments as described herein uses a conservative protocol that is synchronous in nature. According to this embodiment, the synchronization protocol determines a global minimum event time before which none of the logical processes will send any messages to other logical processes. Preferably, the computation of this global minimum event time is based upon corresponding local minimum event times determined individually for each logical process.

In more detail, the synchronous protocol uses barriers to calculate for each logical process a minimum event time before which the logical process will not send any messages to other logical processes. Preferably, the local minimum event time is calculated as the sum of a time period associated with the earliest timestamp for any incoming messages received by the particular logical process $LP_i$, and a "lookahead" time period during which the logical process will not send any messages to other logical processes. The global minimum time may, if desired, be limited to a maximum ceiling value, which may be uniform for all logical processes, have different static values for different logical processes, and/or be adjustable dynamically either collectively or individually for different logical processes. The global minimum time, before which none of the logical processes will send any messages to other logical processes, may be calculated by the synchronization protocol based upon the minimum of all the local minimum event times calculated for each logical process. The simulator 210 then processes only events with timestamps earlier than the global minimum event time calculated by the synchronization protocol.

Figure 11:
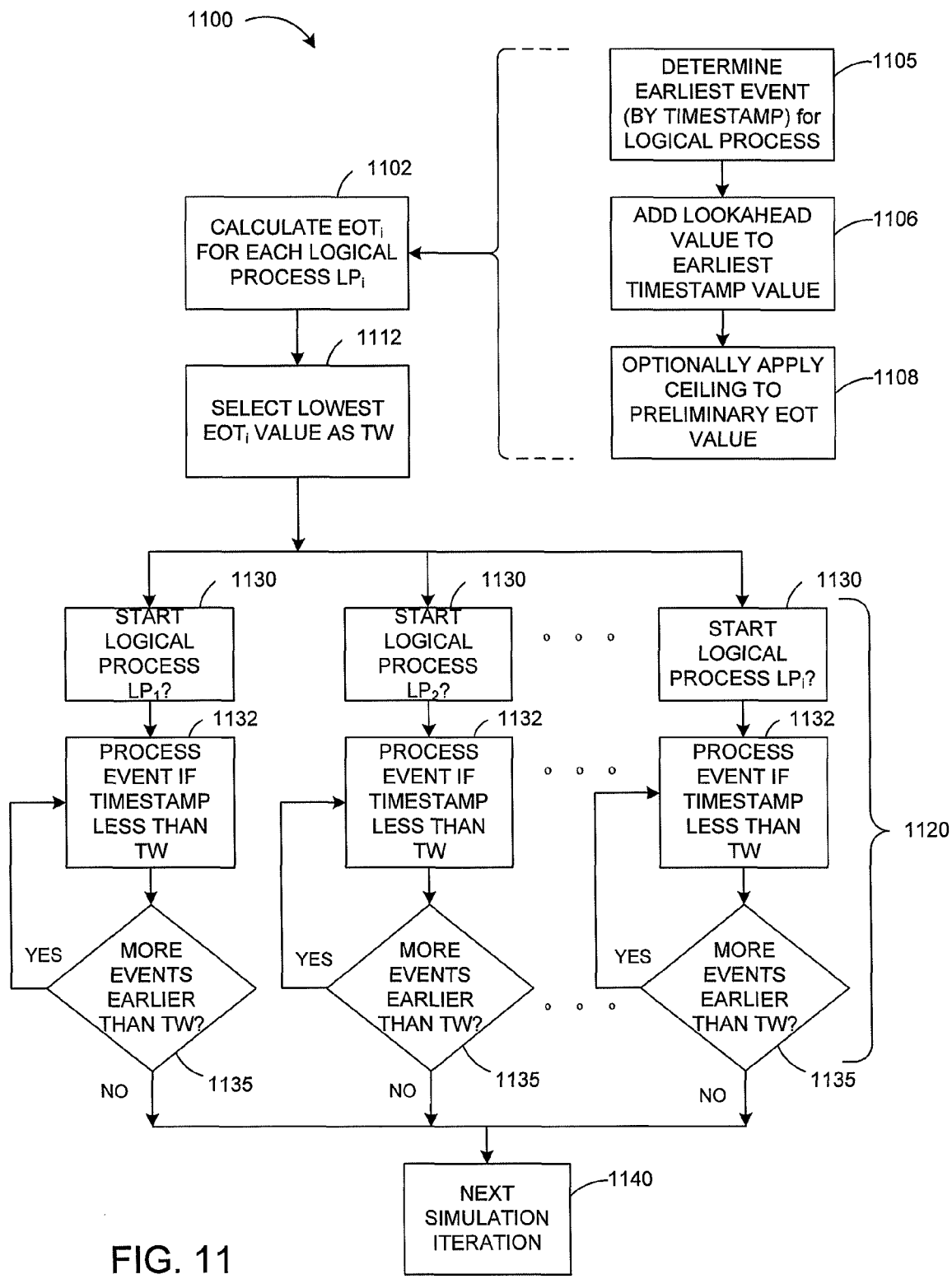
FIG. 11 is a process flow showing an example of operation of parallel discrete event simulation using a synchronization protocol, in accordance with one embodiment as described herein.

Operation of the above-described synchronization protocol may be explained in further detail with reference to the process flow 1100 shown in FIG. 11. The synchronization protocol illustrated in FIG. 11 preferably uses barriers to compute the global minimum event time TW, which represents a lower bound on the timestamp of any future messages sent by any logical process. To calculate the global minimum event time TW, as indicated by step 1102, the synchronization protocol first calculates, for each logical process $LP_i$, a minimum event time $EOT_i$ during which the logical process $LP_i$ will not send any messages to other logical processes. Preferably, the minimum event time $EOT_i$ is calculated as the sum of a time period associated with the earliest timestamp for any messages or events for the logical process, and a "lookahead" time period during which the logical process will not send any messages to other logical processes. Accordingly, in sub-step 1105, the earliest event for each logical process LP; is determined, according to the timestamps associated with the various events, and in sub-step 1106, a lookahead value (which is potentially individualized to each logical process $LP_i$ or groups thereof) is added to the earliest timestamp value for each logical process $LP_i$.

In a parallel discrete event simulation, the lookahead for a particular logical process $LP_i$ at a given simulation time T is defined as the duration for which it will not send any messages to its outgoing links. The lookahead property can significantly affect the performance of a parallel discrete event simulation. The minimum event time for a logical process $LP_i$ may also, if desired, be limited to a ceiling value (EOT-ceiling), as indicated in step 1108, which ceiling can be uniform for all logical processes LPi, selected individually for each logical process $LP_i$, and/or dynamically adjusted.

The global minimum event time TW is then calculated as the minimum of $EOT_i$ (i=1, . . . , N) for all of the logical processes LP; in the simulation, as indicated by step 1112.

After the global minimum event time TW is calculated for a particular simulation cycle 1120, as indicated now by step(s) 1130, 1132 and 1135, each logical process $LP_i$ processes messages or events with timestamps earlier than the global minimum event time TW without further synchronization, because it is guaranteed that no messages with timestamps earlier than TW will be sent out. When processing of all messages or events in the time window is completed, all of the logical processes stop at the barrier to calculate a new global minimum event time TW, and then the process repeats with the next simulation iteration 1140. As this particular synchronous simulation protocol does not necessarily require the topological information of logical processes, its performance is generally not affected by the specific connectivity of logical processes. However, the parallel simulation may perform poorly if even one logical process has a short lookahead value, because this situation would result in a small advance of the global minimum event time TW and thus relatively few events will be processed in the corresponding global synchronization cycle.

In accordance with a preferred embodiment, each logical process LP; (i.e., partition of network nodes), running in parallel, is augmented with a "lookahead calculator" whose task it is to produce the relative lookahead value (L) and the local minimum event time $EOT_i$. The lookahead calculator may take advantage of certain protocol-specific characteristics or assumptions in order derive various lookahead values. For example, in the context of an IEEE 802.11 compliant network, the lookahead calculator may utilize certain characteristics or assumptions as described in "Runtime Performance Optimizations for Detailed Wireless Network Simulation" (UCLA Computer Science Department technical paper), by J. Martin, M. Takai, and R. Bagrodia, to assist in calculation of an appropriate lookahead value. The foregoing technical paper is hereby incorporated by reference as if set forth fully herein. To facilitate the calculation of lookahead in this context, the lookahead calculation can be divided into two parts: (1) a relative lookahead calculation that determines the earliest timestamp of outgoing events in response to incoming events, and (2) an optional EOT-ceiling calculation that establishes a lower bound on timestamps of potential events that may be generated by the logical process. The EOT for a logical process (LP) is computed as the minimum between the calculated relative lookahead and the EOT-ceiling. An example of a potential event is a signal reception that is subsequently discovered to have a signal-to-noise ratio that is too high for successful reception. Specific examples of sources to assist in the calculation of an appropriate lookahead value in the context of an IEEE 802.11 compliant network may include the following:

Radio Transmitter Turnaround Delay: The 802.11 protocol specifies a minimum delay of 5 microseconds that is incurred by the radio in switching from receiving to transmitting mode or vice versa. Thus, even if a radio has a packet to transmit, it must incur at least this delay before the transmitted signal gets to the air.

Pre-sample Signal Receptions: If a radio is receiving a frame, there is a minimum delay before which it can respond. This delay includes the time to receive the frame itself plus the Short Inter Frame Space ("SIFS") delay, which defines a minimum time before which the node can respond to incoming packets. The SIFS delay is generally incurred for immediate response packets, such as acknowledgements. Assuming a 2 Mb/second bandwidth, the smallest data frame transmission time is 248 microseconds (the synchronization preamble time plus the shortest data duration) and the SIFS constant is defined as 10 milliseconds. Thus, as soon as an incoming frame is sensed by a node, the lookahead calculator can compute an EOT-ceiling as the sum of the data frame transmission time plus the SIFS delay. A further expansion of the lookahead is possible if the intended recipient of the frame is known and it is determined that the node receiving the signal is not required to respond (recall that because of the wireless medium, all nodes in the vicinity of a transmitter will sense the transmission). Of course, if the reception event is subsequently cancelled due to interference, the expanded EOT-ceiling is also canceled, and the node reverts to its previously computed lookahead value.

Further optimizations or enhancements to parallel discrete event simulation in the context of an IEEE 802.11 compliant network are described in the technical paper "Runtime Performance Optimizations for Detailed Wireless Network Simulation" referenced above. Such optimizations or enhancements may include, for example, one or more of (1) adding the MAC backoff delay (if non-zero) to the time window ceiling; (2) expanding the lookahead calculation to account for the upper layer activities; (3) modifying the main event scheduling loop to notify the lookahead calculator of all higher layer timeout events (such as periodic CBR traffic packets created up at the application layer) so as to avoid having to specify lookahead in the upper layer models (the timestamps of these events may be kept in a separate upper layer event heap, with the top element of the heap being the earliest such upper layer event for the particular partition); (4) using an additional queue in the simulator 210 to store the relative lookaheads of the nodes in a particular partition; and (5) augmenting the radio model to give a prediction of when the radio will transition to the idle state.

Figure 6:
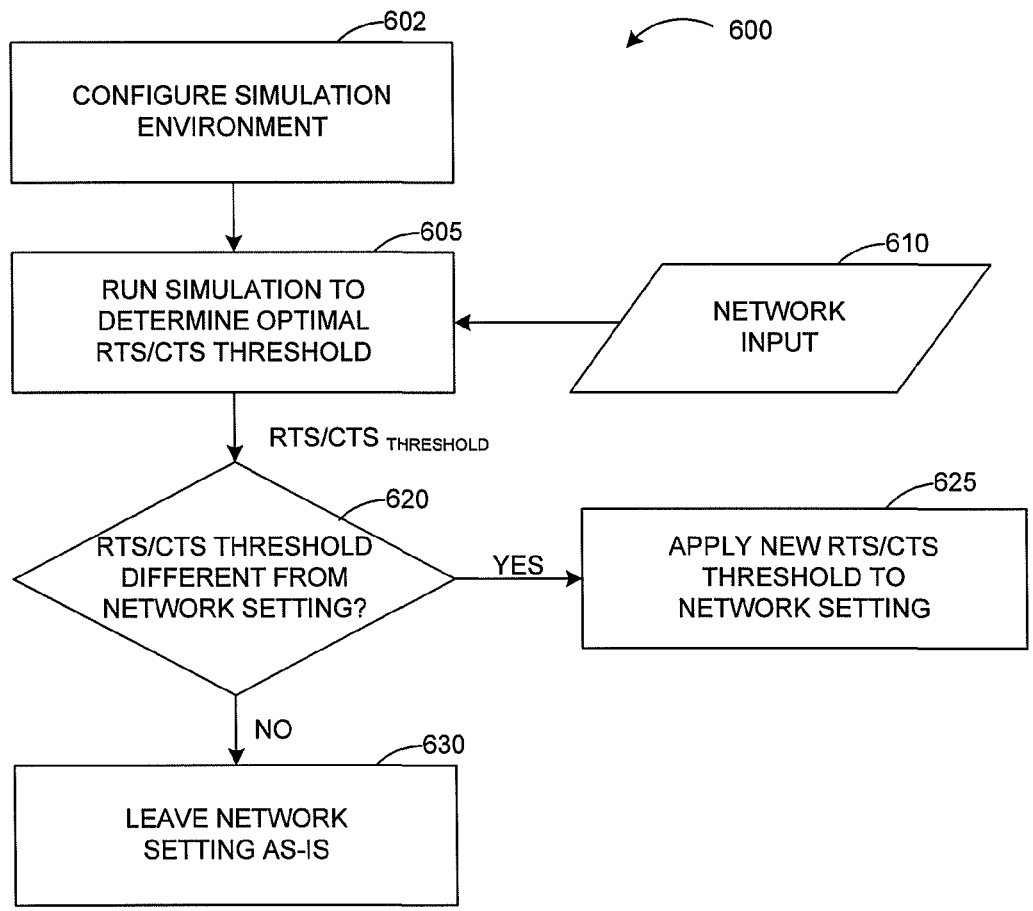
FIG. 6 is a process flow diagram showing an example of a technique for optimizing a wireless network according to a particular objective function.

An example in which the foregoing parallel discrete event simulation system for the 802.11 protocol can be utilized in connection with an optimization function for optimizing an aspect of network performance is illustrated by a process flow 600 shown in FIG. 6. As shown therein, in a first step 602, the network operator configures the simulator with an environment that mirrors the actual 802.11 compliant network to be simulated. The simulation settings may include, by way of example, the number of nodes in the network, movement pattern(s) of the nodes, battery power and usage of the nodes, buffer space availability of the nodes, channel bandwidth, signal propagation characteristics, frequency utilization, and any other network attributes deemed relevant to the simulation. Once the simulation environment is configured, as indicated by step 605, the simulation is run to determine whether and how the network should be optimized. In the particular example shown in FIG. 6, the simulation determines whether or not to change an RTS/CTS threshold, which is defined in the 802.11 protocol as the threshold level at which RTS/CTS control frames will be used prior to the transmission of data frames if the data frame size exceeds this threshold. Thus, in the example of FIG. 6, step 605 entails running the simulation (using, for example, the parallel discrete event simulation techniques previously described) in order to determine the optimal RTS/CTS threshold.

In running the simulation, the simulator 210 waits for network input 610, such as incoming network packets that are to be transmitted to neighboring nodes. The network input 610 may take the form of proposed network traffic distribution, and may be based, for example, on the actual network traffic load and/or a predicted network traffic load. Upon receiving the network input 610 (e.g., the incoming network packets), the simulator 210 processes two different scenarios: one with the use of RTS/CTS to transmit the network packets, and the other without the use of RTS/CTS to transmit the network packets. A simulation analyzer 224 then compares the throughput results, or other metrics, from both scenarios, and determines whether superior results would be achieved using the RTS/CTS method or not using the method to transmit the network packets. If the decision of the simulation analyzer 224 is different than that of the current settings in the network nodes, as indicated by decision step 620 in the process flow 600, then the network nodes are re-configured to use the new RTS/CTS threshold, as indicated by step 625, and the network simulation settings are simultaneously updated. If on the other hand, the decision of the simulation analyzer 224 is that the current settings of the network nodes are preferred, then the network nodes are left with their existing settings, as indicated by step 630.

In the foregoing example, the selection of the RTS/CTS threshold setting may be viewed as an optimization function for operation of the 802.11 compliant network being simulated. The simulation of the network provides predictive information from which the preferred settings for the network nodes may be determined. The network is thereby enhanced, effectively in real time, to operate at increased efficiency based upon results of the simulation. Use of the particular parallel discrete event simulation techniques described previously herein can provide the capability of fast enough simulation so as to allow effectively real-time optimization or enhancement to occur.

Figure 7:
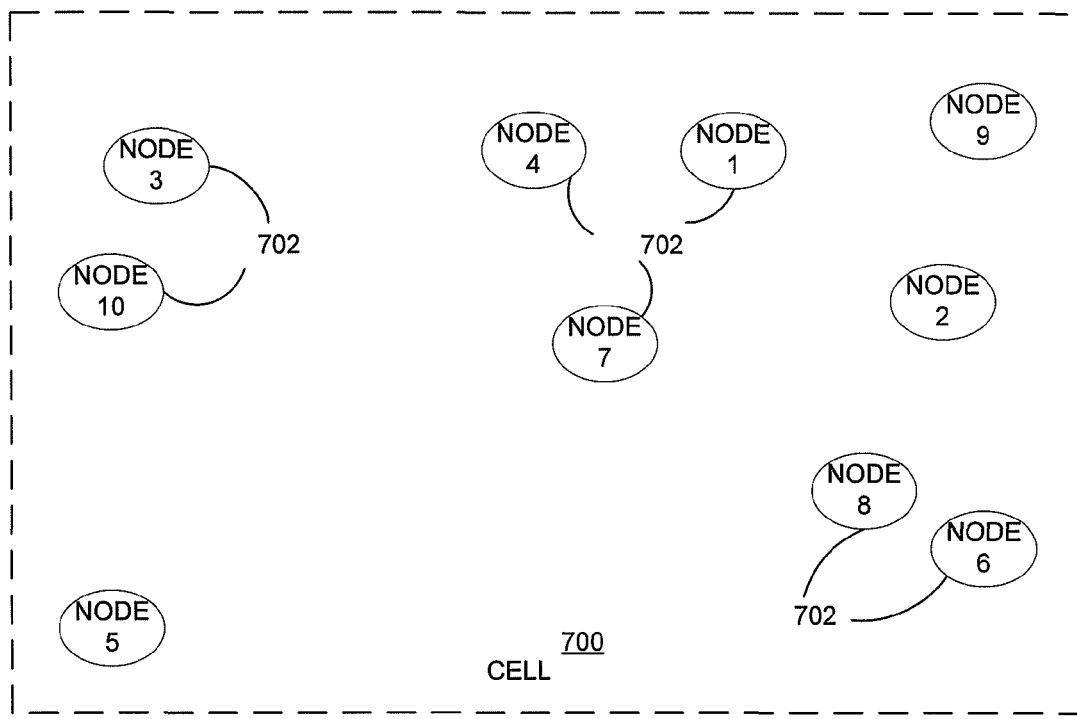
FIG. 7 is a diagram of an exemplary network for which simulation and management may be performed using techniques disclosed herein.

FIG. 7 is a diagram showing an example of a portion of an 802.11 network to which the simulation and network management techniques described herein may be applied. FIG. 7 depicts a cell 700 of an 802.11 network with ten nodes 702 in the cell 700. While only ten nodes 702 are used in this example for purposes of illustration, a simulation might involve dozens or even hundreds of nodes or more in practice. In the particular example of FIG. 7, the ten nodes 702 are all assumed to be within range of one another, and each is moving within the cell at a rate of 10 meters per second. Eight of the ten nodes 702 are participating in a total of four constant bit rate (CBR) communication sessions, with two CBR sessions (node 1 to node 2 and node 3 to node 4) sending packets (1460 bytes each) at 5 millisecond intervals for five minutes, and the other two CBR sessions (node 5 to node 6 and node 7 to node 8) sending packets (512 bytes each) at 5 milliseconds for five minutes.

Figure 8:
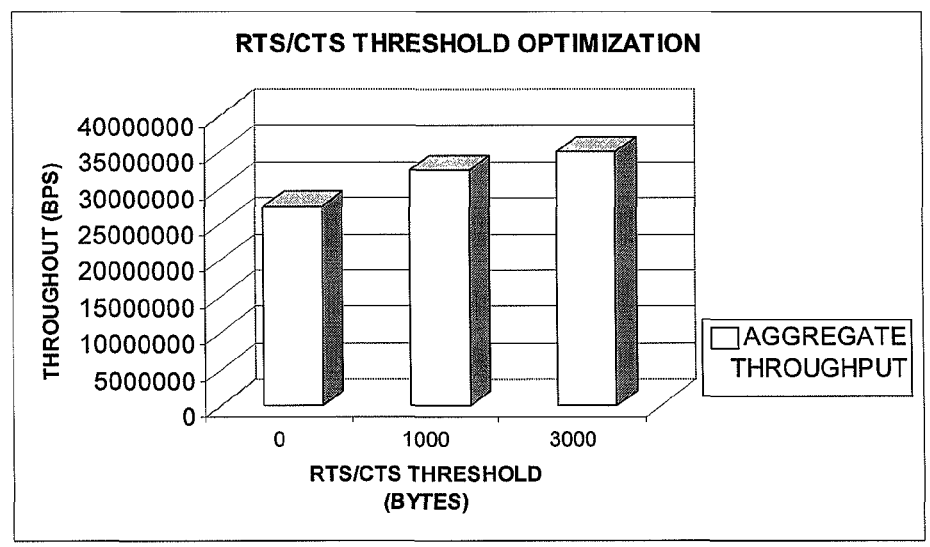
FIG. 8 is a graph comparing simulation results for the network shown in FIG. 7 with various different modeling parameters.

Per step 602 of the process flow 600 in FIG. 6, the simulation environment is configured to have the same settings as the actual network portion illustrated in FIG. 7 (a larger portion or the entire network could of course also be simulated). Then, the simulation engine is provided with the network input 610, which in this example would constitute the CBR sessions and their traffic characteristics, and simulates the network, per step 605, using various RTS/CTS thresholds to determine which threshold to use so as to maximize aggregate network throughput (which is the objective function in this case). In this particular example, the simulation engine varies the RTS/CTS threshold to 0 bytes, 1000 bytes and 3000 bytes, although other values could also be chosen. Results of the simulation are shown graphically in FIG. 8, in terms of bits per second for each of the three selected threshold levels.

Given the simulation results output from the simulation engine, the analyzer (e.g., analyzer 224 shown in FIG. 2) determines that the RTS/CTS threshold for the simulated network portion (cell 700) and, hence, the specified network input should be set to 3000 bytes since this threshold provides the best aggregate throughput. The simulation and evaluation system may then check the wireless network card to determine the RTS/CTS threshold currently being utilized. If the RTS/CTS threshold is different from 3000 bytes, the simulation and evaluation system sets the RTS/CTS threshold to 3000 bytes in the wireless network card; otherwise, it remains at 3000 bytes.

It may be noted that the simulation engine and experiment analyzer (e.g., simulator 223 and analyzer 224) can be executed at each node 702 or at a designated central node (which may, but need not be, geographically centralized with respect to the network boundaries). If they are executed at each node 702, the network input is broadcast from each node to all other nodes 702. Then, the simulation engine and analyzer are executed at each node 702. If the central node approach is used, the simulation engine and analyzer are executed only at the designated central node, but not at the other nodes 702. In such a situation, the network input is broadcast to the central node by each of the other nodes 702, and the simulation engine and analyzer are executed at the central node. Once the optimized RTS/CTS threshold is determined by the analyzer, the results may be broadcast back to each node 702 to instruct it to adjust its RTS/CTS threshold accordingly.

In the example shown in FIG. 7, a uniform or global RTS/CTS threshold is determined. Alternatively, the simulation engine and analyzer (whether centrally located at a base station node, or else located at each node 702) could determine the RTS/CTS threshold individually for each node 702.

Figure 12:
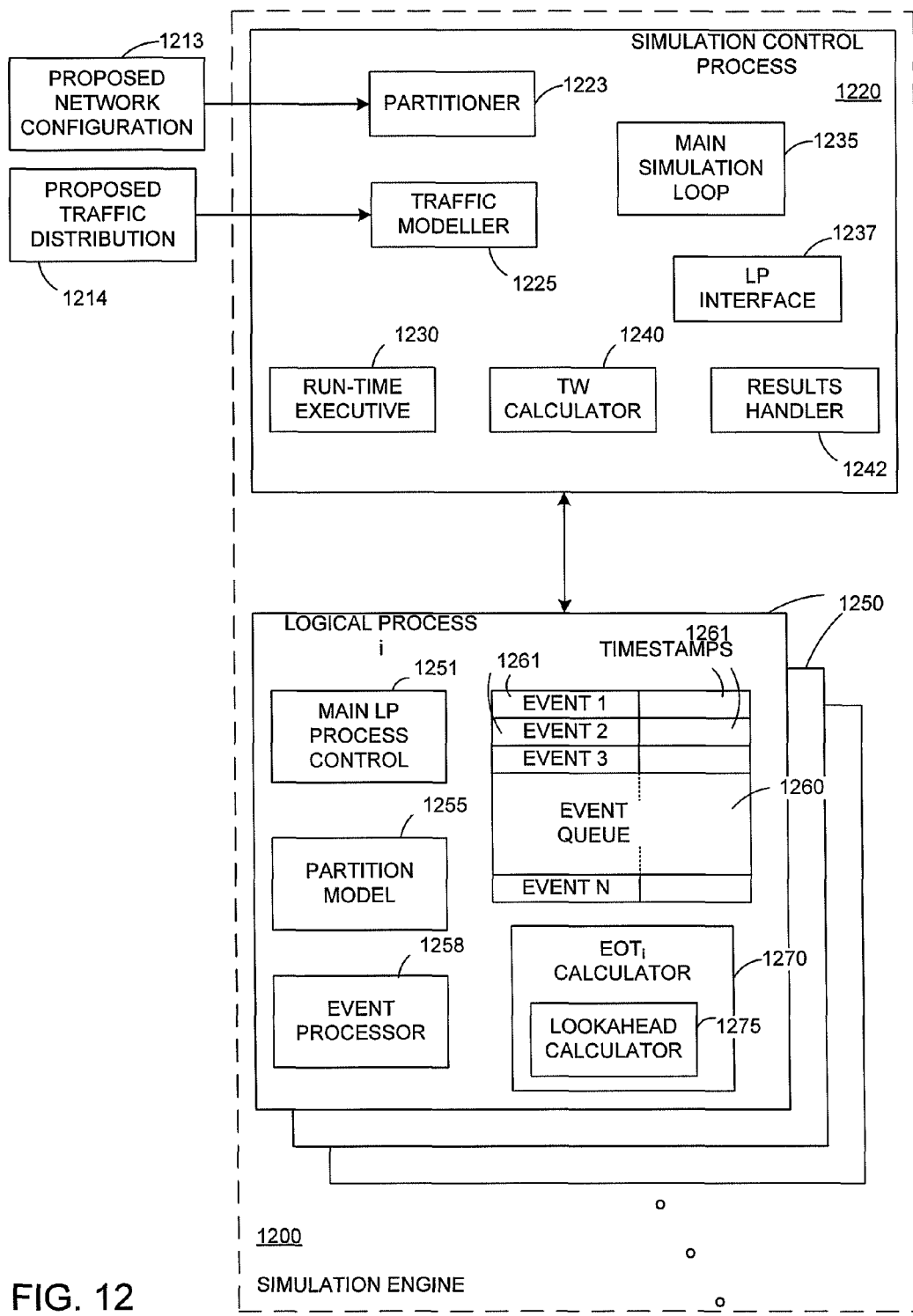
FIG. 12 is a conceptual block diagram of a simulation engine as may be used in connection with various embodiments as described herein, utilizing a conservative synchronization protocol that is synchronous in nature.

FIG. 12 is a block diagram of a simulation engine 1200 as may be used in connection with the process flow shown in FIG. 6. As shown in FIG. 12, a simulation engine 1200 obtains a proposed network configuration 1213 and a proposed network traffic distribution 1214 from, e.g., an experiment manager or configuration engine (not shown in FIG. 12). The simulation engine 1200 comprises a number of constituent processes or software components, including a top-level simulation control process 1220. The simulation control process 1220 preferably comprises, among other things, a partitioner 1223 and a traffic modeller 1225. The partitioner 1223 receives the proposed network configuration 1213 and divides it into a number of partitions. The partitioning of the proposed network configuration 1213 may be conducted according to any convenient technique. A number of logical processes 1250 are instantiated by the simulation control process 1220, each logical process 1250 being responsible for one or more of the network partitions. The traffic modeler 1225 receives the proposed traffic distribution 1214 and distributes the appropriate messages and/or events to a run-time executive 1230 (i.e., a process that manages various aspects of an active simulation) or to the various logical processes 1250.

Once the network model and traffic are initially processed and provided to the various logical processes 1250, the main simulation loop 1235 of the simulation control process 1220 runs through the simulation. Preferably, the main simulation loop 1235 manages the operation of a parallel discrete event simulation over the partitioned network model. The main simulation loop 1235 conducts a number of successive iterations of the simulation until a termination condition is met (typically a pre-defined time period). For each iteration, the simulation control process 1220 uses the TW calculator 1240 to a new global minimum event time TW. The TW calculator 1240 obtains the local minimum event time $EOT_i$ from the $EOT_i$ calculator 1270 of each logical process 1250 and, from all of the data so gathered, selects the lowest or earliest to arrive at the global minimum event time TW.

The $EOT_i$ calculator 1270 in each logical process 1250 preferably employs a lookahead calculator 1275, the general nature of which has been previously described, in order to facilitate determination of the local minimum event time $EOT_i$. The $EOT_i$ calculator 1270 preferably computes the local minimum event time $EOT_i$ using the list of events in an event queue 1260 of the logical process 1250 and its lookahead in order to determine the earliest future event, as previously described herein. After the global minimum event time TW has been determined, the main simulation loop 1235 initiates parallel processing of the logical processes 1250 to develop independently simulation results for each network partition. Each logical process 1250, under control of a main logical partition control process 1251, invokes an event processor 1258 to process, in timestamp order, the events 1261 in event queue 1260 for the respective network partition 1255 associated with the logical process 1250, until all the events with timestamps less than the global minimum event time TW have been processed.

The run-time executive 1230 manages the exchange of messages and/or events between logical processes 1250 between iterations of the simulation. A logical process interface 1237 may be provided in the simulation control process 1220 to interface with (e.g., send control instructions, receive status messages, etc.) with the individual logical processes 1250. A results handler 1242 collects the output results from the various logical processes 1250 and organizes the results for later processing and evaluation downstream. After a simulation has been completed by the simulation control process 1220, a new proposed network configuration 1213 and/or proposed network traffic distribution 1214 may be presented to the simulation control process 1220.

Figure 9:
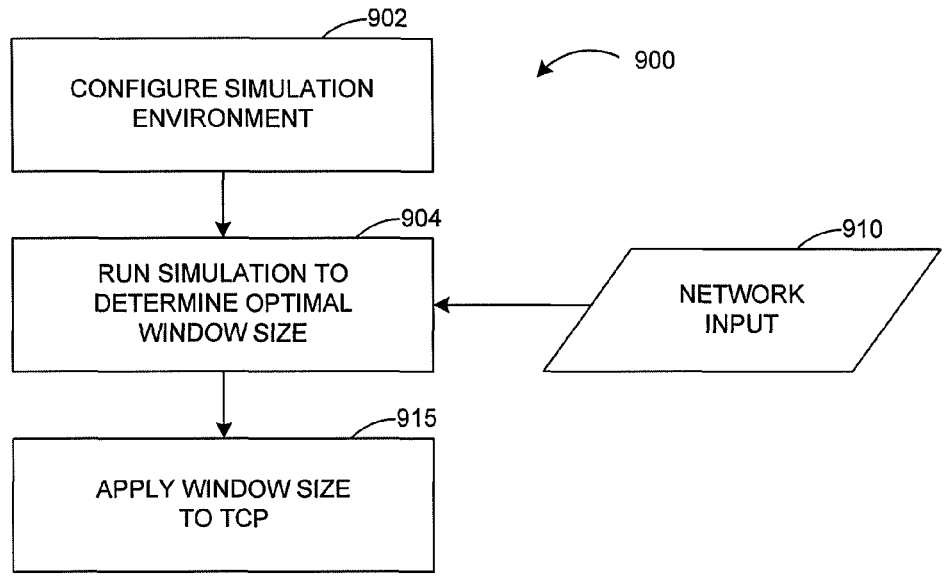
FIG. 9 is a process flow diagram for predicting network operation and enhancing network performance for another exemplary network type.

Another example in which the foregoing parallel discrete event simulation technique can be utilized in connection with an objective function for enhancing an aspect of network performance is shown in FIG. 9. The process 900 illustrated in FIG. 9 relates to a TCP/IP network. "TCP" refers to Transmission Control Protocol and relates to a protocol for connection-oriented services, while "IP" refers to Internet Protocol and defines a layer for exchanging data packets between computers connected to the Internet. "TCP/IP" refers to a well known combination of protocols involving both TCP and IP. In the example of FIG. 9, the objective function is to determine the optimal TCP send window size in order to optimize, by way of example, aggregate network throughput. Other possible objective functions might include, but are not limited to, fairness of TCP sessions, differentiated services (e.g., allocating more bandwidth for premium paying customers), and congestion control. As shown now in FIG. 9, in a first step 902, a network operator configures the simulator with an environment that mirrors the actual TCP/IP network. The simulation settings may include, for example, the number of nodes in the network, the network topology (including node location and connectivity), network protocols being utilized, and the link bandwidth and delay. In addition, the simulation settings could also model wireless network attributes and, as such, may also include, for example, movement pattern(s) of the nodes, battery power and usage of the nodes, buffer space availability, channel bandwidth, signal propagation characteristics, frequency utilization, and other wireless network characteristics.

Once the simulation environment is configured, and as indicated by step 904, a parallel discrete event simulation is run to determine how the network should be optimized. In the particular example shown in FIG. 9, the simulation determines the optimal TCP send window size to use for transmitting TCP data. In running the simulation, the simulation engine (for example, simulation engine 223) waits for network input 910, such as incoming network packets that are to be transmitted to one or more nodes. Upon receiving the network input 910, the simulation engine 223 processes various scenarios, by adjusting the TCP send window size, to determine the optimal TCP send window size to use to transmit TCP data. The analyzer 224 then compares the throughput results, or other metrics, from all scenarios, and determines the optimal TCP send window size. The simulation and evaluation system 210 then may reconfigure the network nodes to use the resultant optimal TCP send window size, as indicated by step 915.

While some of the foregoing examples have been explained with reference to particular network types (that is, a wireless network using the 802.11 protocol and a TCP/IP network using TCP protocol), the principles thereof may be applied to many different types of network systems and environments.

One example of an application of the principles and concepts described herein relates to Quality of Service (QoS) provisioning. As the Internet has grown to service diverse customers with many different service requirements (in terms of bandwidth, speed, protocol, content, quality, etc.), a need has arisen to provide multiple levels of service to meet different customer requirements. The capability to provide service differentiation, via resource allocation, bandwidth provisioning, traffic engineering, and other techniques, is generally referred to in the industry as Quality of Service (QoS). The QoS provisioning ability of a network or network device can be substantially enhanced by using the principles developed herein and described previously. A specific example of tuning a QoS provisioning mechanism may be illustrated with respect to a congestion avoidance scheme known as Weighted Random Early Drop/Detection (WRED). WRED is used at network devices, such as network routers, to probabilistically drop packets, where the drop probability generally depends on the relative priority of the packet and the level of current congestion in the network, According to one embodiment of a simulator in accordance with certain principles described herein, for each packet priority level, the simulation and evaluation system 210 (see FIG. 2) defines a set of parameters, $mint_i$ and $maxt_i$ that respectively refer to the minimum threshold queue length and maximum threshold queue length for the $i^{th}$ priority level. The probability with which a packet at a given priority level will be dropped at a router can be tuned dynamically based on the choice of the minimum and maximum threshold parameters for the corresponding priority level.

Applying this example to a specific network embodiment, consider a network that is servicing traffic at two priority levels, high and low. The simulator 223 receives network input corresponding to distributions of high and low priority packets. These traffic distributions may be derived, for example, from real-time measurements taken from the network using widely deployed network management tools. Upon receiving the network input, the simulator 223 determines the overall bandwidth, delay, or related metric(s) for the low and high priority data packets for multiple sets of threshold queue lengths. The analyzer 224 of the simulation and evaluation system 210 then may determine specific settings of the thresholds that optimize the objective function, and provide instructions or information for reconfiguring the network routers to use the corresponding thresholds that in turn control the allocation of buffers or queues among the two traffic classes.

Similar applications may be employed to alter the provisioning of bandwidth among audio, video, and/or data traffic or to alter the per hop behavior (PHB) of a network for different classes of traffic.

Another example of an application to which the principles and concepts described herein may be applied is network routing. To prevent links from becoming congested, dynamic simulation may be employed to change routing protocol parameters, switch between different routing protocols, and/or reduce routing control overhead. As an example, to reduce routing control overhead, the simulation and evaluation system 210 receives input from the operational network 217. In this example, the input may comprise, e.g., the frequency of link breaks in the network. Upon receiving the network input, the simulator 223 may simulate various options based upon different frequencies of generating routing update packets. The analyzer 224 then determines the optimal frequency for generating the routing update packets and reconfigures, or provides instructions for reconfiguring, the network nodes of the operational network 217 to use the optimal frequency.

Yet another exemplary environment to which the principles and concepts described herein may be applied is a wireless domain. Dynamic simulation may be employed, for example, to determine the transmission schedule of the wireless nodes within a cell in a cellular network. In such an example, the simulator 223 may operate at a base station while awaiting network input. The network input in this case might be, for example, the traffic characteristics of each node in a particular cell, including such things as average packet size, file transfer size, sending rate, burst rate, and/or priority level of the packets or nodes themselves. Upon receiving the network input, the simulator 223 may determine the optimal scheduling of the nodes to satisfy the objective function(s). The analyzer 224 then determines the optimal schedule to deploy, and reconfigures the base station to disseminate the transmission schedule to all nodes operating in the cell.

Software code reflecting aspects of a particular embodiment, and illustrating a tangible application of various concepts and principles as described previously herein, is provided in the computer program listing appendix submitted herewith.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A method for enhancing performance of a physical network under real-time control using simulation of a reference model representing the physical network under control, the method comprising the steps of:

(a) receiving data indicating a recent network state and recent network traffic of the physical network under real-time control;

(b) generating a proposed network configuration and a proposed network traffic distribution for the proposed network configuration based at least in part on the recent network state and recent network traffic of the physical network under real-time control;

(c) executing one or more simulations, using a conservative parallel discrete event simulation technique, for the proposed network configuration based upon the proposed network traffic distribution, using a simulation reference model employing a layered architecture thereby allowing simulation of activity at a plurality of different protocol layers in the proposed network configuration, wherein said one or more simulations are executed such that the network nodes are constrained to communicate only via the lowest layer of the architecture within the reference model even where simulated events occur at higher level layers;

(d) determining a desired network configuration for the physical network under real-time control by evaluating the results of said one or more executed simulations to determine reconfiguration instructions based upon application of an objective function for enhancing an aspect of network performance to the simulated network configuration;

(e) conveying said reconfiguration instructions for the desired network configuration to the physical network under real-time control and reconfiguring the physical network under real-time control in accordance with the desired network configuration; and (f) repeating steps (a) through (e) to effectuate ongoing, real-time enhancement of the physical network under real-time control.

2. The method of claim 1, wherein steps (c) and (d) collectively form a converging loop by which the desired network configuration is determined using the objective function as a convergence goal.

3. The method of claim 1, wherein said objective function is selected so as to enhance an aspect of network traffic throughput at specified network locations of the physical network under real-time control.

4. The method of claim 1, wherein said physical network under real-time control employs a packet-based communication technique, and wherein step (c) further comprises the step of simulating the packet-based communication technique among network nodes within the simulation reference model.

5. The method of claim 1, wherein at least one of said simulations is broken down into a plurality of logical processes, and wherein said method further comprising the steps of:

dividing the proposed network configuration into a plurality of network partitions each comprising one or more network nodes and at least one of which comprises multiple network nodes; and associating each of the network partitions with one of said logical processes;

wherein the step of executing one or more simulations, using said conservative parallel discrete event simulation technique, comprises the step of performing, for each simulation, a plurality of conservative discrete-event calculations in parallel for the multiple logical processes.

6. The method of claim 5, wherein at least some of said network nodes are wireless nodes, wherein the one or more network nodes in each logical partition are selected based upon their physical proximity to one another, and wherein step (c) further comprises the steps of:

for each logical partition, processing events occurring within the network partition using said conservative parallel discrete event simulation technique;

determining whether other network partitions are within a propagation range of each event; and selectively propagating the events to other network partitions within the propagation range of each particular event.

7. The method of claim 5, wherein the logical processes communicate via messages, and wherein step (c) comprises the step of calculating, for each logical process, a minimum event time during which the logical process will not send any messages to other logical processes.

8. The method of claim 7, wherein the minimum event time is calculated as the sum of a time period associated with the earliest timestamp for any incoming messages targeted for the logical process, and a lookahead time period during which the logical process will not send any messages to other logical processes.

9. The method of claim 8, wherein the minimum event time is limited to a maximum ceiling value.

10. The method of claim 8, wherein step (c) further comprises the step of determining a global minimum event time during which none of the logical processes will send any messages to other logical processes, based upon the minimum event time determined for each logical process.

11. The method of claim 10, wherein step (c) further comprises the step of processing, for each logical process, only events with timestamps earlier than the global minimum event time.

12. The method of claim 5, wherein the number of network partitions is equal to or greater than the number of processors executing the simulation.

13. The method of claim 12, wherein the physical network under real-time control comprises a wireless network, wherein at least some of said network nodes are wireless nodes corresponding to physical wireless nodes in the physical network, and wherein the simulation being executed accounts for propagation delays among the wireless nodes.

14. The method of claim 13, wherein a logical process selectively suppresses generation of an inter-process message if a calculated propagation resulting from an internal event at a wireless node associated with the logical process will not reach an adjacent logical process according to the propagation model employed by the simulation.

15. The method of claim 1, wherein the physical network under real-time control comprises a wireless network.

16. The method of claim 15, wherein step (c) further comprises the step of executing a plurality of simulations with different RTS/CTS threshold values, said RTS/CTS threshold values governing when control frames will be transmitted prior to transmission of data frames, and wherein step (d) further comprises the step of comparing throughput results from the plurality of simulations.

17. The method of claim 1, wherein the physical network under real-time control utilizes a TCP/IP communication protocol, wherein step (c) further comprises the step of executing a plurality of simulations with different TCP send window sizes, and wherein step (d) further comprises the step of comparing throughput results from the plurality of simulations.

18. The method of claim 1, wherein the physical network under real-time control comprises one or more network routers handling packets of different priority levels, wherein said one or more network routers have a probability of dropping packets according to a weighted random early detection scheme based upon minimum threshold queue length and maximum threshold queue length operational parameters defined for each priority level, and wherein steps (c) and (d) are performed to select said minimum threshold queue length and maximum threshold queue length operational parameters and thereby dynamically tune the probability of dropping packets at different priority levels.

19. The method of claim 1, wherein the step of executing one or more simulations comprises modeling the proposed network configuration using a plurality of different reference models having different node interconnections, and simultaneously running simulations based on the different reference models.

20. The method of claim 1, wherein the lowest layer of the architecture is a physical layer, and wherein the reference model further comprises one or more of a data link layer, a network layer, a transport layer, a session layer, a presentation layer, and an application layer, each of the reference model layers having a counterpart layer in the physical network under real-time control.

21. The method of claim 20, wherein the reference model has multiple layers of an Open Systems Interface (OSI) reference model.

22. The method of claim 20, wherein the data link layer is responsible for moving packets of data frame-by-frame from one network node to another network node; wherein the network layer routes information within the proposed network configuration; wherein the transport layer segments long messages into packets and reconstructs messages from received packets; wherein the session layer controls sessions between different communicating entities; wherein the presentation layer manages data syntax, semantics, and encoding; and wherein the application layer provides application-specific services to the user.

23. The method of claim 20, wherein the layers within the reference model define a protocol stack, and wherein the protocol stack is modeled as a single logical process.

24. The method of claim 1, wherein said one or more simulations are executed taking account of current network traffic of the physical network under control.

25. The method of claim 1, wherein step (c) further comprises the step of altering parameters at different protocol layers in the proposed network configuration across multiple executed simulations, said parameters affecting performance of the simulation reference model.

26. The method of claim 1, wherein said physical network is a communications network.

27. A method for optimizing real-time performance of a physical network under real-time control using simulation of a reference model representing the physical network under control, the method comprising the steps of:
(a) generating a proposed network configuration and a proposed network traffic distribution for the proposed network configuration based at least in part upon received data indicating a recent network state and recent network traffic of the physical network under real-time control;
(b) dividing the proposed network configuration into a plurality of network partitions each comprising one or more network nodes, at least one of said network partitions comprising more than one network node;
(c) associating said network partitions with a plurality of logical processes, each network partition associated with one of said logical processes;
(d) executing one or more simulations, using a conservative parallel discrete event simulation technique and a simulation reference model employing a layered architecture, for the proposed network configuration based upon the proposed traffic distribution while synchronizing events across the network partitions, each executed simulation performing a plurality of discrete-event calculations in parallel for said logical processes and constraining the network nodes to communicate only via the lowest layer of the architecture within the reference model even where simulated events occur at higher level layers;
(e) determining a desired network configuration for the physical network under real-time control from results of said one or more simulations, based upon an objective function for enhancing an aspect of network performance;
(f) providing reconfiguration instructions in real time to the physical network under real-time control and reconfiguring the physical network under real-time control in accordance with the desired network configuration; and
(g) repeating steps (a) through (f) to effectuate ongoing, real-time enhancement of the physical network under control.

28. The method of claim 27, wherein step (d) comprises the step of calculating, for each logical process, a minimum time period during which the logical process will not send an output to other logical processes.

29. The method of claim 27, wherein said physical network is a communications network.

30. A method for enhancing performance of a physical network under real-time control using simulation of a reference model representing the physical network under control, the physical network having a plurality of wireless network nodes, the method comprising:
(a) providing a simulation reference model having partitions associated with geographical regions;
(b) providing, for each partition, a logical process for simulating all the wireless network nodes in the geographical region associated with the partition, at least one of the partitions having multiple wireless network nodes;
(c) selecting a reference point for each partition giving a minimum path loss value with respect to an adjacent partition for propagating signals;
(d) receiving data indicating a recent network state and recent network traffic of the physical network under real-time control;
(e) generating a proposed network configuration and a proposed network traffic distribution for the proposed network configuration based at least in part on the recent network state and recent network traffic of the physical network under real-time control;
(f) executing one or more simulations, using a conservative parallel discrete event simulation technique, for the proposed network configuration based upon the proposed network traffic distribution, using a simulation reference model employing a layered architecture thereby allowing simulation of activity at a plurality of different protocol layers in the proposed network configuration, wherein each partition delivers a transmitted message to an adjacent logical process only if the selected reference point of the adjacent partition is within propagation range of the transmitted message, and wherein the receiving logical process calculates a path loss for all the wireless network nodes in its associated partition in response to receiving the transmitted message;
(g) determining a desired network configuration for the physical network under real-time control by evaluating the results of said one or more executed simulations to determine reconfiguration instructions based upon application of an objective function for enhancing an aspect of network performance to the simulated network configuration;
(h) conveying said reconfiguration instructions for the desired network configuration to the physical network under real-time control and reconfiguring the physical network under real-time control in accordance with the desired network configuration; and
(i) repeating steps (d) through (h) to effectuate ongoing, real-time enhancement of the physical network under real-time control.

31. A system for enhancing the performance of a physical network under real-time control using simulation of a reference model representing the physical network under control, the system comprising:
- a physical network to be controlled in real time; and
- a computer network communicatively coupled to the physical network under real time control, said computer network receiving data indicating a recent network state and recent network traffic of the physical network under real-time control and providing reconfiguration instructions to the physical network under real-time control, said computer network comprising:
  - an experiment configuration engine that receives the data indicating a recent network state and recent network traffic of the physical network under real-time control and generates one or more proposed network configurations and one or more proposed network traffic distributions for each of the proposed network configurations;
  - a simulation engine responsive to said experiment configuration engine, said simulation engine dividing each proposed network configuration into logical partitions each comprising one or more network nodes and at least one of which has multiple network nodes, performing conservative parallel discrete event simulations for the proposed network configurations using the proposed network traffic distributions while synchronizing events across the logical partitions, and generating a plurality of simulation results thereby;
  - an experiment analyzer for analyzing the simulation results generated by said simulation engine and for selecting the proposed network configuration providing the simulation results which conform most closely with an objective function; and
  - a deployment module for providing the reconfiguration instructions to the physical network under real-time control reflecting the selected network configuration, said reconfiguration instructions being utilized to reconfigure the physical network under real-time control;
  - wherein said experiment configuration engine, simulation engine, experiment analyzer, and deployment module cooperate to provide ongoing, real-time enhancement of the physical network under control;
  - wherein said simulation engine uses a reference model employing a layered architecture thereby allowing simulation of activity at a plurality of different protocol layers in the proposed network configuration; and
  - wherein said one or more simulations are executed such that the network nodes are constrained to communicate only via the lowest layer of the architecture within the reference model even where simulated events occur at higher level layers.

32. The system of claim 31, wherein said experiment configuration engine selects said plurality of network reconfiguration models and traffic models based at least in part on the recent network state and recent network traffic of the physical network under real-time control.

33. The system of claim 31, wherein said physical network is a communications network.

34. A system for enhancing the performance of a physical network under real-time control using simulation of a reference model representing the physical network under real-time control, the system comprising:
- a physical network to be controlled in real time; and
- a computer network communicatively coupled to the physical network under real time control, said computer network receiving data indicating a recent network state and recent network traffic of the physical network under real-time control and providing reconfiguration instructions to the physical network under real-time control, said computer network comprising:
  - means for generating one or more proposed network configurations and one or more proposed network traffic distributions for each of the proposed network configurations based at least in part upon received data indicating a recent network state and recent network traffic of the physical network under real-time control;
  - means for performing parallel discrete event simulations for the proposed network configurations using the proposed network traffic distributions and simulation reference models each employing a layered architecture thereby allowing simulation of activity at a plurality of different protocol layers in the proposed network configuration, and generating a plurality of simulation results thereby;
  - means for analyzing the simulation results and for selecting the proposed network configuration providing the simulation results which conform most closely with an objective function, thereby resulting in a selected network configuration for the physical network under real-time control; and
  - a deployment module for conveying reconfiguration instructions to the physical network under real-time control reflecting the selected network configuration, said reconfiguration instructions being utilized to reconfigure the physical network under real-time control, whereby ongoing, real-time enhancement of the physical network under control is provided;
  - wherein said means for performing parallel discrete event simulations for the proposed network configurations using the proposed network traffic distributions comprises:
    - means for dividing each proposed network configuration into a plurality of network partitions each comprising one or more network nodes, and at least one of which comprises more than one network node;
    - means for associating each of the network partitions with one of said logical processes; and
    - means for performing, for each simulation, a plurality of conservative discrete-event calculations in parallel for multiple logical processes while constraining the network nodes to communicate only via the lowest layer of the architecture within the reference model even where simulated events occur at higher level layers, said logical processes generating inter-process messages in order to synchronize the parallel processing of events across logical processes.

35. The system of claim 34, wherein said objective function is selected so as to enhance an aspect of network traffic throughput at specified network locations of the network under control.

36. The system of claim 34, wherein said means for performing parallel discrete event simulations for the proposed network configurations using the proposed network traffic distributions calculates, for each logical process, a minimum event time during which the logical process will not send any messages to other logical processes.

37. The system of claim 36, wherein the minimum event time is calculated as the sum of a time period associated with the earliest timestamp for any incoming messages targeted for the logical process, and a lookahead time period during which the logical process will not send any messages to other logical processes.

38. The system of claim 34, wherein said physical network is a communications network.

39. A computer readable non-transitory medium having stored thereon computer-executable instructions for enhancing performance of a physical network under real-time control using simulation of a reference model representing the physical network under real-time control, by causing one or more processors to perform the steps of:
  (a) receiving data indicating a recent network state and recent network traffic of the physical network under real-time control;
  (b) generating a proposed network configuration and a proposed network traffic distribution for the proposed network configuration based at least in part on the recent network state and recent network traffic of the physical network under real-time control;
  (c) executing one or more simulations, using a conservative parallel discrete event simulation technique, for the proposed network configuration based upon the proposed network traffic distribution, using a simulation reference model employing a layered architecture thereby allowing simulation of activity at a plurality of different protocol layers in the proposed network configuration, wherein said one or more simulations are executed such that the network nodes are constrained to communicate only via the lowest layer of the architecture within the reference model even where simulated events occur at higher level layers;
  (d) determining a desired network configuration for the physical network under real-time control by evaluating the results of said one or more executed simulations to determine reconfiguration instructions based upon application of an objective function for enhancing an aspect of network performance to the simulated network configuration;
  (e) conveying said reconfiguration instructions for the desired network configuration to the physical network under real-time control and reconfiguring the physical network under real-time control in accordance with the desired network configuration; and
  (f) repeating steps (a) through (e) to effectuate ongoing, real-time enhancement of the physical network under control.

40. The computer readable non-transitory medium of claim 39, wherein steps (c) and (d) collectively form a converging loop by which the desired network configuration is determined using the objective function as a convergence goal.

41. The computer readable non-transitory medium of claim 39, wherein said objective function is selected so as to enhance an aspect of network traffic throughput at specified network locations of the physical network under real-time control.

42. The computer readable non-transitory medium of claim 39, wherein said physical network under real-time control employs a packet-based communication technique, and wherein step (c) further comprises the step of simulating the packet-based communication technique among network nodes within the simulation reference model.

43. The computer readable non-transitory medium of claim 39, wherein the step of executing one or more simulations, using said conservative parallel discrete event simulation technique, comprises the step of performing, for each simulation, a plurality of discrete-event calculations in parallel for multiple logical processes each associated with a cluster of network nodes.

44. The computer readable non-transitory medium of claim 39, wherein the proposed network configuration is divided into a plurality of network partitions each associated with a distinct cluster of network nodes and a corresponding logical process for managing the one or more simulations with respect to the cluster of network nodes, and wherein said logical processes exchange messages for synchronizing the parallel processing of events across the logical processes.

45. The computer readable non-transitory medium of claim 39, wherein said physical network is a communications network.

* * * * *